US012604144B2

(12) United States Patent
Ha et al.

(10) Patent No.: US 12,604,144 B2
(45) Date of Patent: Apr. 14, 2026

(54) VIBRATION APPARATUS AND APPARATUS INCLUDING THE SAME

(71) Applicant: LG Display Co., Ltd., Seoul (KR)

(72) Inventors: YoungWook Ha, Paju-si (KR); Chiwan Kim, Paju-si (KR); Wansoo Lee, Paju-si (KR); SeungRyull Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 282 days.

(21) Appl. No.: 18/519,470

(22) Filed: Nov. 27, 2023

(65) Prior Publication Data

US 2024/0236584 A1 Jul. 11, 2024

(30) Foreign Application Priority Data

Jan. 10, 2023 (KR) ........................ 10-2023-0003524

(51) Int. Cl.
*H04R 17/00* (2006.01)

(52) U.S. Cl.
CPC .................................... *H04R 17/00* (2013.01)

(58) Field of Classification Search
CPC .......... H04R 17/00; H04R 7/045; H04R 7/10; H04R 2400/03; H04R 1/24; H04R 2499/13; H04R 2499/15; H04S 7/302
See application file for complete search history.

(56) References Cited

U.S. PATENT DOCUMENTS

| | | | | |
|---|---|---|---|---|
| 10,276,644 | B2 * | 4/2019 | You | H10K 59/1315 |
| 2008/0203914 | A1 * | 8/2008 | Cho | H01J 9/02 445/52 |
| 2011/0006316 | A1 * | 1/2011 | Ing | G02B 5/0236 257/89 |
| 2015/0261370 | A1 * | 9/2015 | Yoo | G06F 3/0412 345/173 |
| 2019/0354211 | A1 * | 11/2019 | Li | H03K 17/9622 |
| 2019/0355797 | A1 * | 11/2019 | Zou | H10K 59/121 |
| 2021/0306741 | A1 * | 9/2021 | Kim | H04R 1/403 |
| 2022/0165931 | A1 * | 5/2022 | Chen | H10N 30/8554 |
| 2022/0230997 | A1 * | 7/2022 | Choi | H01L 24/83 |
| 2025/0182685 | A1 * | 6/2025 | Kusunoki | G09F 9/33 |

* cited by examiner

*Primary Examiner* — Oyesola C Ojo

(74) *Attorney, Agent, or Firm* — Morgan, Lewis & Bockius LLP

(57) ABSTRACT

A vibration apparatus may include a vibration part, a first electrode part at a first surface of the vibration part, and a second electrode part at a second surface different from the first surface of the vibration part. At least one of the first electrode part and the second electrode part may include metal and an anti-oxidation layer.

27 Claims, 15 Drawing Sheets

VIBRATION APPARATUS AND APPARATUS INCLUDING THE SAME

CROSS-REFERENCE TO RELATED APPLICATIONS

This application claims the benefit of and priority to Korean Patent Application No. 10-2023-0003524 filed on Jan. 10, 2023, the entirety of which is incorporated herein by reference for all purposes.

BACKGROUND

1. Technical Field

The present disclosure relates to an apparatus and particularly to, for example, without limitation, a vibration apparatus and an apparatus including the same.

2. Description of the Related Art

An apparatus includes a separate speaker or a sound apparatus providing a sound. When a speaker is disposed in an apparatus, the speaker occupies a space, and consequently, the design and spatial disposition of the apparatus are limited.

A speaker applied to the apparatus may be, for example, an actuator including a magnet and a coil. However, when an actuator is applied to the apparatus, a thickness thereof is increased. Therefore, piezoelectric elements for realizing a thin thickness are attracting much attention.

Because piezoelectric elements have a fragile characteristic, the piezoelectric elements are easily damaged due to an external impact, and thus, have a problem where reliability is low in sound reproduction. In addition, when a speaker such as a piezoelectric element or the like is applied to a flexible apparatus, there is a problem where a damage can occur due to a fragile characteristic.

The description of the related art should not be assumed to be prior art merely because it is mentioned in or associated with this section. The description of the related art may include information that describes one or more aspects of the subject technology, and the description in this section does not limit the invention.

SUMMARY

The inventors of the present disclosure have recognized the problems and disadvantages of the related art and have performed extensive research and experiments for implementing a vibration apparatus which may enhance the quality of a sound and a sound pressure level characteristic. Through the extensive research and experiments, the inventors of the present disclosure have invented a new vibration apparatus and an apparatus including the same, which may enhance the quality of a sound and a sound pressure level characteristic.

One or more aspects of the present disclosure are directed to providing a vibration apparatus and an apparatus including the same, which may vibrate a vibration member to generate a vibration or a sound and may enhance a sound characteristic and/or a sound pressure level characteristic.

One or more aspects of the present disclosure are directed to providing a vibration apparatus and an apparatus including the same, which may enhance a characteristic of an electrode part to enhance a sound characteristic and/or a sound pressure level characteristic.

Additional features, advantages, and aspects of the present disclosure are set forth in part in the present disclosure and will also be apparent from the present disclosure or may be learned by practice of the inventive concepts provided herein. Other features, advantages, and aspects of the present disclosure may be realized and attained by the descriptions provided in the present disclosure, or derivable therefrom, and claims hereof as well as the appended drawings.

To achieve these and other advantages and aspects of the present disclosure, as embodied and broadly described herein, in one or more aspects, a vibration apparatus may comprise a vibration part, a first electrode part at a first surface of the vibration part, and a second electrode part at a second surface different from the first surface of the vibration part. At least one of the first electrode part and the second electrode part may comprise metal and an anti-oxidation layer.

In one or more aspects, an apparatus may comprise a passive vibration member, and one or more vibration generating apparatuses configured to vibrate the passive vibration member. The one or more vibration generating apparatuses may comprise a vibration part, a first electrode part at a first surface of the vibration part, and a second electrode part at a second surface different from the first surface of the vibration part. At least one of the first electrode part and the second electrode part may comprise metal and an anti-oxidation layer.

In one or more aspects, a vehicular apparatus may comprise an exterior material, an interior material covering the exterior material, and one or more vibration generating apparatuses at one or more among the exterior material, the interior material, and a region between the exterior material and the interior material. The one or more vibration generating apparatuses may comprise a vibration part, a first electrode part at a first surface of the vibration part, and a second electrode part at a second surface different from the first surface of the vibration part. At least one of the first electrode part and the second electrode part may comprise metal and an anti-oxidation layer. One or more of the interior material and the exterior material may output sound based on a vibration of the one or more vibration generating apparatuses.

Further details of one or more example embodiments and aspects are included in the detailed description of the disclosure and the accompanying drawings.

The apparatus according to one or more example embodiments of the present disclosure may include a vibration apparatus which vibrates a display panel or a vibration member, and thus, may generate a sound so that a traveling direction of the sound of the apparatus is a direction toward a forward region in front of the display panel or the vibration member.

An apparatus according to one or more example embodiments of the present disclosure may be configured with one electrode part including metal, thereby providing a vibration apparatus where a process is simplified.

An apparatus according to one or more example embodiments of the present disclosure may be configured with one electrode part including metal, thereby realizing a unimaterialization effect.

An apparatus according to one or more example embodiments of the present disclosure may be configured with an electrode part including metal and an anti-oxidation layer, and thus, may prevent the occurrence of oxidation in a metal surface, thereby securing the stability and reliability of the electrode part.

Other systems, apparatuses, methods, features and advantages will be, or will become, apparent to one with skill in the art upon examination of the figures and detailed description herein. It is intended that all such additional systems, apparatuses, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspects and embodiments of the disclosure, and together with the description serve to explain principles and examples of the disclosure.

Figure 1:
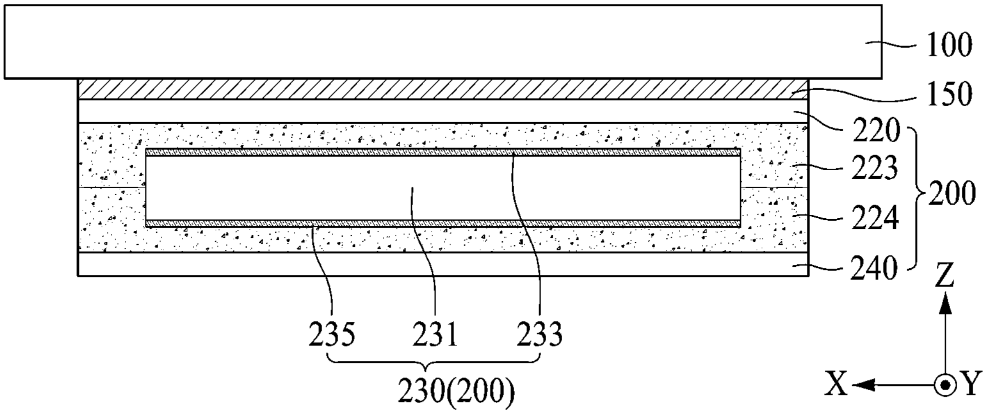
FIG. 1 illustrates an apparatus according to an example embodiment of the present disclosure.

Throughout the drawings and the detailed description, unless otherwise described, the same drawing reference numerals should be understood to refer to the same elements, features, or structures. The sizes, lengths, and thicknesses of layers, regions and elements, and depiction thereof may be exaggerated for clarity, illustration, and/or convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements, one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. "Embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, where the positional relationship between two elements (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other elements may be located between the two elements unless a more limiting term, such as "immediate(ly)," "direct(ly)," or "close(ly)," is used. For example, when an element is described as being positioned "on," "on a top of," "upon," "on top of," "over," "under," "above," "below," "beneath," "near," "close to," "adjacent to," "beside," "next to," "at or on a side of," or the like another element, this description should be construed as including a case in which the elements contact each other directly as well as a case in which one or more additional elements are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. In one or more aspects, the term "below" or the like, which is an example term, can include all directions, including directions of "above" and "below" and diagonal directions. Likewise, an exemplary term "above," "on" or the like can include all directions, including directions of "above" and "below" and diagonal directions.

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., layers, films, regions, components, sections, or the like), these elements should not be limited by these terms, for example, to any particular order, precedence, or number of elements. These terms are used only to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided," "disposed," "connected," "coupled," or the like in, on, with or to another element may be understood, for example, as that at least a portion of the element is provided, disposed, connected, coupled, or the like in, on, with or to at least a portion of another element. The phrase "through" may be understood, for example, to be at least partially through or entirely through. The phase that an element (e.g., layer, film, region, component, section, or the like) “contacts,” “overlaps,” or the like with another element may be understood, for example, as that at least a portion of the element contacts, overlaps, or the like with a least a portion of another element.

The terms such as a “line” or “direction” should not be interpreted only based on a geometrical relationship in which the respective lines or directions are parallel, perpendicular, diagonal, or slanted with respect to each other, and may be meant as lines or directions having wider directivities within the range within which the components of the present disclosure may operate functionally. For example, the terms “first direction,” “second direction,” and the like (or the terms such as a first direction X, a first horizontal direction, a first horizontal length direction, a second direction Y, a second horizontal direction, a second horizontal length direction, a vertical direction, a planar direction, a lengthwise direction, a widthwise direction, a vertical direction Z, and a height direction Z) should not be interpreted only based on a geometrical relationship in which the respective directions are parallel, perpendicular, diagonal, or slanted with respect to each other, and may be meant as directions having wider directivities within the range within which the components of the present disclosure may operate functionally.

The term “at least one” should be understood as including any and all combinations of one or more of the associated listed items. For example, each of the phrases “at least one of a first item, a second item, or a third item” and “at least one of a first item, a second item, and a third item” may represent (i) a combination of items provided by two or more of the first item, the second item, and the third item or (ii) only one of the first item, the second item, or the third item. Further, at least one of a plurality of elements can represent (i) one element of the plurality of elements, (ii) some elements of the plurality of elements, or (iii) all elements of the plurality of elements. Further, “at least some,” “some,” “some elements,” “a portion,” “portions,” “at least a portion,” “at least portions,” “a part,” “at least a part,” “parts,” “at least parts,” “one or more,” or the like of the plurality of elements can represent (i) one element of the plurality of elements, (ii) a part of the plurality of elements, (iii) parts of the plurality of elements, (iv) multiple elements of the plurality of elements, or (v) all of the plurality of elements. Moreover, at least a portion (or a part) of an element can represent (i) a portion (or a part) of the element, (ii) one or more portions (or parts) of the element, or (iii) the element, or the entirety of the element. A phrase that a plurality of first elements are connected to a plurality of second elements may describe, for example, that at least a part (or one or more first elements) of a plurality of first elements are connected to at least a part (or one or more second elements) of a plurality of second elements.

The expression of a first element, a second elements “and/or” a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression “A/B” may be understood as A and/or B. For example, an expression “A/B” may refer to only A; only B; A or B; or A and B.

In one or more aspects, the terms “between” and “among” may be used interchangeably simply for convenience unless stated otherwise. For example, an expression “between a plurality of elements” may be understood as among a plurality of elements. In another example, an expression “among a plurality of elements” may be understood as between a plurality of elements. In one or more examples, the number of elements may be two. In one or more examples, the number of elements may be more than two. Furthermore, when an element (e.g., layer, film, region, component, section, or the like) is referred to as being “between” at least two elements, the element may be the only element between the at least two elements, or one or more intervening elements may also be present.

In one or more aspects, the phrases “each other” and “one another” may be used interchangeably simply for convenience unless stated otherwise. For example, an expression “different from each other” may be understood as being different from one another. In another example, an expression “different from one another” may be understood as being different from each other. In one or more examples, the number of elements involved in the foregoing expression may be two. In one or more examples, the number of elements involved in the foregoing expression may be more than two.

In one or more aspects, the phrases “one or more among” and “one or more of” may be used interchangeably simply for convenience unless stated otherwise. In one or more aspects, unless stated otherwise, the term “nth” may refer to “nnd” (e.g., 2nd where n is 2) or “nrd” (e.g., 3rd where n is 3), and n may be a natural number.

The term “or” means “inclusive or” rather than “exclusive or.” That is, unless otherwise stated or clear from the context, the expression that “x uses a or b” means any one of natural inclusive permutations. For example, “a or b” may mean “a,” “b,” or “a and b.” For example, “a, b or c” may mean “a,” “b,” “c,” “a and b,” “b and c,” “a and c,” or “a, b and c.”

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

FIG. 1 illustrates an apparatus according to an example embodiment of the present disclosure.

With reference to FIG. 1, an apparatus according to an example embodiment of the present disclosure may include a vibration member 100 and a vibration apparatus 200.

The vibration member 100 may output a sound based on a vibration of the vibration apparatus 200. Accordingly, the vibration member 100 may be a vibration object, a vibration plate, a vibration panel, a sound plate, a sound output member, or sound output panel, and or the like, but embodiments of the present disclosure are not limited thereto.

The vibration member 100 may be configured to be transparent, semitransparent, or opaque. The vibration member 100 according to an example embodiment of the present disclosure may include a metal material or a nonmetal material (or a composite nonmetal material) having a material characteristic suitable for outputting a sound based on a vibration. The metal material of the vibration member 100 according to an example embodiment of the present disclosure may include any one or more of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the vibration member 100 may include one or more of glass, plastic, carbon, fiber, leather, wood, cloth, rubber, and paper, but embodiments of the present disclosure are not limited thereto. For example, the paper may be cone paper for speakers. For example, the cone paper may be pulp or foamed plastic, or the like, but embodiments of the present disclosure are not limited thereto. For example, the vibration member 100 may be configured as acrylonitrile-butadiene-styrene (ABS), but embodiments of the present disclosure are not limited thereto. For example, the acrylonitrile-butadiene-styrene (ABS) may be a material with impact resistance and rigidity.

The vibration member 100 according to an example embodiment of the present disclosure may implement or realize a signage panel such as an analog signage or a digital signage, or the like such as an advertising signboard, a poster, or a noticeboard, or the like. For example, when the vibration member 100 implements the signage panel, the analog signage may include signage content such as a sentence, a picture, and a sign, or the like. The signage content may be disposed at the vibration member 100 to be visible. For example, the signage content may be attached on one or more of a first surface (or a front surface) and a second surface (or a rear surface) different from (or opposite to) the first surface, of the vibration member 100. For example, the signage content may be directly attached on one or more of a first surface (or a front surface) and a second surface (or a rear surface) different from (or opposite to) the first surface, of the vibration member 100. For example, the signage content may be printed on a medium such as paper or the like, and the medium with the signage content printed thereon may be directly attached on one or more of the first surface and the second surface of the vibration member 100. For example, when the signage content is attached on the second surface of the vibration member 100, the vibration member 100 may be configured as a transparent material.

The vibration member 100 according to an example embodiment of the present disclosure may include a planar structure. For example, the vibration member 100 may include a plate-shaped structure having a tetragonal shape. For example, the vibration member 100 may include a plate-shaped structure having a polygonal shape including a rectangular shape or a square shape. For example, the vibration member 100 may include a plate structure having entirely a same thickness, or may include a nonplanar structure, but embodiments of the present disclosure are not limited thereto.

The vibration member 100 may include a widthwise length parallel to a first direction X and a lengthwise length parallel to a second direction Y. For example, with respect to a same plane, the first direction X may be a first horizontal direction or a first horizontal length direction of the vibration member 100, and the second direction Y may be a second horizontal direction or a second horizontal length direction of the vibration member 100 which is orthogonal to the first direction X. For example, the vibration member 100 may have a rectangular shape where the widthwise length is relatively longer than the lengthwise length. However, embodiments of the present disclosure are not limited thereto, and the vibration member 100 may include a square shape where the widthwise length is a same as the lengthwise length.

The vibration apparatus 200 may be configured to autonomously vibrate (or displace or drive) based on an electrical signal (or a voice signal or a sound signal) applied thereto, or may vibrate (or displace or drive) the vibration member (or the vibration plate or the vibration object). For example, the vibration apparatus 200 may be a vibration structure, a vibrator, a vibration generating device, a vibration generator, a sounder, a sound device, a sound generating device, or a sound generator, and or the like, but embodiments of the present disclosure are not limited thereto.

The vibration apparatus 200 according to an example embodiment of the present disclosure may include a piezoelectric material or an electroactive material which have a piezoelectric characteristic. The vibration apparatus 200 may vibrate (or displace or drive) the vibration member 100 based on a vibration (or displacement or driving) of the piezoelectric material by an electrical signal (or a voice signal or a sound signal) applied to the piezoelectric material. For example, the vibration apparatus 200 may alternately repeat contraction and/or expansion based on a piezoelectric effect (or a piezoelectric characteristic) to vibrate (or displace or drive). For example, the vibration apparatus 200 may vibrate (or displace or drive) in a vertical direction (or a thickness direction) Z as contraction and/or expansion are alternately repeated by an inverse piezoelectric effect.

The vibration apparatus 200 according to an example embodiment of the present disclosure may be connected or coupled to the second surface of the vibration member 100 by an adhesive member 150. For example, the adhesive member 150 may be disposed between the vibration member 100 and the vibration apparatus 200. The vibration apparatus 200 may be disposed on one surface of the vibration member 100 and may transmit a vibration to the vibration member 100 through the adhesive member 150.

The adhesive member 150 according to an example embodiment of the present disclosure may include an adhesive layer (or a tacky layer) which is good in attaching force or adhesive force. For example, the adhesive member 150 may be an adhesive, a double-sided tape, a single-sided tape, a double-sided foam tape, a single-sided foam tape, a single-sided cushion tape, a double-sided cushion tape, a double-sided adhesive foam pad, a single-sided adhesive foam pad, or a tacky sheet, or the like, but embodiments of the present disclosure are not limited thereto. For example, when the adhesive member 150 includes the tacky sheet (or the tacky layer), the adhesive member 150 may include only an adhesive layer or a tacky layer without a base member such as a plastic material or the like.

The adhesive layer (or a tacky layer) of the adhesive member 150 according to an example embodiment of the present disclosure may include epoxy, acrylic, silicone, or urethane, but embodiments of the present disclosure are not limited thereto.

The adhesive layer (or a tacky layer) of the adhesive member 150 according to another example embodiment of the present disclosure may include a pressure sensitive adhesive (PSA), an optically cleared adhesive (OCA), or an optically cleared resin (OCR), but embodiments of the present disclosure are not limited thereto.

The vibration apparatus 200 according to an example embodiment of the present disclosure may include a vibration device 230. The vibration apparatus 200 or the vibration device 230 may include a vibration part 231, a first electrode part 233, and a second electrode part 235.

The vibration part 231 may include a piezoelectric material or an electro active material having a piezoelectric effect. For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. The vibration part 231 may be a vibration layer, a piezoelectric layer, a piezoelectric material layer, an electro active layer, a vibration portion, a piezoelectric material portion, an electro active portion, a piezoelectric structure, a piezoelectric composite layer, a piezoelectric composite, or a piezoelectric ceramic composite, and the like, but embodiments of the present disclosure are not limited thereto. The vibration part 231 may be formed of a transparent, semitransparent, or opaque piezoelectric material, and thus, the vibration part 231 may be transparent, semitransparent, or opaque.

The vibration part 231 may include a piezoelectric-type vibration part. For example, the vibration part 231 may be configured as an inorganic material part. The inorganic part may be a piezoelectric material, a composite piezoelectric material, or an electroactive material which includes a piezoelectric effect.

The vibration part 231 according to an example embodiment of the present disclosure may be configured as a ceramic-based material have a capable of implementing a relatively strong vibration, or may be configured as a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$", in the chemical formula "$ABO_3$", the "A" may include a divalent metal element, and the "B" may include a tetravalent metal element. As an example embodiment of the present disclosure, in the chemical formula "$ABO_3$", the "A" and the "B" may be cations, and the "O" may be anions. For example, the vibration part 231 may include at least one or more of lead titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The piezoelectric ceramic may be configured as a single crystalline ceramic having a crystalline structure, or may be configured as a ceramic material having a polycrystalline structure or polycrystalline ceramic. A piezoelectric material including the single crystalline ceramic may include $\alpha$-$AlPO_4$, $\alpha$-$SiO_2$, $LiNbO_3$, $Tb_2(MoO_4)_3$, $LizB_4O_7$, or ZnO, but embodiments of the present disclosure are not limited thereto. A piezoelectric material including the polycrystalline ceramic may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but embodiments of the present disclosure are not limited thereto.

For another example, the vibration part 231 may include at least one or more of calcium titanate ($CaTiO_3$), barium titanate ($BaTiO_3$), and strontium titanate ($SrTiO_3$), without lead (Pb), but embodiments of the present disclosure are not limited thereto.

The first electrode part 233 may be disposed at a first surface (or an upper surface) of the vibration part 231. The first electrode part 233 may have one electrode type (or single-body electrode type) which is disposed at an entire first surface of the vibration part 231. For example, the first electrode part 233 may have substantially a same shape as that of the vibration part 231, but embodiments of the present disclosure are not limited thereto.

The second electrode part 235 may be disposed at a second surface (or a rear surface) different from (or opposite to) the first surface of the vibration part 231. For example, the second electrode part 235 may be one electrode type (or single-body electrode type) which is disposed at an entire second surface of the vibration part 231. For example, the second electrode part 235 may have a same shape as the vibration part 231, but embodiments of the present disclosure are not limited thereto. For example, the second electrode part 235 may be made of a same material as the first electrode part 233, but embodiments of the present disclosure are not limited thereto. As another example, the second electrode part 235 may be configured in a different material from the first electrode part 233.

The vibration part 231 may be polarized (or poling) by a certain voltage applied to the first electrode part 233 and the second electrode part 235 from an outside in a certain temperature atmosphere, or a temperature atmosphere that may be changed from a high temperature to a room temperature, but embodiments of the present disclosure are not limited thereto. For example, the vibration part 231 may alternately and repeatedly contract and/or expand based on an inverse piezoelectric effect according to a sound signal (or a voice signal) applied to the first electrode part 233 and the second electrode part 235 from the outside to vibrate. For example, the vibration part 231 may vibrate based on a vertical-direction vibration and a planar direction vibration by the sound signal applied to the first electrode part 233 and the second electrode part 235. The vibration part 231 may increase the displacement of the vibration member (or the vibration plate or the vibration object) 100 by contraction and/or expansion of the planar direction, thereby further improving the vibration of the vibration apparatus 200.

The vibration apparatus 200 or the vibration device 230 according to an example embodiment of the present disclosure may further include a first protection member 220 and a second protection member 240.

The first protection member 220 may be disposed at a first surface of the vibration device 230. For example, the first protection member 220 may be at the first electrode part 233. For example, the first protection member 220 may be configured to cover the first electrode part 233. For example, the first protection member 220 may be configured to have a larger size than the vibration device 230. Therefore, the first protection member 220 may protect the first surface of the vibration device 230 and the first electrode part 233. For example, the first protection member 220 may be a first cover member, but embodiments of the present disclosure are not limited thereto.

The second protection member 240 may be disposed at a second surface different from (or opposite to) the first surface of the vibration device 230. For example, the second protection member 240 may be at the second electrode part 235. For example, the second protection member 240 may be configured to cover the second electrode part 235. For example, the second protection member 240 may be configured to have a larger size than the vibration device 230 and have a same size as the first protection member 220. Therefore, the second protection member 240 may protect the second surface of the vibration device 230 and the second electrode part 235. For example, the second protection member 240 may be a second cover member, but embodiments of the present disclosure are not limited thereto.

Each of the first protection member 220 and the second protection member 240 according to an example embodiment of the present disclosure may include one or more materials of plastic, fiber, carbon, and wood, but embodiments of the present disclosure are not limited thereto. For example, each of the first protection member 220 and the second protection member 240 may include a same material or a different material. For example, each of the first protection member 220 and the second protection member 240 may be a polyimide film, a polyethylene terephthalate film, or polyethylene naphthalate, but embodiments of the present disclosure are not limited thereto.

The first protection member 220 according to an example embodiment of the present disclosure may be connected or coupled to the first electrode part 233 by a first adhesive layer 223. For example, the first protection member 220 may be connected or coupled to the first surface of the vibration device 230 or the first electrode part 233 by a film laminating process by the first adhesive layer 223.

The second protection member 240 according to an example embodiment of the present disclosure may be connected or coupled to the second electrode part 235 by a second adhesive layer 224. For example, the second protection member 240 may be connected or coupled to the second surface of the vibration device 230 or the second electrode part 235 by a film laminating process by the second adhesive layer 224.

The first adhesive layer 223 may be disposed between the first electrode part 233 and the first protection member 220. The second adhesive layer 224 may be disposed between the second electrode part 235 and the second protection member 240. The first adhesive layer 223 and second adhesive layer 224 may be configured between the first protection member 220 and the second protection member 240 to surround the vibration device 230. For example, the first adhesive layer 223 and second adhesive layer 224 may be an adhesive layer which are configured between the first protection member 220 and the second protection member 240 to surround the vibration device 230. For example, one or more of the first adhesive layer 223 and second adhesive layer 224 may be configured to surround the vibration device 230. For example, the first adhesive layer 223 and second adhesive layer 224 may be configured between the first protection member 220 and the second protection member 240 to completely surround the vibration part 231, the first electrode part 233, and the second electrode part 235. For example, the vibration part 231, the first electrode part 233, and the second electrode part 235 may be embedded or built-in between the first adhesive layer 223 and the second adhesive layer 224.

Each of the first adhesive layer 223 and second adhesive layer 224 according to an example embodiment of the present disclosure may include an electrically insulating material which has adhesiveness and is capable of compression and decompression. For example, each of the first adhesive layer 223 and the second adhesive layer 224 may include an epoxy resin, an acrylic resin, a silicone resin, or a urethane resin, but embodiments of the present disclosure are not limited thereto.

Figure 2:
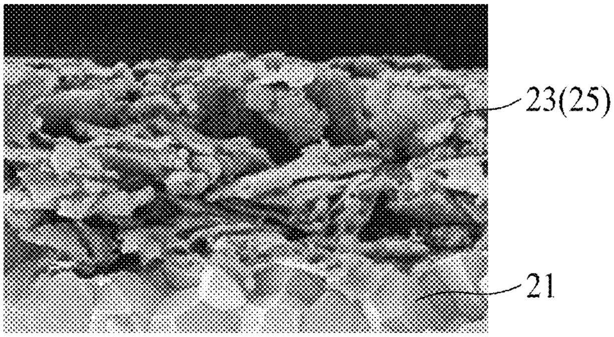
FIG. 2 is a scanning microscope photograph illustrating an electrode part according to an example embodiment of the present disclosure.

FIG. 2 is a scanning microscope photograph illustrating a vibration device according to an example embodiment of the present disclosure.

With reference to FIG. 2, the vibration device according to an example embodiment of the present disclosure may include a vibration part 21 and electrode parts 23 and 25.

The vibration part 21 may include lead zirconate titanate (PZT), but embodiments of the present disclosure are not limited thereto. The electrode parts 23 and 25 may be configured at first and second surfaces of the vibrating part, respectively. For example, the electrode parts 23 and 25 may include silver (Ag). For example, because silver (Ag) may be fired at a high temperature in forming the electrode part, it may be difficult to perform a process, and due to the price of silver, the manufacturing cost may increase. As another example, the electrode parts 23 and 25 may use an electrode including silver and flake particles capable of being fired at a low temperature. The electrode including silver and flake particles may have a problem where an interface characteristic with the vibration part 21 is low and an adhesive force is low. As another example, the electrode parts 23 and 25 may be configured as a carbon electrode. The carbon electrode may have a high resistivity, and thus, may have a problem where a sound pressure level characteristic is reduced. Therefore, the inventors of the present disclosure have performed extensive research and experiments for enhancing a characteristic of an electrode part. Based on the extensive research and experiments, the inventors of the present disclosure have invented a vibration apparatus for enhancing a characteristic of an electrode part. This is described in more detail below.

Figure 3A:
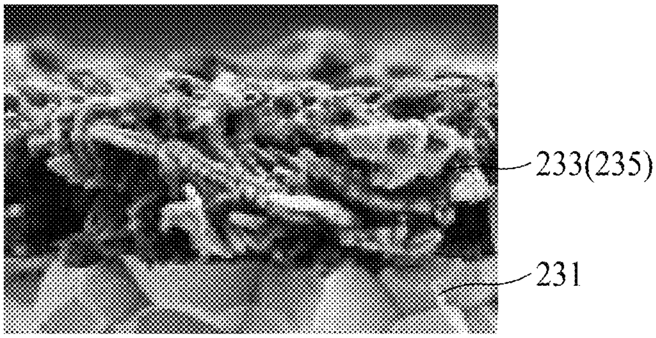
FIG. 3A is a scanning microscope photograph illustrating an electrode part according to another example embodiment of the present disclosure.
Figure 3B:
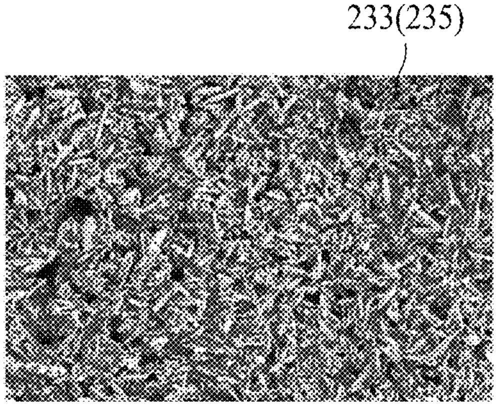
FIG. 3B is a scanning microscope photograph illustrating an electrode part according to another example embodiment of the present disclosure.
Figure 3C:
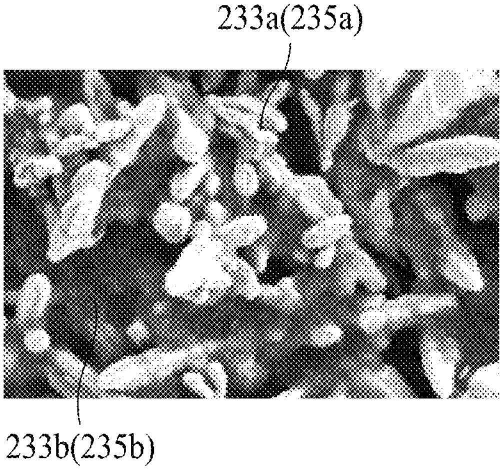
FIG. 3C is a scanning microscope photograph illustrating an electrode part according to another example embodiment of the present disclosure.
Figure 4:
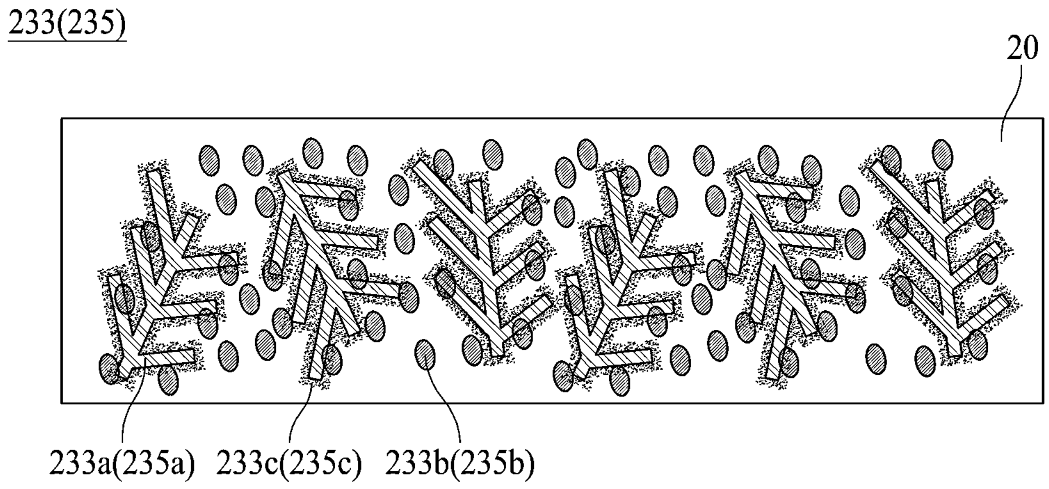
FIG. 4 illustrates an electrode part according to another example embodiment of the present disclosure.

Each of FIGS. 3A to 3C is a scanning microscope photograph illustrating an electrode part according to another example embodiment of the present disclosure. FIG. 4 illustrates an electrode part according to another example embodiment of the present disclosure.

With reference to FIGS. 3A and 3B, a vibration device according to another example embodiment of the present disclosure may include a vibration part 231 and electrode parts 233 and 235.

The vibration part 231 may be configured in PZT or the material described above with reference to FIG. 1, but embodiments of the present disclosure are not limited thereto. Descriptions given with reference to FIGS. 3A to 4 may be identically applied to electrode parts of vibration apparatuses 201 to 204 described below with reference to FIGS. 7 to 14. For example, when a vibration part includes an inorganic material portion or includes an inorganic material portion and an organic material portion, a description of an electrode part in FIGS. 3A to 4 may be identically applied.

With reference to FIG. 3A, each of the electrode parts 233 and 235 according to an example embodiment of the present disclosure may be configured as or in a copper (Cu) electrode. Comparing with silver, the copper electrode may be possible to perform a fining process at a low temperature and may be low in price, and thus, the inventors of the present disclosure have configured the electrode parts 233 and 235 with a copper electrode.

FIG. 3B is an enlarged view of the electrode parts 233 and 235. As in FIG. 3B, a copper electrode may improve an electrical characteristic based on an increase in surface area and may improve an interface characteristic with the vibration part 231. For example, the electrical characteristic may correspond to a surface resistance and a capacitance and may improve a surface area and/or a capacitance. This is described in more detail below with reference to Table 1 and Table 2.

Based on a particle size, an electrical characteristic of copper may be changed and an interface characteristic with the vibration part 231 may be changed. For example, when a copper particle has a flake shape, a low temperature process may be possible, but there may be a problem where a surface resistance increases. For example, when the copper particle has a spherical shape, a surface resistance may be improved slightly more than a flake shape, but there may be a problem where the oxidation of copper is possible because a size of the copper particle is reduced. Furthermore, copper should be added to the electrode parts 233 and 235 by a high content, so as to secure a surface coverage of the electrode part. For example, when the copper particle has a dendrite shape, a low temperature process may be possible, a surface resistance may be low, and a process characteristic and an electrical characteristic may be good due to a high surface area. Therefore, the copper particle **233*a* of each of the electrode parts 233 and 235 according to an example embodiment of the present disclosure may have a dendrite shape, and thus, a low temperature process of the electrode parts 233 and 235 may be possible, a sound pressure level characteristic may be improved by a low surface resistance, and an electrical characteristic and an interface characteristic with the vibration part 231 may be further improved due to a high surface area. As illustrated in FIG. 4, in an example, each copper particle 233*a*** may have multiple surfaces formed by one or more acute angles, one or more obtuse angles and/or one or more right angles (e.g., angles of about 90 degrees).

Comparing copper with other metals, a resistance to oxidation may be exceptionally low, and thus, oxidation of copper may be easily performed at a low temperature. Furthermore, an oxidation layer formed on a surface of copper may be a dense layer, and thus, oxidation may continuously occur due to the diffusion of oxygen. Therefore, the inventors of the present disclosure have performed extensive research and experiments for preventing oxidation of copper. Based on the extensive research and experiments, the inventors of the present disclosure have formed an anti-oxidation layer, which is not oxidized at a temperature of about 200° C. or less (for example, a firing temperature of a vibration part) and has excellent conductivity, on a copper surface.

With reference to FIGS. 3C and 4, the electrode parts 233 and 235 according to an example embodiment of the present disclosure may include anti-oxidation layers **233*c* and 235*c*. According to an example embodiment of the present disclosure, one of the electrode parts 233 and 235 may include metal and the anti-oxidation layers 233*c* or 235*c*. For example, the metal may include copper. For example, the copper particles 233*a* and 235*a*** may each be copper, but embodiments of the present disclosure are not limited thereto.

For example, based on the oxidation of copper, copper (I) oxide ($Cu_2O$) (or cuprous oxide) may be formed on a surface of copper, and copper (II) oxide (CuO) (or cupric oxide) may be formed on a surface of $Cu_2O$. The anti-oxidation layer may be formed for preventing the formation of $Cu_2O$.

The anti-oxidation layers **233*c* and 235*c* may include metal which has a high resistance to oxidation compared to copper. For example, the anti-oxidation layers 233*c* and 235*c* may include at least one of gold (Au), platinum (Pt), silver (Ag), nickel (Ni), and tin (Sn), but embodiments of the present disclosure are not limited thereto. For example, the anti-oxidation layers 233*c* and 235*c* may be formed to surround surfaces of the copper particles 233*a* and 235*a*. For example, the anti-oxidation layers 233*c* and 235*c* may be formed on the surfaces of the copper particles 233*a* and 235*a*** by a deposition process or a plating process, but embodiments of the present disclosure are not limited thereto. The deposition process may be a sputtering process or an evaporation process, but embodiments of the present disclosure are not limited thereto. The plating process may be an electroless plating process, but embodiments of the present disclosure are not limited thereto.

Gold (Au) configuring (or configured in or included in) the anti-oxidation layers **233*c* and 235*c* may be extremely high in chemical stability, and a resistivity thereof may be similar or equal to that of silver (Ag). For example, silver (Ag) configuring the anti-oxidation layers 233*c* and 235*c*** may have a low resistance, and thus, may be formed to have a thickness of about tens nm to hundreds nm or more, but embodiments of the present disclosure are not limited thereto. A thickness of silver (Ag) may be set to 100 nm or less, and thus, the manufacturing cost caused by silver (Ag) may be reduced.

Nickel (Ni), tin (Sn), and/or platinum (Pt) configuring the anti-oxidation layers **233*c* and 235*c*** may each be a material which is higher in resistivity than silver (Ag). To prevent the oxidation of copper and maintain the excellent conductivity of copper, a thickness may be set to about tens nm or less, but embodiments of the present disclosure are not limited thereto. For example, a thickness of each of nickel (Ni), tin (Sn), and platinum (Pt) may be set to 10 nm or more and 50 nm or less, but embodiments of the present disclosure are not limited thereto. For example, when a thickness of each of nickel (Ni), tin (Sn), and platinum (Pt) is set to 10 nm or more, oxidation may not occur at or in a surface of copper, and the conductivity of copper may be secured.

The anti-oxidation layer **233*c* may be configured to cover a surface of the copper (or copper particle) 233*a*. For example, the anti-oxidation layer 233***c* may be configured to cover a surface of the copper (or copper particle) 233*a* having a dendrite shape.

In the electrode parts 233 and 235 according to an example embodiment of the present disclosure, because the copper particle 233*a* includes the anti-oxidation layer 233*c*, oxidation may not occur at or in the surface of the copper particle 233*a*, and the electrode parts 233 and 235 having excellent conductivity may be configured.

With reference to FIGS. 3C and 4, one of the electrode parts 233 and 235 may further include one conductive particle 233*b*.

For example, the conductive particle 233*b* may be configured between copper particles 233*a* and may form a conductive path, thereby further improving an electrical characteristic of the electrode parts 233 and 235. For example, the conductive particle 233*b* may be carbon black or a carbon black nanoparticle, but embodiments of the present disclosure are not limited thereto. As another example, the conductive particle 233*b* may be configured with or in at least one of a silver (Ag) nanoparticle, a nickel (Ni) nanoparticle, and a gold (Au) nanoparticle, and the silver (Ag) nanoparticle, the nickel (Ni) nanoparticle, and the gold (Au) nanoparticle may be good in conductivity, thereby further improving an electrical characteristic of the electrode parts 233 and 235.

According to an example embodiment of the present disclosure, the conductive particle 233*b* may form a conductive path between the copper particles 233*a* to further improve an electrical characteristic of the electrode parts 233 and 235 and may decrease the occurrence of a void in the electrode parts 233 and 235 and/or an interface between the electrode parts 233 and 235 and a protection member, thereby enhancing the reliability of a vibration device. For example, the conductive particle 233*b* may minimize a contact between a binder 20 and the vibration part 231, and thus, electrical transfer in the electrode parts 233 and 235 may be well performed, thereby further improving an electrical characteristic of the electrode parts 233 and 235. Accordingly, because the conductive particle 233*b* decreases the occurrence of a void in the electrode parts 233 and 235 and/or the interface between the electrode parts 233 and 235 and the protection member, a density in the electrode parts 233 and 235 and/or the interface between the electrode parts 233 and 235 and the protection member may be enhanced, and an adhesive force with the protection member may be further enhanced.

With reference to FIG. 4, one of the electrode parts 233 and 235 may further include the binder 20. For example, the binder 20 may include a material capable of being cured at a low temperature. Accordingly, out-gassing may not occur at a high temperature at which a vibration device operates, and thus, a low temperature process may be possible, thereby enhancing the reliability of the vibration device. For example, the binder 20 may include an epoxy-based material, but embodiments of the present disclosure are not limited thereto. For example, the binder 20 may be an epoxy-based binder matrix, but embodiments of the present disclosure are not limited thereto. For example, the binder 20 may be a base or binder matrix, but embodiments of the present disclosure are not limited thereto.

For example, the epoxy-based binder 20 may include a material which is capable of a complete curing reaction in a curing process of the vibration part 231 and does not react in a drying process of volatilizing a solvent. The epoxy-based binder 20 may enhance an adhesive force between the vibration part 231 and the protection member.

According to an example embodiment of the present disclosure, a content of conductive particles 233*b* and/or a content of binders 20 may be changed based on a content of anti-oxidation layers 233*c* and copper (Cu) particles 233*a* included in the electrode parts 233 and 235.

According to an example embodiment of the present disclosure, the copper particles 233*a*, the conductive particles 233*b*, and anti-oxidation layers 233*c* are surrounded by the binders 20.

According to an example embodiment of the present disclosure, a sum of a content of metal and a content of anti-oxidation layers 233*c* may be 55 wt % to 60 wt % of the weight of the electrode part 233. For example, a sum of a content of copper particles 233*a* and a content of anti-oxidation layers 233*c* may be 55 wt % to 60 wt % of the weight of the electrode part 233. In this case, a thickness of each of the electrode parts 233 and 235 may be configured in about 7 μm to about 8 μm, but embodiments of the present disclosure are not limited thereto. A content of conductive particles 233*b* may be less than or equal to 5% of the sum of a content of metal and a content of anti-oxidation layers 233*c*. For example, a content of conductive particles 233*b* may be less than or equal to 5% of the sum of a content of copper particles 233*a* and a content of anti-oxidation layers 233*c*. For example, when the sum of a content of copper particles 233*a* and a content of anti-oxidation layers 233*c* is 60 wt %, a content of conductive particles 233*b* may be 3 wt % or less. According to an example embodiment of the present disclosure, a sum of a content of copper particles 233*a*, a content of anti-oxidation layers 233*c*, and a content of conductive particles may be about 55 wt % or more, but embodiments of the present disclosure are not limited thereto. According to an example embodiment of the present disclosure, a content of binders 20 may be 8 wt % to 12 wt % of the sum of a content of metal and a content of anti-oxidation layers 233*c*, but embodiments of the present disclosure are not limited thereto. For example, a content of binders 20 may be 8 wt % to 12 wt % of the sum of a content of copper particles 233*a* and a content of anti-oxidation layers 233*c*, but embodiments of the present disclosure are not limited thereto. When the sum of a content of copper particles 233*a* and a content of anti-oxidation layers 233*c* is 55 wt % to 60 wt % of the weight of the electrode part 233, a sufficient surface area with the vibration part 231 may be obtained in forming the electrode parts 233 and 235, and thus, an electrical characteristic of the electrode parts 233 and 235 may be improved and, for example, a minimum thickness of each of the electrode parts 233 and 235 may be formed to be 5 μm or more.

According to an example embodiment of the present disclosure, a sum of a content of metal and a content of anti-oxidation layers 233*c* may be 45 wt % to 55 wt % of the weight of the electrode part 233. For example, a sum of a content of copper particles 233*a* and a content of anti-oxidation layers 233*c* may be 45 wt % to 55 wt % of the weight of the electrode part 233. In this case, a thickness of each of the electrode parts 233 and 235 may be (or may be configured to be) about 5 μm to about 7 μm, but embodiments of the present disclosure are not limited thereto. For example, a content of conductive particles 233*b* may be greater than 0% but less than or equal to 10% of the sum of a content of copper particles 233*a* and a content of anti-oxidation layers 233*c*. For example, when the sum of a content of copper particles 233*a* and a content of anti-oxidation layers 233*c* is 55 wt %, a content of conductive particles 233*b* may be 5.5 wt % or less. According to an example embodiment of the present disclosure, a content of binders 20 may be 13 wt % to 15 wt % of the sum of a content of copper particles 233*a* and a content of anti-oxidation layers 233*c*, but embodiments of the present disclosure are not limited thereto. When the sum of a content of copper particles 233*a* and a content of anti-oxidation layers 233*c* is less than 45 wt %, a sufficient surface area with the vibration part 231 may not be obtained in forming the electrode parts 233 and 235, and thus, an electrical characteristic of the electrode parts 233 and 235 may be reduced and it may be difficult to form a minimum thickness (for example, 5 μm or more) of each of the electrode parts 233 and 235. Comparing with a case where the sum of a content of copper particles 233*a* and a content of anti-oxidation layers 233*c* is 55 wt % to 60 wt %, when the sum of a content of copper particles 233*a* and a content of anti-oxidation layers 233*c* is 45 wt % to 55 wt % of the weight of the electrode part 233, a content of conductive particles 233*b* may be changed from 5% to 10% and a content of binders 20 may be changed from 8 wt % to 10 wt % to 13 wt % to 15 wt %, and thus, a viscosity of a metal paste may increase in forming the electrode parts 233 and 235. Accordingly, a reduction in electrical characteristic of the electrode parts 233 and 235 may be prevented.

According to an example embodiment of the present disclosure, a sum of a content of metal and a content of anti-oxidation layers 233*c* may be 60 wt % to 70 wt % of the weight of the electrode part 233. For example, a sum of a content of copper particles 233*a* and a content of anti-oxidation layers 233*c* may be 60 wt % to 70 wt % of the weight of the electrode part 233. In this case, a thickness of each of the electrode parts 233 and 235 may be configured to be about 8 μm to about 10 μm, but embodiments of the present disclosure are not limited thereto. For example, a content of conductive particles 233*b* may be less than or equal to 5% of the sum of a content of copper particles 233*a* and a content of anti-oxidation layers 233*c*. For example, when the sum of a content of copper particles 233*a* and a content of anti-oxidation layers 233*c* is 70 wt %, a content of conductive particles 233*b* may be 3.5 wt % or less (but greater than 0 wt %). According to an example embodiment of the present disclosure, a content of binders 20 may be 8 wt % to 10 wt % of the sum of a content of copper particles 233*a* and a content of anti-oxidation layers 233*c*, but embodiments of the present disclosure are not limited thereto. When the sum of a content of copper particles 233*a* and a content of anti-oxidation layers 233*c* is 60 wt % to 70 wt % of the weight of the electrode part 233, viscosity may increase based on a high content of copper particles 233*a* and a dispersion characteristic of the copper particle 233*a* in the base 20 may be reduced, and thus, a content of binders 20 may be configured to be low.

According to an example embodiment of the present disclosure, the sum of a content of metal and a content of anti-oxidation layers 233*c* may be configured to be 45 wt % to 70 wt % of the weight of the electrode part 233. For example, the sum of a content of copper particles 233*a* and a content of anti-oxidation layers 233*c* may be configured to be 45 wt % to 70 wt % of the weight of the electrode part 233. Accordingly, an electrical characteristic of the electrode parts 233 and 235 and a viscosity of a metal paste in forming the electrode parts 233 and 235 may be secured.

A content of conductive particles 233*b* according to an example embodiment of the present disclosure may be 5% to 10% of the sum of a content of copper particles 233*a* and a content of anti-oxidation layers 233*c*. For example, when a content of conductive particles 233*b* is less than 5% of the sum of a content of copper particles 233*a* and a content of anti-oxidation layers 233*c*, it may be difficult to form a conductive path between the copper particles 233*a*, and thus, a problem may occur where an electrical characteristic of the electrode parts 233 and 235 is reduced. When a content of conductive particles 233*b* is more than 10% of the sum of a content of copper particles 233*a* and a content of anti-oxidation layers 233*c*, the conductivity of the conductive particles 233*b* (for example, carbon black) may be lower than that of copper, and thus, when a content of conductive particles 233*b* increases, a problem where a surface resistance increases may occur.

A content of binders 20 according to an example embodiment of the present disclosure may be 8 wt % to 15 wt % of the sum of a content of copper particles 233*a* and a content of anti-oxidation layers 233*c*. When a content of binders 20 is less than 8 wt % of the sum of a content of copper particles 233*a* and a content of anti-oxidation layers 233*c*, a problem may occur where the viscosity and/or thermal stability of the electrode parts 233 and 235 are/is reduced. When a content of binders 20 is more than 15 wt % of the sum of a content of copper particles 233*a* and a content of anti-oxidation layers 233*c*, a problem may occur where a surface resistance of the electrode parts 233 and 235 increases and an electrical characteristic decreases.

According to an example embodiment of the present disclosure, a size of the copper particle 233*a* may be 5 μm, but embodiments of the present disclosure are not limited thereto. For example, when a size of the copper particle 233*a* is 5 μm, a dispersion characteristic in a binder matrix of the base 20 may be enhanced, and a surface area of the electrode parts 233 and 235 may increase. Accordingly, an electrical characteristic of the electrode parts 233 and 235 may be improved. For example, when a size of the copper particle 233*a* is more than 5 μm, the number of copper particles 233*a* in the binder matrix of the base 20 may increase, and thus, the copper particles 233*a* may be vulnerable to oxidation, causing a reduction in electrical characteristic of the electrode parts 233 and 235. For example, when a size of the copper particle 233*a* is less than 5 μm, a dispersion characteristic in the binder matrix of the base 20 may be reduced, and a surface area of the electrode parts 233 and 235 may decrease. Accordingly, an electrical characteristic of the electrode parts 233 and 235 may be reduced.

A process of forming the electrode parts 233 and 235 is described in more detail below.

The anti-oxidation layer 233*c* may be formed on the surface of the copper particle 233*a*.

Further, the copper particle 233*a* and the anti-oxidation layer 233*c* may be mixed with the conductive particle 235*b*, the binder 20, a solvent, and an additive, thereby manufacturing a metal paste solution. The viscosity of the metal paste solution may be tens cps to thousands cps (centipoise), but embodiments of the present disclosure are not limited thereto.

For example, the solvent may be an organic solvent, but embodiments of the present disclosure are not limited thereto. When the solvent is an organic solvent, it may be favorable for compatibility with epoxy-based materials which are the copper particles 233*a* and the binders 20. For example, the solvent may be an ester-based solvent, but embodiments of the present disclosure are not limited thereto. The solvent may have a boiling point having a certain range so that the solvent is not volatilized at a room temperature in performing a printing process after a metal paste is manufactured. For example, a boiling point (for example, a drying temperature) of the solvent may be a temperature which does not react with an epoxy-based material which is the binder 20, but embodiments of the present disclosure are not limited thereto. For example, the solvent may be butyl acetate having a middle boiling point among ester-based materials, but embodiments of the present disclosure are not limited thereto. A solvent having a middle boiling point may be 100° C. to 130° C. For example, butyl acetate may all be volatilized through heating which is performed for a certain time at about 100° C. to 130° C.

As another example, a solvent having a low boiling point may be utilized or configured. A low boiling point of such a solvent may be 100° C. or less. For example, the solvent may be acetone, methyl ethyl ketone, methanol, ethanol, ethyl acetate, but embodiments of the present disclosure are not limited thereto. As another example, a solvent having a high boiling point may be utilized or configured. A high boiling point of such a solvent may be 150° C. or more. For example, the solvent may be toluene, amyl acetate, butyl acetate, butanol, or methyl isobutyl ketone, but embodiments of the present disclosure are not limited thereto. When a solvent having a low boiling point and a high boiling point is utilized or configured, a drying process and a curing process may be performed by adjusting a drying temperature.

For example, the additive may be a reductant, an auxiliary dispersant, a wetting agent, and a curing agent or the like, but embodiments of the present disclosure are not limited thereto. The reductant may prevent the oxidation of the copper particle 233*a*. The auxiliary dispersant may increase the dispersibility of the copper particle 233*a*. For example, the additive may be 1 wt % to 3 wt % of the sum of a content of copper particles 233*a* and a content of anti-oxidation layers 233*c*, but embodiments of the present disclosure are not limited thereto.

According to an example embodiment of the present disclosure, the metal paste may further include a dispersant. The dispersant may be polyethylene glycol, but embodiments of the present disclosure are not limited thereto. For example, when the dispersant is a dispersant used in the metal paste, the dispersant may be applied. For example, the dispersant may be 1 wt % to 3 wt % of the sum of a content of copper particles 233*a* and a content of anti-oxidation layers 233*c*, but embodiments of the present disclosure are not limited thereto. For example, a content of dispersants may be set based on the sum of a content of copper particles 233*a* and a content of anti-oxidation layers 233*c*. For example, when the sum of a content of copper particles 233*a* and a content of anti-oxidation layers 233*c* is high, a content of dispersants may increase in proportion thereto.

In one or more aspects, one or more descriptions provided herein with respect to the copper particles 233*a*, the conductive particles 233*b*, and the anti-oxidation layers 233*c* of the electrode part 233 may apply to the copper particles 235*a*, the conductive particles 235*b*, and the anti-oxidation layers 235*c* of the electrode part 235, respectively. In one or more aspects, one or more descriptions provided herein with respect to the electrode part 233 may apply to the electrode part 235. According to an example embodiment of the present disclosure, the sum of a content of metal and a content of anti-oxidation layers 235*c* may be configured to be 45 wt % to 70 wt % of the weight of the electrode part 235. For example, the sum of a content of copper particles 235*a* and a content of anti-oxidation layers 235*c* may be configured to be 45 wt % to 70 wt % of the weight of the electrode part 235.

In one or more aspects, the symbol % may sometimes refer to weight percentage (wt %).

In addition, the metal paste may be formed or coated on a surface of a vibration part. A method of forming or coating the metal paste on the surface of the vibration part may be performed by using a printing process, but embodiments of the present disclosure are not limited thereto. Furthermore, the electrode parts 233 and 235 may be formed on each surface of the vibration part by drying and curing the metal paste. The solvent may be volatilized by a drying process and a curing process, and a curing reaction of an epoxy-based material which is the binder 20 may be performed. A thickness of each of the electrode parts 233 and 235 may be 5 μm to 10 μm, but embodiments of the present disclosure are not limited thereto. For example, a thickness of each of the electrode parts 233 and 235 may be 5 μm to 8 μm, but embodiments of the present disclosure are not limited thereto.

Table 1 shows a result obtained by measuring an electrical characteristic according to an experimental example and an example embodiment of the present disclosure.

TABLE 1

| Division | | Surface Resistance | Capacitance | Copper oxidation or not |
|---|---|---|---|---|
| Example embodiment | Before-reliability | 1.0 | 1.3 | X |
| | After-reliability | 1.1 | 1.3 | X |
| Experimental example | Before-reliability | 1.0 | 1.3 | ○ |
| | After-reliability | 3.0 | 1.0 | ◎ |

With reference to Table 1, in an example embodiment, an electrode part includes conductive particles of carbon black and copper. In the experimental example, an electrode part include only copper.

Before-reliability represents that the electrode part is formed at a vibration part, and after-reliability represents that an electrical characteristic has been measured after about 100 hours to about 500 hours have elapsed at a temperature of 50° C. and a humidity of 80% after the electrode part is formed at a vibration part. For example, the vibration part includes PZT, but embodiments of the present disclosure are not limited thereto. The description of Table 1 may be identically applied to a vibration apparatus 200 and electrode parts of vibration apparatuses 201 to 204 described below with reference to FIGS. 7 to 14. For example, even when a vibration part includes an inorganic material or includes an inorganic material and an organic material, the description of the electrode part of Table 1 may be identically applied. When a vibration part includes an inorganic material, a sound pressure level may be further enhanced and a capacitance value may increase slightly more than a case where the vibration part includes an inorganic material and an organic material.

In the measurement of a surface resistance, a surface resistance has been measured at or in a surface of the electrode part by using a probe apparatus (4-point-probe) after the electrode part is formed in the vibration part. A measurement apparatus for a surface resistance does not limit the descriptions of the present disclosure.

In the measurement of a capacitance, the capacitance of the vibration part where the electrode part is formed based on an input signal of 1 kHz has been measured by using an LCR meter apparatus. The LCR meter apparatus may apply a voltage to the vibration part which is to be measured, and at this time, an LCR value may be measured by sensing a flowing current. A measurement apparatus for a capacitance does not limit the descriptions of the present disclosure.

The surface resistance (unit: Ω/square) may be a factor which affects the vibration part. When a surface resistance of each of the electrode parts 233 and 235 is low, a high internal electric field may be formed in the vibration part, and thus, polarization (or poling) within the vibration part may increase. Accordingly, the contraction and/or expansion of the vibration part may increase, and thus, a sound pressure level characteristic of a vibration device may increase. According to an example embodiment of the present disclosure, before-reliability surface resistance has been measured to be 1.0, and after-reliability surface resistance has been measured to be 1.1. In an example embodiment of the present disclosure, before-reliability surface resistance and after-reliability surface resistance are maintained, and thus, may have a stable and excellent sound pressure level characteristic. In the experimental example, before-reliability surface resistance has been measured to be 1.0, and after-reliability surface resistance has been measured to be 3.0. In the experimental example, before-reliability surface resistance and after-reliability surface resistance are changed, and thus, a sound pressure level characteristic may be reduced.

The capacitance (unit: μf) may be a value representing a polarization level of the vibration part. The capacitance may be affected by a characteristic of the electrode parts 233 and 235 and the vibration part. As the surface resistance decreases, a capacitance value may increase. As an interface characteristic of the electrode parts 233 and 235 and the vibration part is enhanced, the capacitance value may increase. In an example embodiment of the present disclosure, before-reliability capacitor value has been measured to be 1.3, and after-reliability capacitance value has been measured to be 1.3. In an example embodiment of the present disclosure, before-reliability capacitance value and after-reliability capacitance value are maintained, and thus, may have a stable and excellent sound pressure level characteristic. In the experimental example, before-reliability capacitance value has been measured to be 1.3, and after-reliability capacitance value has been measured to be 1.0. In the experimental example, before-reliability surface resistance and after-reliability surface resistance are changed, and thus, a sound pressure level characteristic may be reduced.

In an example embodiment of the present disclosure, the oxidation of copper has not occurred in all of before-reliability and after-reliability. In the experimental example, the oxidation of copper has occurred in all of before-reliability and after-reliability. In the experimental example, the oxidation of copper has occurred more in after-reliability than before-reliability.

According to an example embodiment of the present disclosure, because an electrode part including copper and conductive particles is configured or utilized, a surface resistance and a capacitance value may not be changed in before-reliability and after-reliability, and thus, an electrical characteristic of the electrode part may be improved, whereby the electrode part may have a stable and excellent sound pressure level characteristic. According to an example embodiment of the present disclosure, because the electrode part including copper and conductive particles is configured or utilized, copper may not be oxidized in before-reliability and after-reliability, and thus, the reliability of the electrode part may be secured.

Table 2 shows a result obtained by measuring an electrical characteristic, an adhesive force, an average sound pressure level, and a sound pressure level characteristic according to an experimental example and an example embodiment of the present disclosure.

TABLE 2

| Division | Surface Resistance | Capacitance | Adhesive Force | Average Sound Pressure Level | Sound Pressure Level Characteristic |
|---|---|---|---|---|---|
| Example embodiment | 1.0 | 1.5 | 0.7 | 75.5 | ±0.5 |
| Experimental example 1 | 0.1 | 1.6 | 0.7 | 75.5 | ±0.5 |
| Experimental example 2 | 1.0 | 1.2 | 0.2 | 72.0 | −5.0 |
| Experimental example 3 | <10 | 1.1 | 0.7 | 71.6 | ±0.5 |
| Experimental example 4 | 2.0 | 1.5 | 0.4 | 74.5 | 1.0 |

With reference to Table 2, in an example embodiment of the present disclosure, an electrode part including conductive particles, an anti-oxidation layer, and binders is configured or utilized. In the experimental example 1, an electrode part is configured with silver (Ag) formed through firing performed at a high temperature (650° C.). In the experimental example 2, an electrode part is configured with silver (Ag) having a flake particle shape. In the experimental example 3, an electrode part is configured as a carbon electrode having a fine particle shape. In the experimental example 4, an electrode part is configured as a carbon electrode having a fine particle shape and silver (Ag) having a flake particle shape. In an example embodiment of the present disclosure and the experimental examples 2 to 4, a firing process has been performed at a low temperature. In the electrode part of an example embodiment of the present disclosure, firing has been performed at 150° C. to 180° C. In the experimental examples 2 to 4, firing has been performed at 150° C. For example, in an example embodiment of the present disclosure and the experimental examples 1 to 4, the electrode part is configured at a vibration part, and the vibration part configured with PZT, but embodiments of the present disclosure are not limited thereto. The description of Table 2 may be identically applied to the vibration apparatus 200 and the electrode parts of the vibration apparatuses 201 to 204 described below with reference to FIGS. 7 to 14. For example, even when a vibration part includes an inorganic material or includes an inorganic material and an organic material, the description of the electrode part of Table 2 may be identically applied.

In Table 2, the surface resistance (unit: Ω/square) and the capacitance (unit: μf) may be the same as the descriptions of Table 1, and thus, repeated descriptions are omitted.

The surface resistance of an example embodiment of the present disclosure has been measured to be 1.0. The surface resistance of the experimental example 1 has been measured to be 0.1, and the surface resistance of the experimental example 2 has been measured to be 1.0. The surface resistance of the experimental example 3 has been measured to be 10 or more, and the surface resistance of the experimental example 4 has been measured to be 2.0. The surface resistance of an example embodiment of the present disclosure may be the same as the surface resistance of the experimental example 2, but an electrode of the experimental example 2 includes silver (Ag), whereby the manufacturing cost may increase. Comparing with the surface resistances of an example embodiment of the present disclosure and the experimental examples 2 to 4, the surface resistance of the experimental example 1 is low, but in the experimental example 1, a firing process has been performed at a high temperature, whereby it is difficult to perform a process. Comparing with the surface resistances of an example embodiment of the present disclosure, the experimental example 1, the experimental example 3, and the experimental example 4, the surface resistance of the experimental example 3 may be high, and thus, a sound pressure level characteristic may be low. The surface resistance of the experimental example 4 may be similar to an example embodiment of the present disclosure but the experimental example 4 is configured with two electrode layers, and due to this, a process may be complicated and the manufacturing cost may increase due to silver (Ag).

The capacitance value of an example embodiment of the present disclosure has been measured to be 1.5. The capacitance value of the experimental example 1 has been measured to be 1.6, and the capacitance value of the experimental example 2 has been measured to be 1.2. The capacitance value of the experimental example 3 has been measured to be 1.1, and the capacitance value of the experimental example 4 has been measured to be 1.5. The capacitance value of an example embodiment of the present disclosure may be a same as the capacitance value of the experimental example 4, but because the experimental example 4 is configured with two electrode layers, a process may be complicated and the manufacturing cost may increase due to silver (Ag). The capacitance value of an example embodiment of the present disclosure may be similar to the capacitance value of the experimental example 1, but because the electrode of the experimental example 1 includes silver (Ag), the manufacturing cost may increase and a firing process may be performed at a high temperature, whereby it is difficult to perform a process. The capacitance values of the experimental example 2 and the experimental example 3 may be lower than the capacitance value of an example embodiment of the present disclosure, a sound pressure level characteristic may be reduced.

The adhesive force (unit: Kgf/25 mm) may represent an adhesive force between an electrode part and a protection member. The adhesive force may be measured by a peel process, but embodiments of the present disclosure are not limited thereto. When the peel is a force of when detached from a base material, peel may be a force per unit area. Further, 180° peel may be a method of pulling at a certain speed in a horizontal opposite direction.

The adhesive forces of an example embodiment of the present disclosure has been measured to be 0.7. The adhesive forces of the experimental example 1 has been measured to be 0.7, and the adhesive forces of the experimental example 2 has been measured to be 0.2. The adhesive forces of the experimental example 3 has been measured to be 0.7, and the adhesive forces of the experimental example 4 has been measured to be 0.4. The adhesive forces of an example embodiment of the present disclosure, the experimental example 1, and the experimental example 3 may be a same but the electrode of the experimental example 1 includes silver (Ag), the manufacturing cost may increase and a firing process may be performed at a high temperature, whereby it is difficult to perform a process. The surface resistance of the experimental example 3 may be higher than the surface resistance of an example embodiment, and thus, a sound pressure level characteristic may be reduced. The adhesive forces of the experimental example 2 and the experimental example 4 may be lower than the adhesive force of an example embodiment of the present disclosure, and due to this, it may be difficult to secure reliability and stability.

The average sound pressure level (unit: dB (decibel)) has been measured based on 150 Hz to 8 kHz. The average sound pressure level of an example embodiment has been measured to be 75.5 dB. The average sound pressure level of the experimental example 1 has been measured to be 75.5, and the average sound pressure level of the experimental example 2 has been measured to be 72.0. The average sound pressure level of the experimental example 3 has been measured to be 71.6, and the average sound pressure level of the experimental example 4 has been measured to be 74.5. The average sound pressure levels of an example embodiment of the present disclosure and the experimental example 1 may be a same but the electrode of the experimental example 1 includes silver (Ag), and thus, the manufacturing cost may increase and a firing process may be performed at a high temperature, whereby it is difficult to perform a process. The average sound pressure levels of the experimental example 2 and the experimental example 3 may be lower than the average sound pressure level of an example embodiment of the present disclosure and the capacitance value may be low, and thus, it may be seen that a sound pressure level is reduced. The average sound pressure level of the experimental example 4 may be lower than the average sound pressure level of an example embodiment of the present disclosure and the surface resistance of the experimental example 4 may be higher than the surface resistance of an example embodiment of the present disclosure, and thus, it may be seen that a sound pressure level is reduced.

The sound pressure level characteristic (unit: dB (decibel) may represent a variation of a sound pressure level after 500 hours elapse under a reliability condition. For example, the reliability condition may be a condition where a temperature is 50° C. and humidity is 80%, but embodiments of the present disclosure are not limited thereto. The sound pressure level characteristic of an example embodiment of the present disclosure has been measured to be ±0.5 dB. The sound pressure level characteristic of the experimental example 1 has been measured to be ±0.5 dB, and the sound pressure level characteristic of the experimental example 2 has been measured to be −5.0 dB. The sound pressure level characteristic of the experimental example 3 has been measured to be ±0.5 dB, and the sound pressure level characteristic of the experimental example 4 has been measured to be ±1.0 dB. It may be seen that the average sound pressure level of the experimental example 2 is changed to be greater than that of an example embodiment of the present disclosure. It may be seen that the average sound pressure level of the experimental example 4 is changed to be greater than that of an example embodiment of the present disclosure. In the electrode part according to an example embodiment of the present disclosure, it may be seen that a variation of a sound pressure level is small after the reliability condition.

Each electrode part according to an example embodiment of the present disclosure may be configured to have (or may be configured as) a single layer. According to an example embodiment of the present disclosure, because each electrode part is configured as one electrode layer including copper, a surface resistance may be low and a capacitance value may be large, and thus, an electrical characteristic of each electrode part may be improved, thereby realizing a stable and excellent sound pressure level characteristic. According to an example embodiment of the present disclosure, because each electrode part is configured as one electrode layer including copper, it may be seen that an average sound pressure level increases and a variation of a sound pressure level under the reliability condition is small.

Figure 5:
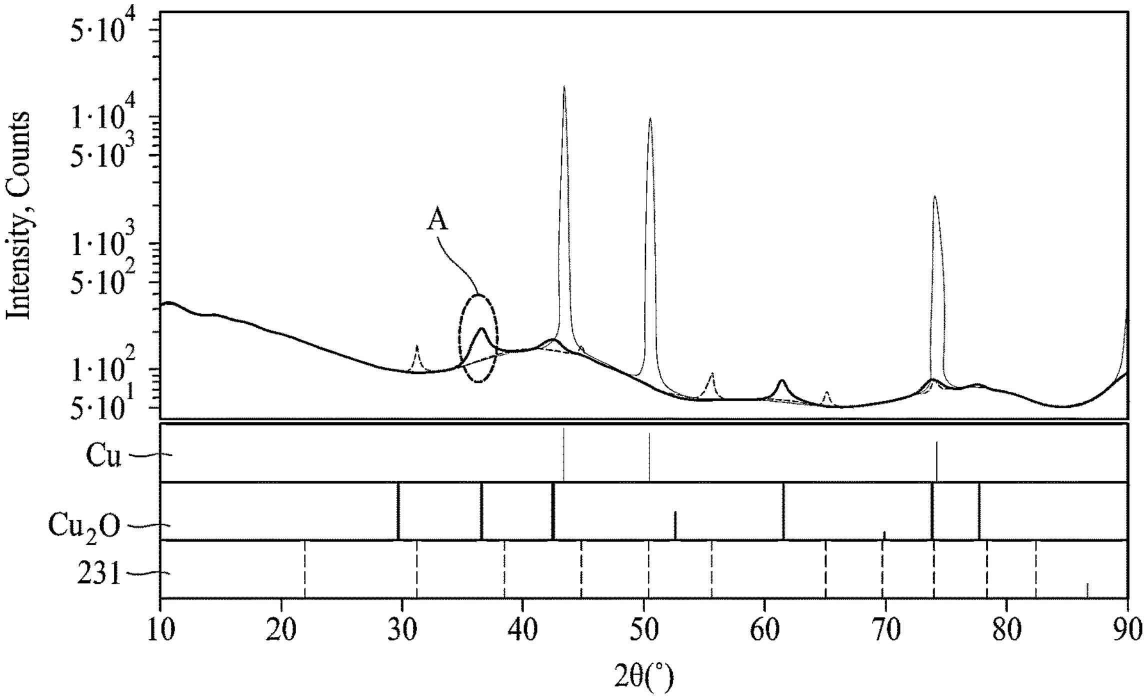
FIG. 5 illustrates X-ray diffraction (XRD) of an electrode part according to an experimental example.
Figure 6:
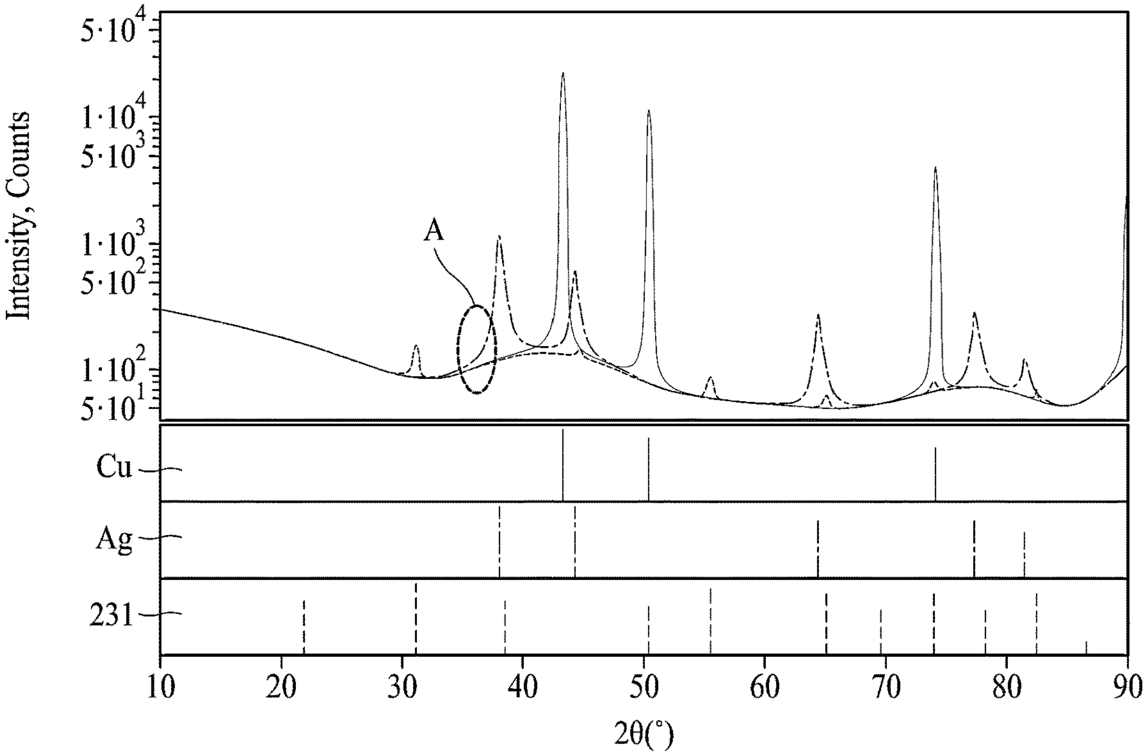
FIG. 6 illustrates X-ray diffraction (XRD) of an electrode part according to an example embodiment of the present disclosure.

FIG. 5 illustrates X-ray diffraction (XRD) of an electrode part according to an experimental example. FIG. 6 illustrates X-ray diffraction (XRD) of an electrode part according to an example embodiment of the present disclosure.

XRD analysis may be an analysis method which diffracts X-rays with respect to a desired sample and represents internal information about the sample as a graph.

In FIGS. 5 and 6, the abscissa axis represents 20)(°, and the ordinate axis represents intensity. In an experimental example of FIG. 5, an electrode part including copper is configured in the vibration part 231. In an example embodiment of FIG. 6, an electrode part is configured with copper and an anti-oxidation layer in the vibration part 231. The anti-oxidation layer includes silver (Ag), but embodiments of the present disclosure are not limited thereto.

In FIG. 5, a dotted line represents the vibration part 231, a thin solid line represents copper (Cu), and a thick solid line represents $Cu_2O$. In FIG. 6, a dotted line represents the vibration part 231, a thin solid line represents copper (Cu), and a dash-single dotted line represents silver (Ag).

With reference to FIG. 5, it may be seen that a peak of $Cu_2O$ appears at a portion illustrated by "A". It may be seen that a peak of $Cu_2O$ appears at about 36.5 degrees. It may be seen that a peak of Cu appears at about 48 degrees to 49 degrees.

With reference to FIG. 6, it may be seen that there is hardly a peak of $Cu_2O$ at a portion illustrated by "A". In FIG. 6, it may be seen that a peak of Cu appears at about 48 degrees to 49 degrees. It may be seen that a peak of silver (Ag) appears at about 38 degrees. Therefore, it may be seen that silver (Ag) which an anti-oxidation layer is configured near copper (Cu).

According to an example embodiment of the present disclosure, because copper and the anti-oxidation layer are configured, it may be seen that oxidation does not occur at a surface of copper.

Figure 7:
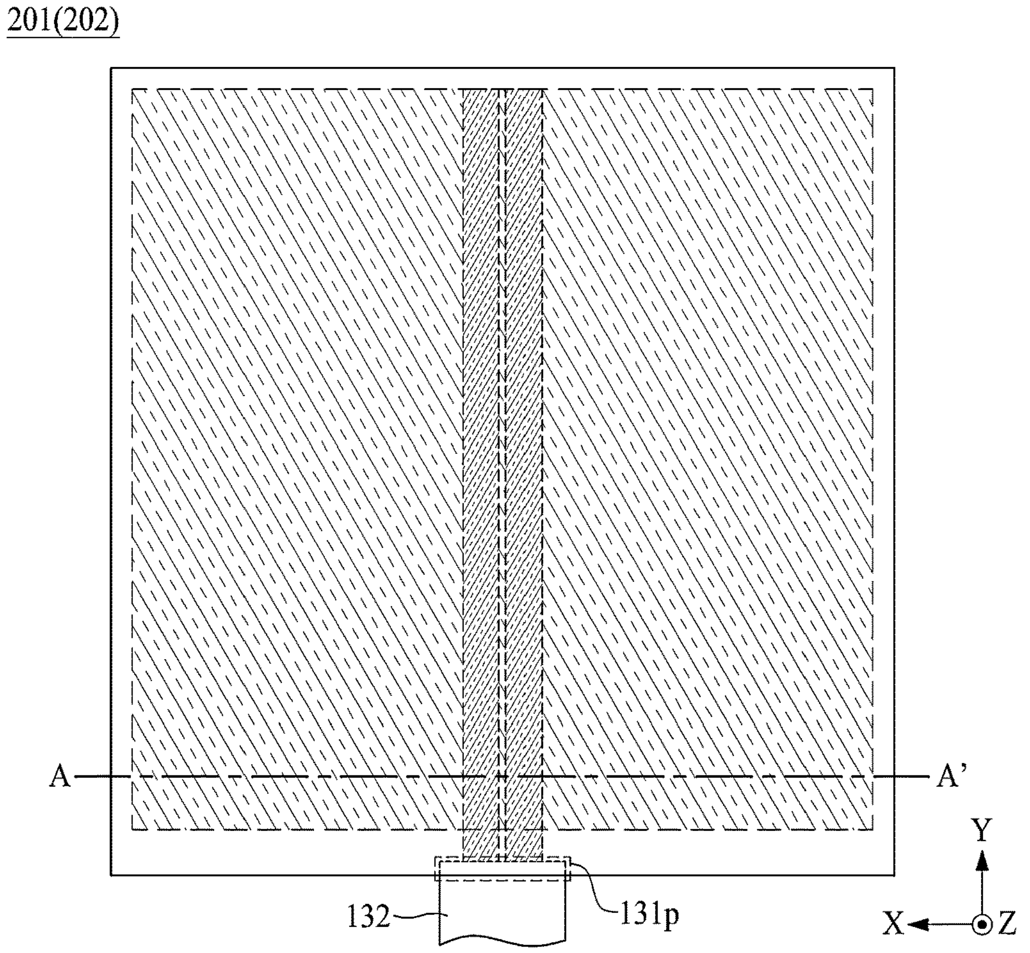
FIG. 7 illustrates a vibration device according to an example embodiment of the present disclosure.
Figure 8:
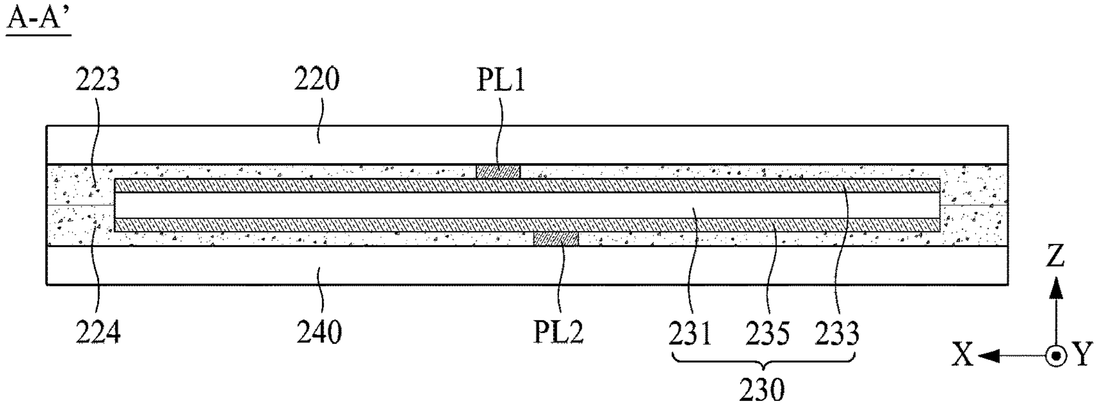
FIG. 8 is a cross-sectional view taken along line A-A' illustrated in FIG. 7 according to an example embodiment of the present disclosure.

FIG. 7 illustrates a vibration device according to an example embodiment of the present disclosure. FIG. 8 is a cross-sectional view taken along line A-A' illustrated in FIG. 7 according to an example embodiment of the present disclosure.

With reference to FIGS. 7 and 8, the vibration apparatus 201 according to an example embodiment of the present disclosure may include a vibration device 230.

The vibration device 230 may include a tetragonal shape which has a first length parallel to a first direction X and a second length parallel to a second direction Y. For example, the vibration device 230 may include a square shape where the first length is a same as the second length. However, embodiments of the present disclosure are not limited thereto, and the vibration device 230 may include a rectangular shape where one of the first length and the second length is greater than the other length, a non-tetragonal shape, a circular shape, or an oval shape.

The vibration device 230 according to an example embodiment of the present disclosure may include a vibration part 231, a first electrode part 233, and a second electrode part 235. A description of the vibration part 231, the first electrode part 233, and the second electrode part 235 may be the same as that of descriptions given above with reference to FIGS. 3A to 4, and thus, repeated descriptions may be omitted.

The vibration device 230 according to an example embodiment of the present disclosure may further include a first protection member 220 and a second protection member 240. A description of the first protection member 220 and the second protection member 240 may be the same as that of descriptions given above with reference to FIG. 1, and thus, repeated descriptions may be omitted.

The first protection member 220 according to an example embodiment of the present disclosure may be connected or coupled to the first electrode part 233 by a first adhesive layer 223. For example, the first protection member 220 may be connected or coupled to a first surface of the vibration device 230 or the first electrode part 233 by a film laminating process by the first adhesive layer 223.

The second protection member 240 according to an example embodiment of the present disclosure may be connected or coupled to the second electrode part 235 by a second adhesive layer 224. For example, the second protection member 240 may be connected or coupled to a second surface of the vibration device 230 or the second electrode part 235 by a film laminating process by the second adhesive layer 224. A description of the first adhesive layer 223 and the second adhesive layer 224 may be the same as that of descriptions given above with reference to FIG. 1, and thus, repeated descriptions may be omitted.

The vibration device 230 according to an example embodiment of the present disclosure may further include a first power supply line PL1, a second power supply line PL2, and a pad part 131*p*.

The first power supply line PL1 may be disposed at the first protection member 220. For example, the first power supply line PL1 may be disposed between the first electrode part 233 and the first protection member 220 and may be electrically connected to the first electrode part 233. The first power supply line PL1 may be extended long along the second direction Y and may be electrically connected to a central portion of the first electrode part 233. As an example embodiment of the present disclosure, the first power supply line PL1 may be electrically connected to the first electrode part 233 by an anisotropic conductive film. As another example embodiment of the present disclosure, the first power supply line PL1 may be electrically connected to the first electrode part 233 through a conductive material (or particle) included in the first adhesive layer 223.

The second power supply line PL2 may be disposed at the second protection member 240. For example, the second power supply line PL2 may be disposed between the second electrode part 235 and the second protection member 240 and may be electrically connected to the second electrode part 235. The second power supply line PL2 may be extended long along the second direction Y and may be electrically connected to a central portion of the second electrode part 235. As an example embodiment of the present disclosure, the second power supply line PL2 may be electrically connected to the second electrode part 235 by an anisotropic conductive film. As another example embodiment of the present disclosure, the second power supply line PL2 may be electrically connected to the second electrode part 235 through a conductive material (or particle) included in the second adhesive layer 224.

According to an example embodiment of the present disclosure, the first power supply line PL1 may be disposed not to overlap the second power supply line PL2. When the first power supply line PL1 is disposed not to overlap the second power supply line PL2, the problem of a short circuit between the first power supply line PL1 and the second power supply line PL2 may be prevented.

The pad part 131*p* may be electrically connected to the first power supply line PL1 and the second power supply line PL2. For example, the pad part 131*p* may be configured at one periphery portion of any one of the first protection member 220 and the second protection member 240 to be electrically connected to one side (or one end) of each of the first power supply line PL1 and the second power supply line PL2.

The pad part 131*p* according to an example embodiment of the present disclosure may include a first pad electrode electrically connected to one end (or one side) of the first power supply line PL1, and a second pad electrode electrically connected to one end (or one side) of the second power supply line PL2.

The first pad electrode may be disposed at one periphery portion of any one of the first protection member 220 and the second protection member 240 to be electrically connected to one end (or one side) of the first power supply line PL1. For example, the first pad electrode may pass through any one of the first protection member 220 and the second protection member 240 to be electrically connected to one end (or one side) of the first power supply line PL1.

The second pad electrode may be disposed in parallel with the first pad electrode to be electrically connected to one end (or one side) of the second power supply line PL2. For example, the second pad electrode may pass through any one of the first protection member 220 and the second protection member 240 to be electrically connected to one end (or one side) of the second power supply line PL2.

According to an example embodiment of the present disclosure, each of the first power supply line PL1, the second power supply line PL2, and the pad part 131*p* may be configured to be transparent, translucent, or opaque.

The pad part 131*p* according to an example embodiment of the present disclosure may be electrically connected to a signal cable 132.

The signal cable 132 may be electrically connected to the pad part 131*p* disposed at the vibration device 230 and may supply the vibration device 230 with vibration driving signal (or a sound signal or a voice signal) provided from a sound processing circuit. The signal cable 132 according to an example embodiment of the present disclosure may include a first terminal electrically connected to the first pad electrode of the pad part 131*p* and a second terminal electrically connected to the second pad electrode of the pad part 131*p*. For example, the signal cable 132 may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data provided from an external sound data generating circuit part. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode part 233 through a first terminal of the signal cable 132, the first pad electrode of the pad part 131*p*, and the first power supply line PL1. The second vibration driving signal may be supplied to the second electrode part 235 through a second terminal of the signal cable 132, the second pad electrode of the pad part 131*p*, and the second power supply line PL2.

According to an example embodiment of the present disclosure, the signal cable 132 may be configured to be transparent, semitransparent, or opaque.

A portion of the signal cable 132 according to another example embodiment of the present disclosure may be accommodated (or inserted) at region between the first protection member 220 and the second protection member 240. For example, one periphery portion of the signal cable 132 may be accommodated (or inserted) at the region between the first protection member 220 and the second protection member 240, and thus, the signal cable 132 may be integrated into the vibration device 230. For example, the first pad electrode and the second pad electrode of the pad part 131*p* may be disposed at one periphery portion of any one of the first protection member 220 and the second protection member 240 and may be electrically connected to the signal cable 132 which is accommodated between the first protection member 220 and the second protection member 240.

Figure 9:
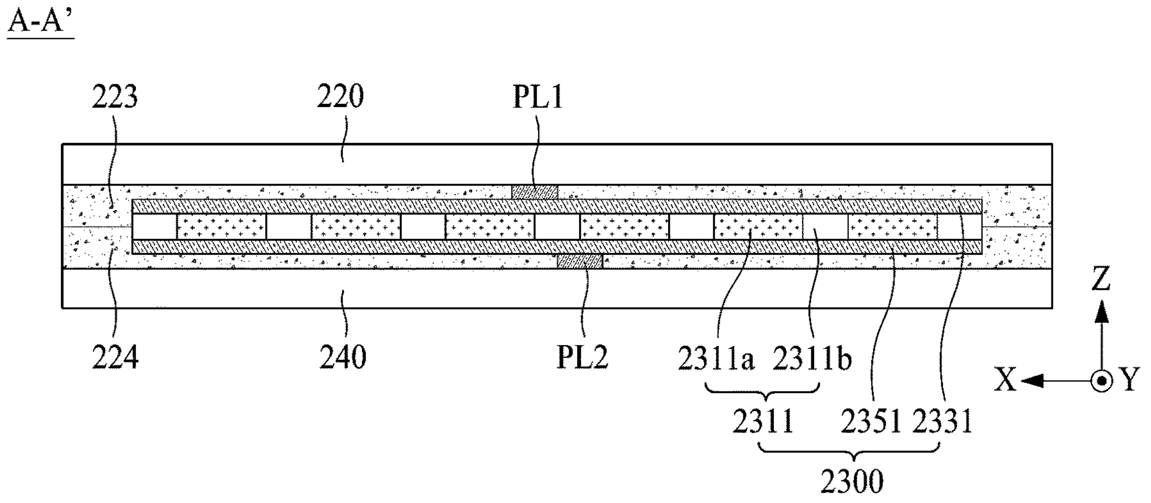
FIG. 9 is another cross-sectional view taken along line A-A' illustrated in FIG. 7 according to an example embodiment of the present disclosure.
Figure 10:
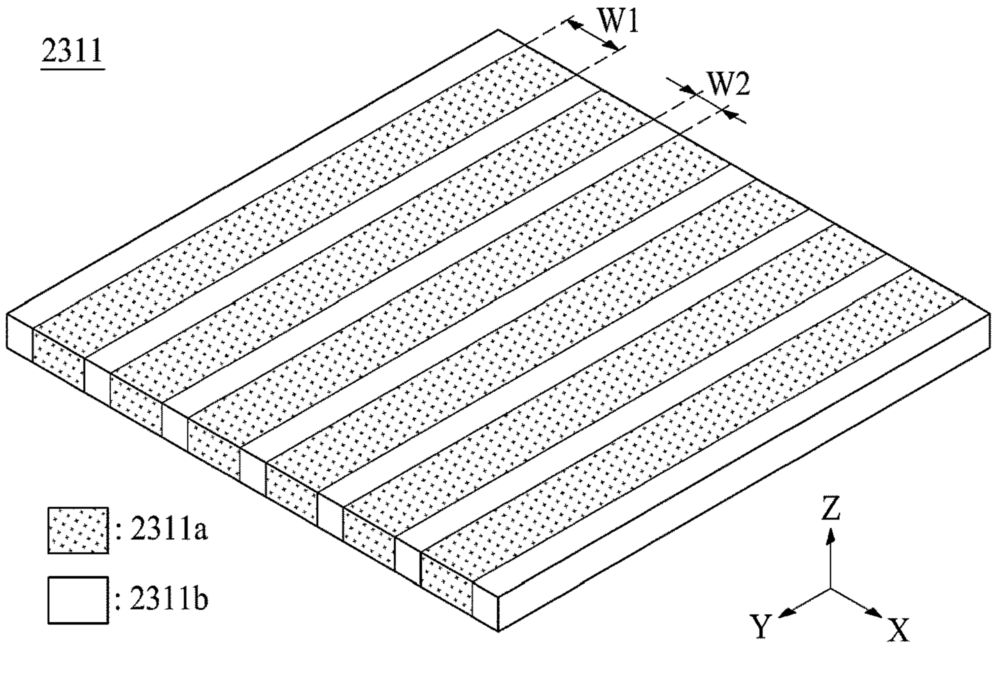
FIG. 10 illustrates a vibration part according to another example embodiment of the present disclosure.

FIG. 9 is another cross-sectional view taken along line A-A' illustrated in FIG. 7 according to an example embodiment of the present disclosure. FIG. 10 illustrates a vibration part according to another example embodiment of the present disclosure.

With reference to FIG. 9, the vibration apparatus 202 according to another example embodiment of the present disclosure may include one or more vibration devices 2300.

The one or more vibration devices 2300 may include a vibration part 2311, a first electrode part 2331, and a second electrode part 2351.

The vibration part 2311 may include a plurality of first portions 2311*a* and a plurality of second portions 2311*b*. For example, the plurality of first portions 2311*a* and the plurality of second portions 2311*b* may be alternately and repeatedly disposed along a first direction X (or a second direction Y). For example, the first direction X may be a widthwise direction of the vibration device 2300, the second direction Y may be a lengthwise direction of the vibration device 2300, but embodiments of the present disclosure are not limited thereto. For example, the first direction X may be the lengthwise direction of the vibration device 2300, and the second direction Y may be the widthwise direction of the vibration device 2300.

The one or more vibration devices 2300 according to another example embodiment of the present disclosure may be configured to have flexibility. For example, the one or more vibration devices 2300 may be configured to be bent in a non-planar shape including a curved surface. Accordingly, the one or more vibration devices 2300 according to an example embodiment of the present disclosure may be a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, and the like, but embodiments of the present disclosure are not limited thereto.

Each of the plurality of first portions 2311*a* may be configured as an inorganic material part. The inorganic material part may include a piezoelectric material, a composite piezoelectric material, or an electroactive material which includes a piezoelectric effect.

Each of the plurality of first portions 2311*a* may be configured as a ceramic-based material for generating a relatively strong vibration, or may be configured as a piezoelectric ceramic having a perovskite crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula "$ABO_3$", the "A" may include a divalent metal element, and the "B" may include a tetravalent metal element. As an example embodiment of the present disclosure, in the chemical formula "$ABO_3$", the "A", and the "B" may be cations, and the "O" may be anions. For example, each of the plurality of first portions 2311*a* may include one of lead titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The piezoelectric ceramic may be configured as a single crystalline ceramic having a crystalline structure, or may be configured as a ceramic material having a polycrystalline structure or polycrystalline ceramic. A piezoelectric material including the single crystalline ceramic may include $\alpha$-$AlPO_4$, $\alpha$-$SiO_2$, $LiNbO_3$, $Tb_2(MoO_4)_3$, $LizB_4O_7$, or ZnO, but embodiments of the present disclosure are not limited thereto. A piezoelectric material including the polycrystalline ceramic may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but embodiments of the present disclosure are not limited thereto.

With reference to FIG. 10, each of the plurality of first portions 2311*a* according to an example embodiment of the present disclosure may be disposed between the plurality of second portions 2311*b* and may have a first width W1 parallel to the first direction X (or the second direction Y) and a length parallel to the second direction Y (or the first direction X). Each of the plurality of second portions 2311*b* may have a second width W2 parallel to the first direction X (or the second direction Y) and may have a length parallel to the second direction Y (or the first direction X). The first width W1 may be a same as or different from the second width W2. For example, the first width W1 may be greater than the second width W2. For example, the first portion 2311*a* and the second portion 2311*b* may include a line shape or a stripe shape which has a same size or different sizes. Therefore, the vibration part 2311 may include a 2-2 composite structure having a piezoelectric characteristic of a 2-2 vibration mode, and thus, may have a resonance frequency of 20 kHz or less, but embodiments of the present disclosure are not limited thereto. For example, a resonance frequency of the vibration part 2311 may vary based on at least one or more of a shape, a length, and a thickness, or the like.

In the vibration part 2311, each of the plurality of first portions 2311*a* and the plurality of second portions 2311*b* may be disposed (or arranged) at a same plane (or a same layer) in parallel. Each of the plurality of second portions 2311*b* may be configured to fill a gap between two adjacent first portions of the plurality of first portions 2311*a* and may be connected or adhered to a first portion 2311*a* adjacent thereto. Therefore, the vibration part 2311 may extend by a desired size or length based on a side coupling (or connection) of the first portion 2311*a* and the second portion 2311*b*.

In the vibration part 2311, a width (or a size) W2 of each of the plurality of second portions 2311*b* may progressively decrease in a direction from a center portion to both peripheries (or both ends) of the vibration part 2311 or the vibration device 2300.

According to an example embodiment of the present disclosure, a second portion 2311*b* having a largest width W2 among the plurality of second portions 2311*b* may be located at a portion at which a highest stress may concentrate when the vibration part 2311 or the vibration device 2300 vibrates (or is vibrating) in a vertical direction Z (or a thickness direction). A second portion 2311*b* having a smallest width W2 among the plurality of second portions 2311*b* may be located at a portion where a relatively low stress may occur when the vibration part 2311 or the vibration device 2300 vibrates in the vertical direction Z. For example, the second portion 2311*b* having the largest width W2 among the plurality of second portions 2311*b* may be disposed at the center portion of the vibration part 2311, and the second portion 2311*b* having the smallest width W2 among the plurality of second portions 2311*b* may be disposed at each of the both peripheries of the vibration part 2311. Therefore, when the vibration part 2311 or the vibration device 2300 vibrates in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band.

In the vibration part 2311, each of the plurality of first portions 2311*a* may have different sizes (or widths). For example, a size (or a width) of each of the plurality of first portions 2311*a* may progressively decrease or increase in a direction from the center portion to the both peripheries (or both ends) of the vibration part 2311 or the vibration device 2300. Thus, in the vibration part 2311, a sound pressure level characteristic of a sound may be enhanced and a sound reproduction band may increase, based on various natural vibration frequencies according to a vibration of each of the plurality of first portions 2311*a* having different sizes.

The plurality of second portions 2311*b* may be disposed between the plurality of first portions 2311*a*. Therefore, in the vibration part 2311 or the vibration device 2300, vibration energy by a link in a unit lattice of each first portion 2311*a* may increase by a corresponding second portion 2311*b*, and thus, a vibration characteristic may increase, and a piezoelectric characteristic and flexibility may be secured. For example, the second portion 2311*b* may include one or more of an epoxy-based polymer, an acrylic-based polymer, and a silicone-based polymer, but embodiments of the present disclosure are not limited thereto.

The plurality of second portions 2311*b* according to an example embodiment of the present disclosure may be configured as an organic material part. For example, the organic material part may be disposed between the inorganic material parts, and thus, may absorb an impact applied to the inorganic material part (or the first portion), may release a stress concentrating on the inorganic material part to enhance the total durability of the vibration part 2311 or the vibration device 2300, and may provide flexibility to the vibration part 2311 or the vibration device 2300.

The plurality of second portions 2311*b* according to an example embodiment of the present disclosure may have a modulus (or Young's modulus) and viscoelasticity that are lower than those of each first portion 2311*a*, and thus, the second portion 2311*b* may enhance the reliability of each first portion 2311*a* vulnerable to an impact due to a fragile characteristic. For example, the second portion 2311*b* may be configured as a material having a loss coefficient of about 0.01 to about 1 and modulus of about 0.1 Giga pascal (GPa) to about 10 GPa.

The organic material part configured at the second portion 2311*b* may include one or more of an organic material, an organic polymer, an organic piezoelectric material, or an organic non-piezoelectric material that has a flexible characteristic in comparison with the inorganic material part which is the first portions 2311*a*. For example, the second portion 2311*b* may be an adhesive portion, an elastic portion, a bending portion, a damping portion, or a flexible portion, or the like which have flexibility, but embodiments of the present disclosure are not limited thereto.

The vibration part 2311 according to an example embodiment of the present disclosure may include a plurality of inorganic material parts which is the plurality of first portions 2311*a*, and an organic material part which is the second portion 2311*b* between the plurality of inorganic material parts. The plurality of first portions 2311*a* and the second portion 2311*b* may be disposed on (or connected to) the same plane, and thus, the vibration part 2311 according to an example embodiment of the present disclosure may have a single thin film-type. For example, the vibration part 2311 may have a structure in which a plurality of first portions 2311*a* are connected to one side. For example, the plurality of first portions 2311*a* may have a structure connected to an entire vibration part 2311. For example, with respect to the vibration member 100, the vibration part 2311 may be vibrated in a vertical direction by the first portion 2311*a* having a vibration characteristic and may be bent in a curved shape by the second portion 2311*b* having flexibility. Moreover, in the vibration part 2311 according to an example embodiment of the present disclosure, a size of the first portion 2311*a* and a size of the second portion 2311*b* may be adjusted based on a piezoelectric characteristic and flexibility needed for the vibration part 2311 or the vibration device 2300. As an example embodiment of the present disclosure, when the vibration part 2311 needs a piezoelectric characteristic rather than flexibility, a size of the first portion 2311*a* may be adjusted to be greater than that of the second portion 2311*b*. As another example embodiment of the present disclosure, when the vibration part 2311 needs flexibility rather than a piezoelectric characteristic, a size of the second portion 2311*b* may be adjusted to be greater than that of the first portion 2311*a*. Accordingly, a size of the vibration part 2311 may be adjusted based on a characteristic needed therefor, and thus, the vibration part 2311 may be easy to design.

The first electrode part 2331 may be disposed at a first surface (or an upper surface) of the vibration part 2311. The first electrode part 2331 may be disposed at or coupled to a first surface of each of a plurality of first portions 2311*a* and a first surface of each of a plurality of second portions 2311*b* in common and may be electrically connected to the first surface of each of the plurality of first portions 2311*a*. For example, the first electrode part 2331 may be one electrode type (or single-body electrode type) which is disposed at an entire first surface of the vibration part 2311. For example, the first electrode part 2331 may have substantially a same shape as that of the vibration part 2311, but embodiments of the present disclosure are not limited thereto.

The first electrode part 2331 according to an example embodiment of the present disclosure may be configured as the electrode part described in FIGS. 3A to 4, and the repetitive descriptions thereof may be omitted. For example, the first electrode part 2331 may be configured as copper and an anti-oxidation film. The first electrode part 2331 may further include conductive particles and/or binder.

The second electrode part 2351 may be disposed at a second surface (or a rear surface) different from (or opposite to) the first surface of the vibration part 2311. The second electrode part 2351 may be disposed at or coupled to a second surface of each of a plurality of first portions 2311*a* and the second surface of each of a plurality of second portions 2311*b* in common and may be electrically connected to a second surface of each of the plurality of first portions 2311*a*. For example, the second electrode part 2351 may be one electrode type (or single-body electrode type) which is disposed at an entire second surface of the vibration part 2311. For example, the second electrode part 2351 may have a same shape as the vibration part 2311, but embodiments of the present disclosure are not limited thereto. For example, the second electrode part 2351 according to an example embodiment of the present disclosure may be configured as the electrode part described in FIGS. 3A to 4, and repetitive descriptions thereof may be omitted. For example, the second electrode part 2351 may be configured as copper and an anti-oxidation film. The second electrode part 2351 may further include conductive particles and/or binder.

According to another example embodiment of the present disclosure, the second electrode part 2351 may be formed of a same material as that of the first electrode part 2331, but embodiments of the present disclosure are not limited thereto. As another example, the second electrode part 2351 may be configured as a material which differs from that of the first electrode part 2331.

The vibration apparatus 200 or the vibration device 2300 according to an example embodiment of the present disclosure may further include a first protection member 220 and a second protection member 240.

The first protection member 220 may be disposed at a first surface of the vibration device 2300. For example, the first protection member 220 may be configured to cover the first electrode part 2331. For example, the first protection member 220 may be configured to have a larger size than the vibration device 2300. Therefore, the first protection member 220 may protect the first surface of the vibration device 2300 and the first electrode part 2331. For example, the first protection member 220 may be a first cover member, but embodiments of the present disclosure are not limited thereto.

The second protection member 240 may be disposed at a second surface different from (or opposite to) the first surface of the vibration device 2300. For example, the second protection member 240 may be configured to cover the second electrode part 2351. For example, the second protection member 240 may be configured to have a larger size than the vibration device 2300 and have a same size as the first protection member 220. Therefore, the second protection member 240 may protect the second surface of the vibration device 2300 and the second electrode part 2351. For example, the second protection member 240 may be a second cover member, but embodiments of the present disclosure are not limited thereto.

Each of the first protection member 220 and the second protection member 240 according to an example embodiment of the present disclosure may include one or more materials of plastic, fiber, carbon, and wood, but embodiments of the present disclosure are not limited thereto. For example, each of the first protection member 220 and the second protection member 240 may include a same material or different material. For example, each of the first protection member 220 and the second protection member 240 may be a polyimide film, a polyethylene terephthalate film, or polyethylene naphthalate, but embodiments of the present disclosure are not limited thereto.

The first protection member 220 according to an example embodiment of the present disclosure may be connected or coupled to the first electrode part 2331 by a first adhesive layer 223. For example, the first protection member 220 may be connected or coupled to the first surface of the vibration device 2300 or the first electrode part 2331 by a film laminating process by the first adhesive layer 223.

The second protection member 240 according to an example embodiment of the present disclosure may be connected or coupled to the second electrode part 2351 by a second adhesive layer 224. For example, the second protection member 240 may be connected or coupled to the second surface of the vibration device 2300 or the second electrode part 2351 by a film laminating process by the second adhesive layer 224.

The first adhesive layer 223 may be disposed between the first electrode part 2331 and the first protection member 220. The second adhesive layer 224 may be disposed between the second electrode part 2351 and the second protection member 240. For example, the first adhesive layer 223 and second adhesive layer 224 may be configured between the first protection member 220 and the second protection member 240 to surround the vibration device 2300. For example, the first adhesive layer 223 and second adhesive layer 224 may be an adhesive layer which are configured between the first protection member 220 and the second protection member 240 to surround the vibration device 2300. For example, one or more of the first adhesive layer 223 and second adhesive layer 224 may be configured to surround the vibration device 2300. For example, the first adhesive layer 223 and second adhesive layer 224 may be configured between the first protection member 220 and the second protection member 240 to completely surround the vibration part 2311, the first electrode part 2331, and the second electrode part 2351. For example, the vibration part 2311, the first electrode part 2331, and the second electrode part 2351 may be embedded or built-in between the first adhesive layer 223 and the second adhesive layer 224.

Each of the first adhesive layer 223 and second adhesive layer 224 according to an example embodiment of the present disclosure may include an electrically insulating material which has adhesiveness and is capable of compression and decompression. For example, each of the first adhesive layer 223 and the second adhesive layer 224 may include an epoxy resin, an acrylic resin, a silicone resin, or a urethane resin, but embodiments of the present disclosure are not limited thereto.

Any one of the first protection member 220 and the second protection member 240 may be attached or coupled (or connected) to a vibration member (or a vibration plate or a vibration object) by an adhesive member.

According to an example embodiment of the present disclosure, the first protection member 220 of the first protection member 220 and the second protection member 240 may be attached or coupled (or connected) to the vibration member (or the vibration plate or the vibration object) by the adhesive member, but embodiments of the present disclosure are not limited thereto. For example, the second protection member 240 of the first protection member 220 and the second protection member 240 may be attached or coupled (or connected) to the vibration member by the adhesive member.

FIGS. 11A to 11D illustrates a vibration part according to another example embodiment of the present disclosure.

Figure 11A:
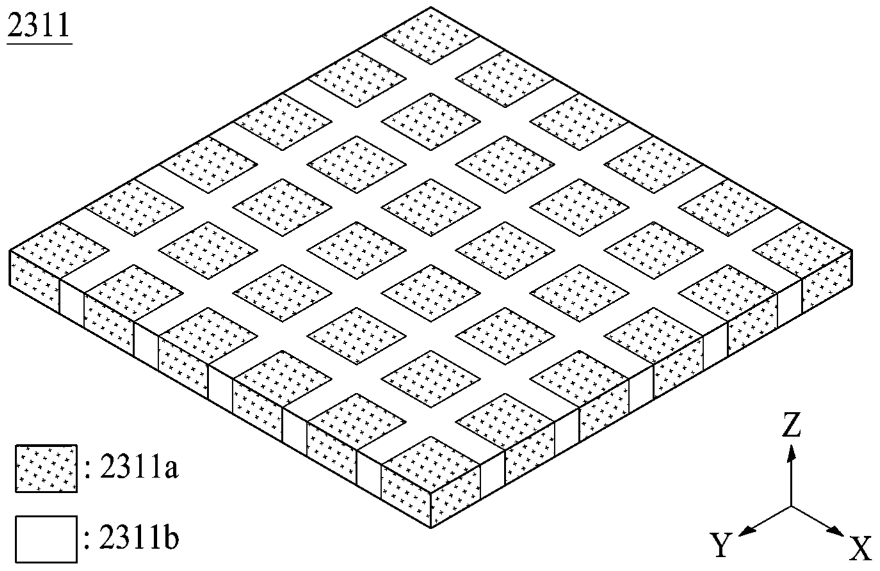
FIG. 11A illustrates a vibration part according to another example embodiment of the present disclosure.

With reference to FIG. 11A, the vibration part 2311 according to another example embodiment of the present disclosure may include a plurality of first portions 2311*a* which are spaced apart from one another along a first direction X and a second direction Y, and a second portion 2311*b* disposed between the plurality of first portions 2311*a*.

Each of the plurality of first portions 2311*a* may be disposed to be spaced apart from one another along the first direction X and the second direction Y. For example, each of the plurality of first portions 2311*a* may have a hexahedral shape (or a six-sided object shape) having a same size and may be disposed in a lattice shape. Each of the plurality of first portions 2311*a* may include a material which may be substantially the same as the first portion 2311*a* described above with reference to FIGS. 9 and 10, and thus, like reference numerals may refer to like elements, and repeated descriptions may be omitted.

The second portion 2311*b* may be disposed between the plurality of first portions 2311*a* along each of the first direction X and the second direction Y. The second portion 2311*b* may be configured to fill a gap (or a space) between two adjacent first portions 2311*a* or to surround each of the plurality of first portions 2311*a*, and thus, may be connected or adhered to an adjacent first portion 2311*a*. According to an example embodiment of the present disclosure, a width of a second portion 2311*b* disposed between two first portions 2311*a* adjacent to each other along the first direction X may be a same as or different from a width of the first portion 2311*a*, and the width of a second portion 2311*b* disposed between two first portions 2311*a* adjacent to each other along the second direction Y may be a same as or different from the width of the first portion 2311*a*. The second portion 2311*b* may include a material which may be substantially the same as the second portion 2311*b* described above with reference to FIGS. 9 and 10, and thus, like reference numerals may refer to like elements, and repeated descriptions may be omitted.

The vibration part 2311 according to another example embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, a resonance frequency of the vibration part 2311 may vary based on at least one or more of a shape, a length, and a thickness, or the like.

Figure 11B:
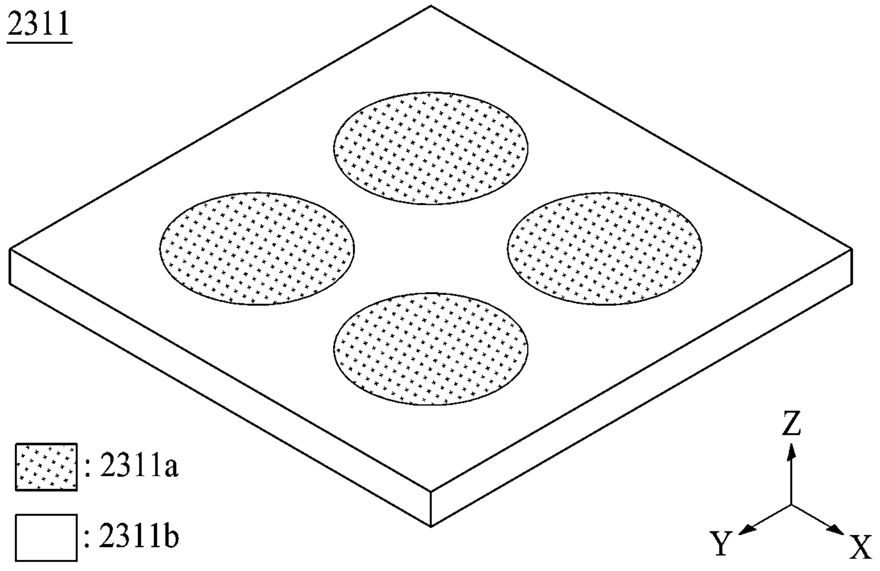
FIG. 11B illustrates a vibration part according to another example embodiment of the present disclosure.

With reference to FIG. 11B, the vibration part 2311 according to another example embodiment of the present disclosure may include a plurality of first portions 2311*a* which are spaced apart from one another along a first direction X and a second direction Y, and a second portion (or one or more second portions) 2311*b* disposed between the plurality of first portions 2311*a*.

Each of the plurality of first portions 2311*a* may have a flat structure of a circular shape. For example, each of the plurality of first portions 2311*a* may have a circular plate shape, but embodiments of the present disclosure are not limited thereto. For example, each of the plurality of first portions 2311*a* may have a dot shape including an oval shape, a polygonal shape, or a donut shape. Each of the plurality of first portions 2311*a* may include a material which may be substantially the same as the first portion 2311*a* described above with reference to FIGS. 9 and 10, and thus, like reference numerals may refer to like elements, and repeated descriptions may be omitted.

The second portion 2311*b* may be disposed between the plurality of first portions 2311*a* along each of the first direction X and the second direction Y. The second portion 2311*b* may be configured to surround each of the plurality of first portions 2311*a*, and thus, may be connected or adhered to a side surface of each of the plurality of first portions 2311*a*. Each of the plurality of first portions 2311*a* and the second portion 2311*b* may be disposed (or arranged) in parallel on a same plane (or a same layer). The second portion 2311*b* may include a material which may be substantially the same as the second portion 2311*b* described above with reference to FIGS. 9 and 10, and thus, like reference numerals may refer to like elements, and repeated descriptions may be omitted.

Figure 11C:
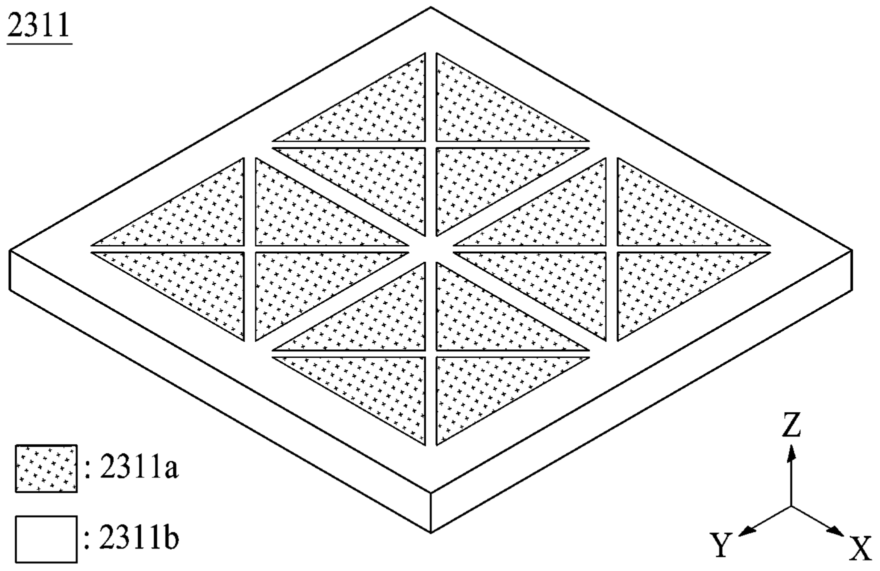
FIG. 11C illustrates a vibration part according to another example embodiment of the present disclosure.

With reference to FIG. 11C, the vibration part 2311 according to another example embodiment of the present disclosure may include a plurality of first portions 2311*a* which are spaced apart from one another along a first direction X and a second direction Y, and a second portion (or one or more second portions) 2311*b* disposed between the plurality of first portions 2311*a*.

Each of the plurality of first portions 2311*a* may have a flat structure of a triangular shape. For example, each of the plurality of first portions 2311*a* may have a triangular plate shape. Each of the plurality of first portions 2311*a* may include a material which may be substantially the same as the first portion 2311*a* described above with reference to FIGS. 9 and 10, and thus, like reference numerals may refer to like elements, and repeated descriptions may be omitted.

According to an example embodiment of the present disclosure, four adjacent first portions 2311*a* among the plurality of first portions 2311*a* may be adjacent to one another to form a tetragonal shape (or a square shape). Vertices of the four adjacent first portions 2311*a* forming the tetragonal shape may be adjacent to a center portion (or a central portion) of the tetragonal shape.

The second portion 2311*b* may be disposed between the plurality of first portions 2311*a* along each of the first direction X and the second direction Y. The second portion 2311*b* may be configured to surround each of the plurality of first portions 2311*a*, and thus, may be connected or adhered to a side surface of each of the plurality of first portions 2311*a*. Each of the plurality of first portions 2311*a* and the second portion 2311*b* may be disposed (or arranged) in parallel on a same plane (or a same layer). The second portion 2311*b* may include a material which may be substantially the same as the second portion 2311*b* described above with reference to FIGS. 9 and 10 and thus, like reference numerals may refer to like elements, and repeated descriptions may be omitted.

Figure 11D:
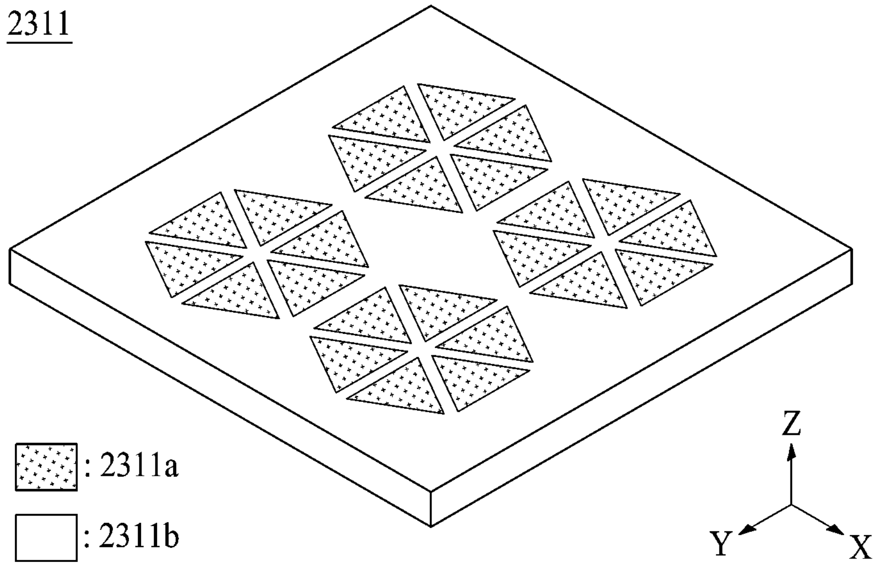
FIG. 11D illustrates a vibration part according to another example embodiment of the present disclosure.

With reference to FIG. 11D, the vibration part 2311 according to another example embodiment of the present disclosure may include a plurality of first portions 2311*a* which are spaced apart from one another along a first direction X and a second direction Y, and a second portion 2311*b* disposed between the plurality of first portions 2311*a*.

Each of the plurality of first portions 2311*a* may have a flat structure of a triangular shape. For example, each of the plurality of first portions 2311*a* may have a triangular plate shape. Each of the plurality of first portions 2311*a* may include a material which may be substantially the same as the first portion 2311*a* described above with reference to FIGS. 9 and 10, and thus, like reference numerals may refer to like elements, and repeated descriptions may be omitted.

According to another example embodiment of the present disclosure, six adjacent first portions 2311*a* of the plurality of first portions 2311*a* may be adjacent to one another to form a hexagonal shape (or a regularly hexagonal shape). Vertices of the six adjacent first portions 2311*a* forming the hexagonal shape may be adjacent to a center portion (or a central portion) of the hexagonal shape.

The second portion 2311*b* may be disposed between the plurality of first portions 2311*a* along each of the first direction X and the second direction Y. The second portion 2311*b* may be configured to surround each of the plurality of first portions 2311*a*, and thus, may be connected or adhered to a side surface of each of the plurality of first portions 2311*a*. Each of the plurality of first portions 2311*a* and the second portion 2311*b* may be disposed (or arranged) in parallel on a same plane (or a same layer). The second portion 2311*b* may include a material which may be substantially the same as the second portion 2311*b* described above with reference to FIGS. 9 and 10, and thus, like reference numerals may refer to like elements, and repeated descriptions may be omitted.

The vibration device 2300 according to an example embodiment of the present disclosure may be implemented as a thin film type where the first portion 2311*a* having a piezoelectric characteristic and a second portion 2311*b* having flexibility are alternately repeated and connected. Accordingly, the vibration device 2300 may be bent in a shape corresponding to a shape of the vibration member 100 or the vibration object. For example, when the vibration device 2300 is connected or coupled to the vibration member 100 including various curved portions by an adhesive member 150, the vibration device 2300 may be bent in a curved shape along a shape of a curved portion of the vibration member 100 and reliability against damage or breakdown may not be reduced despite being bent in a curved shape.

Figure 12:
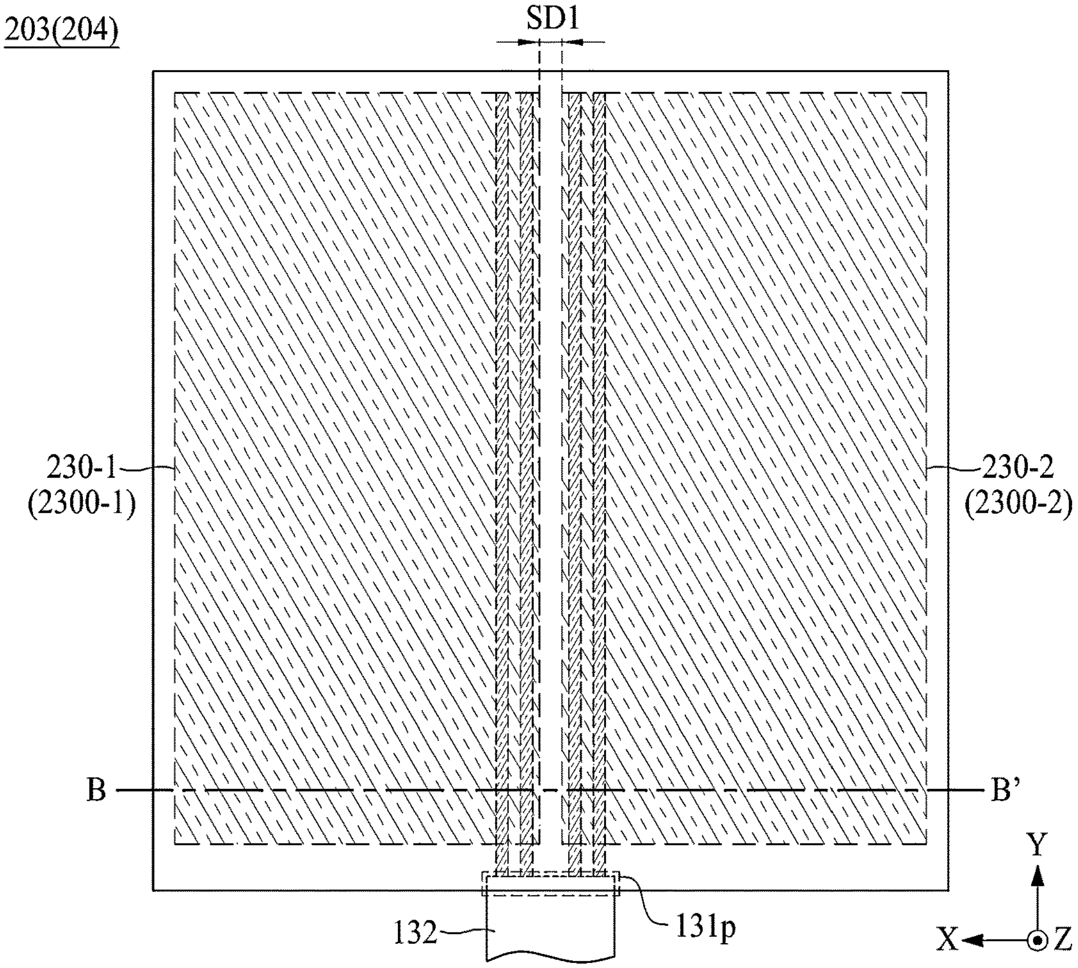
FIG. 12 illustrates a vibration device according to another example embodiment of the present disclosure.
Figure 13:
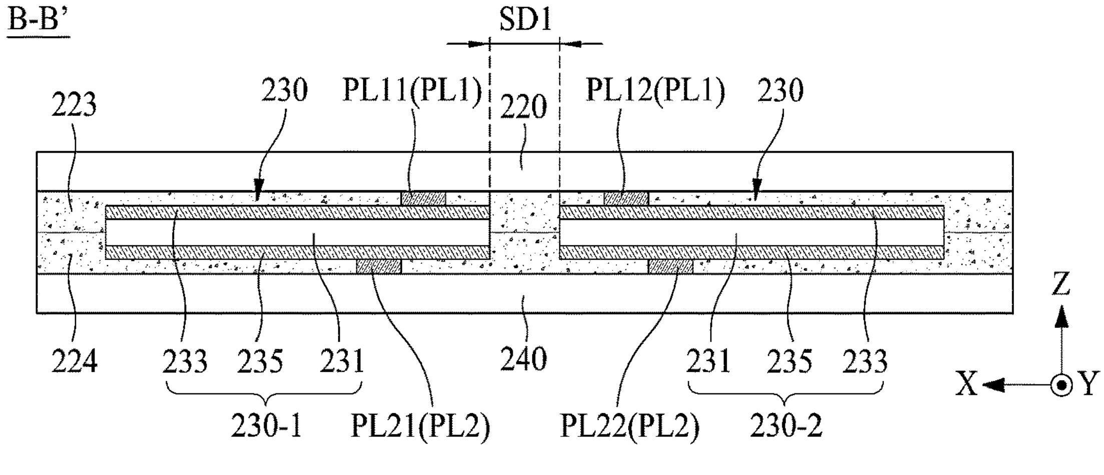
FIG. 13 is a cross-sectional view taken along line B-B' illustrated in FIG. 12 according to another example embodiment of the present disclosure.

FIG. 12 illustrates a vibration device according to another example embodiment of the present disclosure. FIG. 13 is a cross-sectional view taken along line B-B' illustrated in FIG. 12 according to another example embodiment of the present disclosure.

With reference to FIGS. 12 and 13, the vibration apparatus 203 according to another example embodiment of the present disclosure may include a vibration device 230. The vibration device 230 may include first and second vibration generating parts 230-1 and 230-2.

Each of the first and second vibration generating parts 230-1 and 230-2 may be electrically separated and disposed while being spaced apart from each other along a first direction X. Each of the first and second vibration generating parts 230-1 and 230-2 may alternately and repeatedly contract and/or expand based on a piezoelectric effect to vibrate. For example, the first and second vibration generating parts 230-1 and 230-2 may be disposed or tiled at a certain interval (or distance) SD1 along the first direction X. Thus, the vibration device 230 in which the first and second vibration generating parts 230-1 and 230-2 are tiled may be a vibration array, a vibration array portion, a vibration module array portion, a vibration array structure, a tiling vibration array, a tiling vibration array module, or a tiling vibration film, but embodiments of the present disclosure are not limited thereto.

Each of the first and second vibration generating parts 230-1 and 230-2 according to an example embodiment of the present disclosure may have a tetragonal shape. For example, each of the first and second vibration generating parts 230-1 and 230-2 may have a tetragonal shape having a width of about 5 cm or more. For example, each of the first and second vibration generating parts 230-1 and 230-2 may have a square shape having a size of 5 cm×5 cm or more, but embodiments of the present disclosure are not limited thereto.

Each of the first and second vibration generating parts 230-1 and 230-2 may be disposed or tiled on a same plane, and thus, the vibration device 230 may have an enlarged area based on tiling of the first and second vibration generating parts 230-1 and 230-2 having a relatively small size.

Each of the first and second vibration generating parts 230-1 and 230-2 may be disposed or tiled at a certain interval SD1, and thus, may be implemented as one vibration apparatus (or a single vibration apparatus) which is driven as one complete single-body without being independently driven. According to an example embodiment of the present disclosure, with respect to the first direction X, a first separation distance SD1 between the first and second vibration generating parts 230-1 and 230-2 may be 0.1 mm or more and less than 3 cm, but embodiments of the present disclosure are not limited thereto.

According to an example embodiment of the present disclosure, each of the first and second vibration generating parts 230-1 and 230-2 may be disposed or tiled to have the first separation distance (or an interval) SD1 of 0.1 mm or more and less than 3 cm, and thus, may be driven as one vibration apparatus, thereby increasing a reproduction band of a sound and a sound pressure level characteristic of a sound which is generated in conjunction with a single-body vibration of the first and second vibration generating parts 230-1 and 230-2. For example, the first and second vibration generating parts 230-1 and 230-2 may be disposed in the interval SD1 of 0.1 mm or more and less than 5 mm, in order to increase a reproduction band of a sound generated in conjunction with a single-body vibration of the first and second vibration generating parts 230-1 and 230-2 and to increase a sound of a low-pitched sound band (for example, a sound pressure level characteristic in 500 Hz or less).

According to an example embodiment of the present disclosure, when the first and second vibration generating parts 230-1 and 230-2 are disposed in the interval SD1 of less than 0.1 mm or without the interval SD1, the reliability of the first and second vibration generating parts 230-1 and 230-2 or the vibration device 230 may be reduced due to damage or a crack caused by a physical contact therebetween which occurs when each of the first and second vibration generating parts 230-1 and 230-2 vibrates.

According to an example embodiment of the present disclosure, when the first and second vibration generating parts 230-1 and 230-2 are disposed in the interval SD1 of 3 cm or more, the first and second vibration generating parts 230-1 and 230-2 may not be driven as one vibration apparatus due to an independent vibration of each of the first and second vibration generating parts 230-1 and 230-2. Therefore, a reproduction band of a sound and a sound pressure level characteristic of a sound which is generated based on vibrations of the first and second vibration generating parts 230-1 and 230-2 may be reduced. For example, when the first and second vibration generating parts 230-1 and 230-2 are disposed in the interval SD1 of 3 cm or more, a sound characteristic and a sound pressure level characteristic of the low-pitched sound band (for example, in 500 Hz or less) may each be reduced.

According to an example embodiment of the present disclosure, when the first and second vibration generating parts 230-1 and 230-2 are disposed in an interval SD1 of 5 mm, each of the first and second vibration generating parts 230-1 and 230-2 may not be perfectly driven as one vibration apparatus, and thus, a sound characteristic and a sound pressure level characteristic of the low-pitched sound band (for example, in 200 Hz or less) may each be reduced.

According to another example embodiment of the present disclosure, when the first and second vibration generating parts 230-1 and 230-2 are disposed in an interval SD1 of 1 mm, each of the first and second vibration generating parts 230-1 and 230-2 may be driven as one vibration apparatus, and thus, a reproduction band of a sound may increase and a sound of the low-pitched sound band (for example, a sound pressure level characteristic in 500 Hz or less) may increase. For example, when the first and second vibration generating parts 230-1 and 230-2 are disposed in the interval SD1 of 1 mm, the vibration device 230 may be implemented as a large-area vibrator which is enlarged based on optimization of a separation distance between the first and second vibration generating parts 230-1 and 230-2. Therefore, the vibration device 230 may be driven as a large-area vibrator based on a single-body vibration of the first and second vibration generating parts 230-1 and 230-2, and thus, a sound characteristic and a sound pressure level characteristic may each increase a reproduction band of a sound and in the low-pitched sound band generated in conjunction with a large-area vibration of the vibration device 230.

Therefore, to implement a single-body vibration (or one vibration apparatus) of the first and second vibration generating parts 230-1 and 230-2, the first separation distance (or the interval) SD1 between the first and second vibration generating parts 230-1 and 230-2 may be adjusted to 0.1 mm or more and less than 3 cm. In addition, to implement a single-body vibration (or one vibration apparatus) of the first and second vibration generating parts 230-1 and 230-2 and to increase a sound pressure level characteristic of a sound of the low-pitched sound band, the first separation distance (or the interval) SD1 between the first and second vibration generating parts 230-1 and 230-2 may be adjusted to 0.1 mm or more and less than 5 mm.

Each of the first and second vibration generating parts 230-1 and 230-2 according to an example embodiment of the present disclosure may include a vibration part 231, a first electrode part 233, and a second electrode part 235.

The vibration part 231 of each of the first and second vibration generating parts 230-1 and 230-2 may include a piezoelectric material or an electroactive material which includes a piezoelectric effect. For example, the vibration part 231 of each of the first and second vibration generating parts 230-1 and 230-2 may be configured substantially the same as any one of the vibration part 231 described above with reference to FIGS. 7 and 8, and thus, like reference numeral may refer to like element, and repeated descriptions may be omitted.

The first electrode part 233 may be disposed at a first surface of the vibration part 231 and may be electrically connected to the first surface of the vibration part 231. For example, the first electrode part 233 may be substantially the same as the first electrode part 233 described above with reference to FIGS. 7 and 8, and thus, like reference numeral may refer to like element, and repeated descriptions may be omitted.

The second electrode part 235 may be disposed at a second surface of the vibration part 231 and electrically connected to the second surface of the vibration part 231. The second electrode part 235 may be substantially the same as the second electrode part 235 described above with reference to FIGS. 7 and 8, and thus, like reference numerals may refer to like elements, and repeated descriptions may be omitted.

The vibration device 230 according to another example embodiment of the present disclosure may further include a first protection member 220 and a second protection member 240.

The first protection member 220 may be disposed at the first surface of the vibration device 230. For example, the first protection member 220 may cover the first electrode part 233 which is disposed at a first surface of each of the first and second vibration generating parts 230-1 and 230-2, and thus, the first protection member 220 may be connected to the first surface of each of the first and second vibration generating parts 230-1 and 230-2 in common or may support the first surface of each of the first and second vibration generating parts 230-1 and 230-2 in common. Accordingly, the first protection member 220 may protect the first surface or the first electrode part 233 of each of the first and second vibration generating parts 230-1 and 230-2.

The second protection member 240 may be disposed at the second surface of the vibration device 230. For example, the second protection member 240 may cover the second electrode part 235 which is disposed at a second surface of each of the first and second vibration generating parts 230-1 and 230-2, and thus, the second protection member 240 may be connected to the second surface of each of the first and second vibration generating parts 230-1 and 230-2 in common or may support the second surface of each of the first and second vibration generating parts 230-1 and 230-2 in common. Accordingly, the second protection member 240 may protect the second surface or the second electrode part 235 of each of the first and second vibration generating parts 230-1 and 230-2.

Each of the first protection member 220 and the second protection member 240 according to an example embodiment of the present disclosure may each include one or more materials of plastic, fiber, carbon, and wood, but embodiments of the present disclosure are not limited thereto. For example, each of the first protection member 220 and the second protection member 240 may include a same material or a different material. For example, each of the first protection member 220 and the second protection member 240 may be a polyimide film, a polyethylene terephthalate film, or polyethylene naphthalate, but embodiments of the present disclosure are not limited thereto.

The first protection member 220 according to an example embodiment of the present disclosure may be disposed at the first surface of each of the first and second vibration generating parts 230-1 and 230-2 by a first adhesive layer 223. For example, the first protection member 220 may be directly disposed at the first surface of each of the first and second vibration generating parts 230-1 and 230-2 by a film laminating process using the first adhesive layer 223. Accordingly, each of the first and second vibration generating parts 230-1 and 230-2 may be integrated (or disposed) or tiled with the first protection member 220 to have the certain interval SD1.

The second protection member 240 according to an example embodiment of the present disclosure may be disposed at the second surface of each of the first and second vibration generating parts 230-1 and 230-2 by a second adhesive layer 224. For example, the second protection member 240 may be directly disposed at the second surface of each of the first and second vibration generating parts 230-1 and 230-2 by a film laminating process using the second adhesive layer 224. Accordingly, each of the first and second vibration generating parts 230-1 and 230-2 may be integrated (or disposed) or tiled with the second protection member 240 to have the certain interval SD1.

The first adhesive layer 223 may be disposed between the first and second vibration generating parts 230-1 and 230-2 and disposed at the first surface of each of the first and second vibration generating parts 230-1 and 230-2. For example, the first adhesive layer 223 may be formed at a rear surface (or an inner surface) of the first protection member 220 facing the first surface of each of the first and second vibration generating parts 230-1 and 230-2, filled between the first and second vibration generating parts 230-1 and 230-2, and disposed between the first protection member 220 and the first surface of each of the first and second vibration generating parts 230-1 and 230-2.

The second adhesive layer 224 may be disposed between the first and second vibration generating parts 230-1 and 230-2 and disposed at the second surface of each of the first and second vibration generating parts 230-1 and 230-2. For example, the second adhesive layer 224 may be formed at a front surface (or an inner surface) of the second protection member 240 facing the second surface of each of the first and second vibration generating parts 230-1 and 230-2, filled between the first and second vibration generating parts 230-1 and 230-2, and disposed between the second protection member 240 and the second surface of each of the first and second vibration generating parts 230-1 and 230-2.

The first and second adhesive layers 223 and 224 may be connected or coupled to each other between the first and second vibration generating parts 230-1 and 230-2. Therefore, each of the first and second vibration generating parts 230-1 and 230-2 may be surrounded by the first and second adhesive layers 223 and 224. For example, the first and second adhesive layers 223 and 224 may be configured between the first protection member 220 and the second protection member 240 to completely surround the first and second vibration generating parts 230-1 and 230-2. For example, each of the first and second vibration generating parts 230-1 and 230-2 may be embedded or built-in between the first adhesive layer 223 and the second adhesive layer 224.

Each of the first and second adhesive layers 223 and 224 according to an example embodiment of the present disclosure may include an electric insulating material which has adhesiveness and is capable of compression and decompression. For example, each of the first and second adhesive layers 223 and 224 may include an epoxy resin, an acrylic resin, a silicone resin, or a urethane resin, but embodiments of the present disclosure are not limited thereto. Each of the first and second adhesive layers 223 and 224 may be configured to be transparent, translucent, or opaque.

The vibration device 230 according to another example embodiment of the present disclosure may further include a first power supply line PL1, a second power supply line PL2, and a pad part 131*p*.

The first power supply line PL1 may be disposed at the first protection member 220. The first power supply line PL1 may be disposed at the rear surface of the first protection member 220 facing the first surface of each of the first and second vibration generating parts 230-1 and 230-2. The first power supply line PL1 may be electrically connected to the first electrode part 233 of each of the first and second vibration generating parts 230-1 and 230-2. For example, the first power supply line PL1 may be electrically and directly connected to the first electrode part 233 of each of the first and second vibration generating parts 230-1 and 230-2. As an example embodiment of the present disclosure, the first power supply line PL1 may be electrically connected to the first electrode part 233 of each of the first and second vibration generating parts 230-1 and 230-2 by an anisotropic conductive film. As another example embodiment of the present disclosure, the first power supply line PL1 may be electrically connected to the first electrode part 233 of each of the first and second vibration generating parts 230-1 and 230-2 through a conductive material (or particle) included in the first adhesive layer 223.

The first power supply line PL1 according to an example embodiment of the present disclosure may include first and second upper power lines PL11 and PL12 disposed along a second direction Y. For example, the first upper power line PL11 may be electrically connected to the first electrode part 233 of the first vibration generating part 230-1. The second upper power line PL12 may be electrically connected to the first electrode part 233 of the second vibration generating part 230-2.

The second power supply line PL2 may be disposed at the second protection member 240. The second power supply line PL2 may be disposed at the front surface of the second protection member 240 facing the second surface of each of the first and second vibration generating parts 230-1 and 230-2. The second power supply line PL2 may be electrically connected to the second electrode part 235 of each of the first and second vibration generating parts 230-1 and 230-2. For example, the second power supply line PL2 may be electrically and directly connected to the second electrode part 235 of each of the first and second vibration generating parts 230-1 and 230-2. As an example embodiment of the present disclosure, the second power supply line PL2 may be electrically connected to the second electrode part 235 of each of the first and second vibration generating parts 230-1 and 230-2 by an anisotropic conductive film. As another example embodiment of the present disclosure, the second power supply line PL2 may be electrically connected to the second electrode part 235 of each of the first and second vibration generating parts 230-1 and 230-2 through a conductive material (or particle) included in the second adhesive layer 224.

The second power supply line PL2 according to an example embodiment of the present disclosure may include first and second lower power lines PL21 and PL22 disposed along a second direction Y. For example, the first lower power line PL21 may be electrically connected to the second electrode part 235 of the first vibration generating part 230-1. The second lower power line PL22 may be electrically connected to the second electrode part 235 of the second vibration generating part 230-2.

According to an example embodiment of the present disclosure, the first upper power line PL11 may be disposed not to overlap the first lower power line PL21. When the first upper power line PL11 is disposed not to overlap the first lower power line PL21, the problem of a short circuit between the first upper power line PL11 and the first lower power line PL21 may be prevented. According to an example embodiment of the present disclosure, the second upper power line PL12 may be disposed not to overlap the second lower power line PL22. When the second upper power line PL12 is disposed not to overlap the second lower power line PL22, the problem of a short circuit between the second upper power line PL12 and the second lower power line PL22 may be prevented.

The pad part 131*p* may be electrically connected to the first power supply line PL1 and the second power supply line PL2. For example, the pad part 131*p* may be configured at one periphery portion of any one of the first protection member 220 and the second protection member 240 to be electrically connected to one side (or one end) of each of the first power supply line PL1 and the second power supply line PL2.

The pad part 131*p* according to an example embodiment of the present disclosure may include a first pad electrode electrically connected to one end (or one side) of the first power supply line PL1, and a second pad electrode electrically connected to one end (or one side) of the second power supply line PL2.

The first pad electrode may be connected to one end (or one side) of each of the first and second upper power lines PL11 and PL12 of the first power supply line PL1 in common. For example, the one end of each of the first and second upper power lines PL11 and PL12 may branch from the first pad electrode. The second pad electrode may be connected to one end (or one side) of each of the first and second lower power lines PL21 and PL22 of the second power supply line PL2 in common. For example, the one end of each of the first and second lower power lines PL21 and PL22 may branch from the second pad electrode.

The vibration device 230 according to another example embodiment of the present disclosure may further include a signal cable 132.

The signal cable 132 may be electrically connected to the pad part 131*p* disposed at the vibration device 230 and may supply the vibration device 230 with a vibration driving signal (or a sound signal) provided from a sound processing circuit. The signal cable 132 according to an example embodiment of the present disclosure may include a first terminal electrically coupled to the first pad electrode of the pad part 131*p* and a second terminal electrically coupled to the second pad electrode of the pad part 131*p*. For example, the signal cable 132 may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

A portion of the signal cable 132 according to another example embodiment of the present disclosure may be accommodated (or inserted) at a region between the first protection member 220 and the second protection member 240. For example, one periphery portion of the signal cable 132 may be accommodated (or inserted) at the region between the first protection member 220 and the second protection member 240, and thus, the signal cable 132 may be integrated into the vibration device 230. For example, the first pad electrode and the second pad electrode of the pad part 131*p* may be disposed at one periphery portion of any one of the first protection member 220 and the second protection member 240 and may be electrically connected to the signal cable 132 which is accommodated between the first protection member 220 and the second protection member 240.

The sound processing circuit may generate an alternating current (AC) vibration driving signal including a first vibration driving signal and a second vibration driving signal based on a sound data. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode part 233 of each of the first and second vibration generating parts 230-1 and 230-2 through a first terminal of the signal cable 132, the first pad electrode of the pad part 131*p*, and the first power supply line PL1.

The second vibration driving signal may be supplied to the second electrode part 235 of each of the first and second vibration generating parts 230-1 and 230-2 through a second terminal of the signal cable 132, the second pad electrode of the pad part 131*p*, and the second power supply line PL2.

Figure 14:
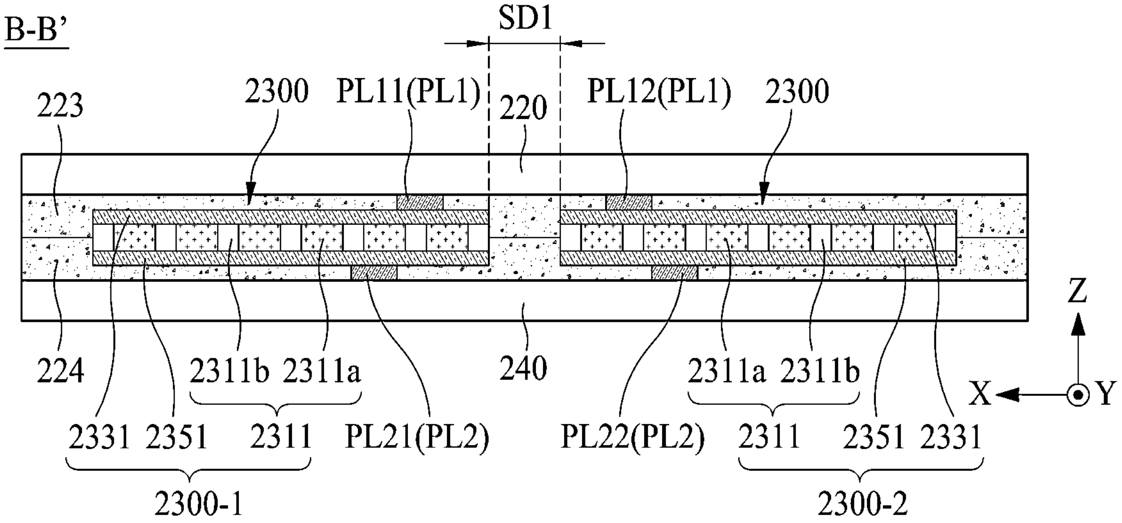
FIG. 14 is another cross-sectional view taken along line B-B' illustrated in FIG. 12 according to another example embodiment of the present disclosure.

FIG. 14 is another cross-sectional view taken along line B-B' illustrated in FIG. 12 according to another example embodiment of the present disclosure.

With reference to FIGS. 12 and 14, the vibration apparatus 204 according to another example embodiment of the present disclosure may include a vibration device 2300. The vibration device 2300 may include first and second vibration generating parts 2300-1 and 2300-2.

Each of the first and second vibration generating parts 2300-1 and 2300-2 may be electrically separated and disposed while being spaced apart from each other along a first direction X. Each of the first and second vibration generating parts 2300-1 and 2300-2 may alternately and repeatedly contract and/or expand based on a piezoelectric effect to vibrate. For example, the first and second vibration generating parts 2300-1 and 2300-2 may be disposed or tiled at a certain interval (or distance) SD1 along the first direction X. Thus, the vibration device 2300 in which the first and second vibration generating parts 2300-1 and 2300-2 are tiled may be a vibration array, a vibration array portion, a vibration module array portion, a vibration array structure, a tiling vibration array, a tiling vibration array module, or a tiling vibration film, but embodiments of the present disclosure are not limited thereto.

Each of the first and second vibration generating parts 2300-1 and 2300-2 according to an example embodiment of the present disclosure may have a tetragonal shape. For example, each of the first and second vibration generating parts 2300-1 and 2300-2 may have a tetragonal shape having a width of about 5 cm or more. For example, each of the first and second vibration generating parts 2300-1 and 2300-2 may have a square shape having a size of 5 cm×5 cm or more, but embodiments of the present disclosure are not limited thereto.

Each of the first and second vibration generating parts 2300-1 and 2300-2 may be disposed or tiled on the same plane, and thus, the vibration device 2300 may have an enlarged area based on tiling of the first and second vibration generating parts 2300-1 and 2300-2 having a relatively small size.

Each of the first and second vibration generating parts 2300-1 and 2300-2 may be disposed or tiled at a certain interval SD1, and thus, may be implemented as one vibration apparatus (or a single vibration apparatus) which is driven as one complete single-body without being independently driven. According to an example embodiment of the present disclosure, with respect to the first direction X, a first separation distance SD1 between the first and second vibration generating parts 2300-1 and 2300-2 may be 0.1 mm or more and less than 3 cm, but embodiments of the present disclosure are not limited thereto. A description of the first separation distance SD1 may be substantially the same as that of descriptions given above with reference to FIGS. 12 and 13, and thus, repeated descriptions may be omitted.

According to an example embodiment of the present disclosure, each of the first and second vibration generating parts 2300-1 and 2300-2 may be disposed or tiled to have the first separation distance (or an interval) SD1 of 0.1 mm or more and less than 3 cm, and thus, may be driven as one vibration apparatus, thereby increasing a reproduction band of a sound and a sound pressure level characteristic of a sound which is generated in conjunction with a single-body vibration of the first and second vibration generating parts 2300-1 and 2300-2. For example, the first and second vibration generating parts 2300-1 and 2300-2 may be disposed in the interval SD1 of 0.1 mm or more and less than 5 mm, in order to increase a reproduction band of a sound generated in conjunction with a single-body vibration of the first and second vibration generating parts 2300-1 and 2300-2 and to increase a sound of a low-pitched sound band (for example, a sound pressure level characteristic in 500 Hz or less).

Each of the first and second vibration generating parts 2300-1 and 2300-2 according to another example embodiment of the present disclosure may include a vibration part 2311, a first electrode part 2331, and a second electrode part 2351.

The vibration part 2311 of each of the first and second vibration generating parts 2300-1 and 2300-2 may include a plurality of first portions 2311*a* and a plurality of second portions 2311*b*. For example, the vibration part 2311 of each of the first and second vibration generating parts 2300-1 and 2300-2 may be configured substantially the same as any one of the vibration parts 2311 described above with reference to FIGS. 7 and 9 to 11D, and thus, like reference numeral may refer to like element, and repeated descriptions may be omitted.

According to another example embodiment of the present disclosure, each of the first to fourth vibration generating parts 2300-1 and 2300-2 may include any one vibration part 2311 of the vibration part 2311 described above with reference to FIGS. 10 to 11D, or may include different vibration part 2311.

The first electrode part 2331 may be disposed at a first surface of the corresponding vibration part 2311 and electrically connected to the first surface of the vibration part 2311. The first electrode part 2331 may be substantially the same as the first electrode part 2331 described above with reference to FIGS. 7 and 9, and thus, like reference numeral may refer to like element, and repeated descriptions may be omitted.

The second electrode part 2351 may be disposed at a second surface of the corresponding vibration part 2311 and electrically connected to the second surface of the vibration part 2311. The second electrode part 2351 may be substantially the same as the second electrode part 2351 described above with reference to FIGS. 7 and 9, and thus, like reference numeral may refer to like element, and repeated descriptions may be omitted.

The vibration device 2300 according to another example embodiment of the present disclosure may further include a first protection member 220 and a second protection member 240.

The first protection member 220 may be disposed at the first surface of the vibration device 2300. For example, the first protection member 220 may cover the first electrode part 2331 which is disposed at a first surface of each of the first and second vibration generating parts 2300-1 and 2300-2, and thus, the first protection member 220 may be connected to the first surface of each of the first and second vibration generating parts 2300-1 and 2300-2 in common or may support the first surface of each of the first and second vibration generating parts 2300-1 and 2300-2 in common. Accordingly, the first protection member 220 may protect the first surface or the first electrode part 2331 of each of the first and second vibration generating parts 2300-1 and 2300-2.

The second protection member 240 may be disposed at the second surface of the vibration device 2300. For example, the second protection member 240 may cover the second electrode part 2351 which is disposed at a second surface of each of the first and second vibration generating parts 2300-1 and 2300-2, and thus, the second protection member 240 may be connected to the second surface of each of the first and second vibration generating parts 2300-1 and 2300-2 in common or may support the second surface of each of the first and second vibration generating parts 2300-1 and 2300-2 in common. Accordingly, the second protection member 240 may protect the second surface or the second electrode part 2351 of each of the first and second vibration generating parts 2300-1 and 2300-2.

The first protection member 220 and the second protection member 240 according to an example embodiment of the present disclosure may each include one or more materials of plastic, fiber, carbon, and wood, but embodiments of the present disclosure are not limited thereto. For example, each of the first protection member 220 and the second protection member 240 may include a same material or a different material. For example, each of the first protection member 220 and the second protection member 240 may be a polyimide film, a polyethylene terephthalate film, or polyethylene naphthalate, but embodiments of the present disclosure are not limited thereto.

The first protection member 220 according to an example embodiment of the present disclosure may be disposed at the first surface of each of the first and second vibration generating parts 2300-1 and 2300-2 by a first adhesive layer 223. For example, the first protection member 220 may be directly disposed at the first surface of each of the first and second vibration generating parts 2300-1 and 2300-2 by a film laminating process using the first adhesive layer 223. Accordingly, each of the first and second vibration generating parts 2300-1 and 2300-2 may be integrated (or disposed) or tiled with the first protection member 220 to have the certain interval SD1.

The second protection member 240 according to an example embodiment of the present disclosure may be disposed at the second surface of each of the first and second vibration generating parts 2300-1 and 2300-2 by a second adhesive layer 224. For example, the second protection member 240 may be directly disposed at the second surface of each of the first and second vibration generating parts 2300-1 and 2300-2 by a film laminating process using the second adhesive layer 224. Accordingly, each of the first and second vibration generating parts 2300-1 and 2300-2 may be integrated (or disposed) or tiled with the second protection member 240 to have the certain interval SD1.

The first adhesive layer 223 may be disposed between the first and second vibration generating parts 2300-1 and 2300-2 and disposed at the first surface of each of the first and second vibration generating parts 2300-1 and 2300-2. For example, the first adhesive layer 223 may be formed at a rear surface (or an inner surface) of the first protection member 220 facing the first surface of each of the first and second vibration generating parts 2300-1 and 2300-2, filled between the first and second vibration generating parts 2300-1 and 2300-2, and disposed between the first protection member 220 and the first surface of each of the first and second vibration generating parts 2300-1 and 2300-2.

The second adhesive layer 224 may be disposed between the first and second vibration generating parts 2300-1 and 2300-2 and disposed at the second surface of each of the first and second vibration generating parts 2300-1 and 2300-2. For example, the second adhesive layer 224 may be formed at a front surface (or an inner surface) of the second protection member 240 facing the second surface of each of the first and second vibration generating parts 2300-1 and 2300-2, filled between the first and second vibration generating parts 2300-1 and 2300-2, and disposed between the second protection member 240 and the second surface of each of the first and second vibration generating parts 2300-1 and 2300-2.

The first and second adhesive layers 223 and 224 may be connected or coupled to each other between the first and second vibration generating parts 2300-1 and 2300-2. Therefore, each of the first and second vibration generating parts 2300-1 and 2300-2 may be surrounded by the first and second adhesive layers 223 and 224. For example, the first and second adhesive layers 223 and 224 may be configured between the first protection member 220 and the second protection member 240 to completely surround the first and second vibration generating parts 2300-1 and 2300-2. For example, each of the first and second vibration generating parts 2300-1 and 2300-2 may be embedded or built-in between the first adhesive layer 223 and the second adhesive layer 224.

Each of the first and second adhesive layers 223 and 224 according to an example embodiment of the present disclosure may include an electric insulating material which has adhesiveness and is capable of compression and decompression. For example, each of the first and second adhesive layers 223 and 224 may include an epoxy resin, an acrylic resin, a silicone resin, or a urethane resin, but embodiments of the present disclosure are not limited thereto. Each of the first and second adhesive layers 223 and 224 may be configured to be transparent, translucent, or opaque.

The vibration device 2300 according to another example embodiment of the present disclosure may further include a first power supply line PL1, a second power supply line PL2, and a pad part 131*p*.

The first power supply line PL1 may be disposed at the first protection member 220. The first power supply line PL1 may be disposed at the rear surface of the first protection member 220 facing the first surface of each of the first and second vibration generating parts 2300-1 and 2300-2. The first power supply line PL1 may be electrically connected to the first electrode part 2331 of each of the first and second vibration generating parts 2300-1 and 2300-2. For example, the first power supply line PL1 may be electrically and directly connected to the first electrode part 2331 of each of the first and second vibration generating parts 2300-1 and 2300-2. As an example embodiment of the present disclosure, the first power supply line PL1 may be electrically connected to the first electrode part 2331 of each of the first and second vibration generating parts 2300-1 and 2300-2 by an anisotropic conductive film. As another example embodiment of the present disclosure, the first power supply line PL1 may be electrically connected to the first electrode part 2331 of each of the first and second vibration generating parts 2300-1 and 2300-2 through a conductive material (or particle) included in the first adhesive layer 223.

The first power supply line PL1 according to an example embodiment of the present disclosure may include first and second upper power lines PL11 and PL12 disposed along a second direction Y. For example, the first upper power line PL11 may be electrically connected to the first electrode part 2331 of the first vibration generating part 2300-1. The second upper power line PL12 may be electrically connected to the first electrode part 2331 of the second vibration generating part 2300-2.

The second power supply line PL2 may be disposed at the second protection member 240. The second power supply line PL2 may be disposed at the front surface of the second protection member 240 facing the second surface of each of the first and second vibration generating parts 2300-1 and 2300-2. The second power supply line PL2 may be electrically connected to the second electrode part 2351 of each of the first and second vibration generating parts 2300-1 and 2300-2. For example, the second power supply line PL2 may be electrically and directly connected to the second electrode part 2351 of each of the first and second vibration generating parts 2300-1 and 2300-2. As an example embodiment of the present disclosure, the second power supply line PL2 may be electrically connected to the second electrode part 2351 of each of the first and second vibration generating parts 2300-1 and 2300-2 by an anisotropic conductive film. As another example embodiment of the present disclosure, the second power supply line PL2 may be electrically connected to the second electrode part 2351 of each of the first and second vibration generating parts 2300-1 and 2300-2 through a conductive material (or particle) included in the second adhesive layer 224.

The second power supply line PL2 according to an example embodiment of the present disclosure may include first and second lower power lines PL21 and PL22 disposed along a second direction Y. For example, the first lower power line PL21 may be electrically connected to the second electrode part 2351 of the first vibration generating part 2300-1. The second lower power line PL22 may be electrically connected to the second electrode part 2351 of the second vibration generating part 2300-2.

According to an example embodiment of the present disclosure, the first upper power line PL11 may be disposed not to overlap the first lower power line PL21. When the first upper power line PL11 is disposed not to overlap the first lower power line PL21, the problem of a short circuit between the first upper power line PL11 and the first lower power line PL21 may be prevented. According to an example embodiment of the present disclosure, the second upper power line PL12 may be disposed not to overlap the second lower power line PL22. When the second upper power line PL12 is disposed not to overlap the second lower power line PL22, the problem of a short circuit between the second upper power line PL12 and the second lower power line PL22 may be prevented.

The pad part 131*p* may be electrically connected to the first power supply line PL1 and the second power supply line PL2. For example, the pad part 131*p* may be configured at one periphery portion of any one of the first protection member 220 and the second protection member 240 to be electrically connected to one side (or one end) of each of the first power supply line PL1 and the second power supply line PL2.

The pad part 131*p* according to an example embodiment of the present disclosure may include a first pad electrode electrically connected to one end (or one side) of the first power supply line PL1, and a second pad electrode electrically connected to one end (or one side) of the second power supply line PL2.

The first pad electrode may be connected to one end (or one side) of each of the first and second upper power lines PL11 and PL12 of the first power supply line PL1 in common. For example, the one end of each of the first and second upper power lines PL11 and PL12 may branch from the first pad electrode. The second pad electrode may be connected to one end (or one side) of each of the first and second lower power lines PL21 and PL22 of the second power supply line PL2 in common. For example, the one end of each of the first and second lower power lines PL21 and PL22 may branch from the second pad electrode.

The vibration device 2300 according to another example embodiment of the present disclosure may further include a signal cable 132.

The signal cable 132 may be electrically connected to the pad part 131*p* disposed at the vibration device 2300 and may supply the vibration device 2300 with a vibration driving signal (or a sound signal) provided from a sound processing circuit. The signal cable 132 according to an example embodiment of the present disclosure may include a first terminal electrically coupled to the first pad electrode of the pad part 131*p* and a second terminal electrically coupled to the second pad electrode of the pad part 131*p*. For example, the signal cable 132 may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

A portion of the signal cable 132 according to another example embodiment of the present disclosure may be accommodated (or inserted) at a region between the first protection member 220 and the second protection member 240. For example, one periphery portion of the signal cable 132 may be accommodated (or inserted) at the region between the first protection member 220 and the second protection member 240, and thus, the signal cable 132 may be integrated into the vibration device 2300. For example, the first pad electrode and the second pad electrode of the pad part 131*p* may be disposed at one periphery portion of any one of the first protection member 220 and the second protection member 240 and may be electrically connected to the signal cable 132 which is accommodated between the first protection member 220 and the second protection member 240.

The sound processing circuit may generate an alternating current (AC) vibration driving signal including a first vibration driving signal and a second vibration driving signal based on a sound data. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode part 2331 of each of the first and second vibration generating parts 2300-1 and 2300-2 through a first terminal of the signal cable 132, the first pad electrode of the pad part 131*p*, and the first power supply line PL1. The second vibration driving signal may be supplied to the second electrode part 2351 of each of the first and second vibration generating parts 2300-1 and 2300-2 through a second terminal of the signal cable 132, the second pad electrode of the pad part 131*p*, and the second power supply line PL2.

Figure 15:
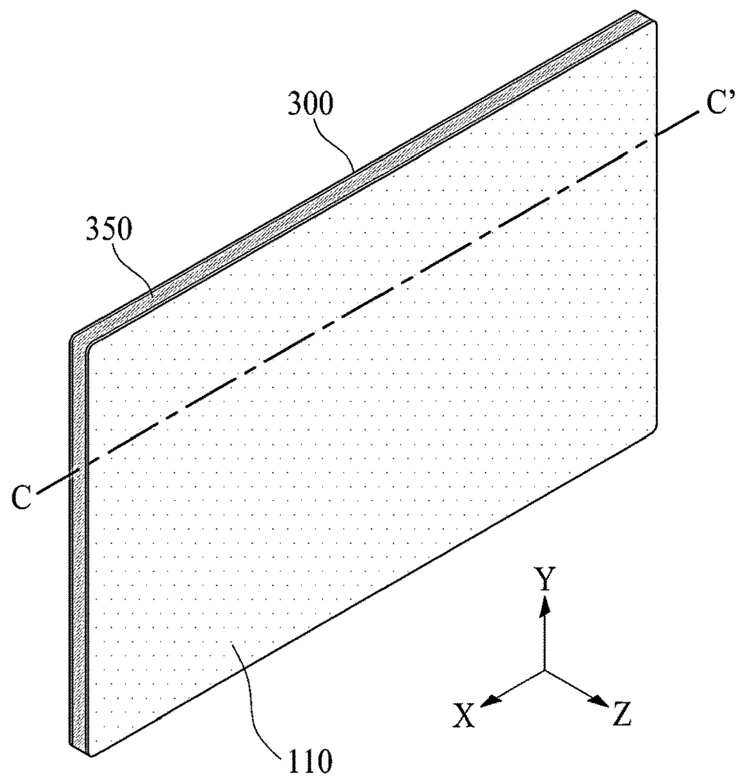
FIG. 15 illustrates an apparatus according to an example embodiment of the present disclosure.
Figure 16:
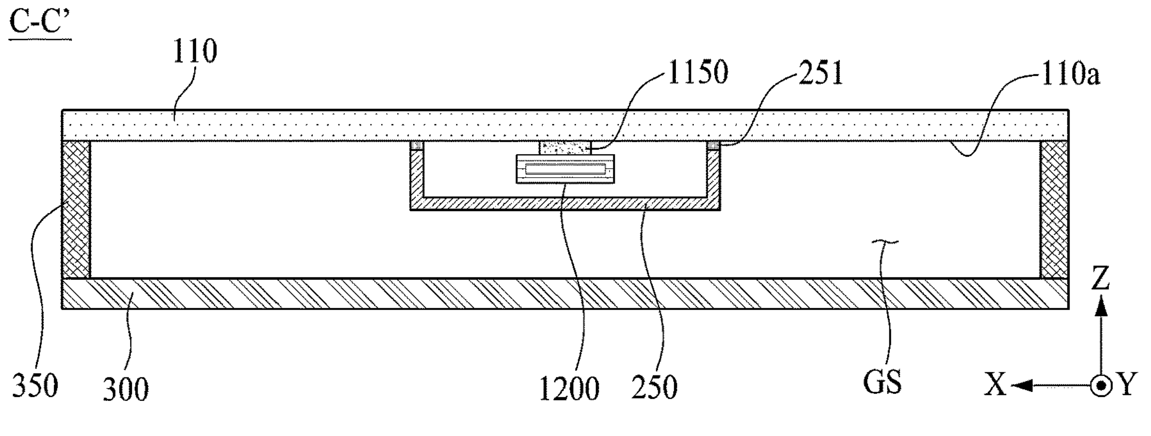
FIG. 16 is a cross-sectional view taken along line C-C' illustrated in FIG. 15 according to an example embodiment of the present disclosure.

FIG. 15 illustrates an apparatus according to an example embodiment of the present disclosure. FIG. 16 is a cross-sectional view taken along line C-C' illustrated in FIG. 15 according to an example embodiment of the present disclosure.

With reference to FIGS. 15 and 16, the apparatus according to an example embodiment of the present disclosure may include a passive vibration member 110 and one or more vibration generating apparatuses 1200.

The "apparatus" according to an example embodiment of the present disclosure may be applied to implement a display apparatus, a sound apparatus, a sound generating apparatus, a sound bar, an analog signage or a digital signage, or the like, but embodiments of the present disclosure are not limited thereto.

The display apparatus may include a display panel which includes a plurality of pixels for implementing a black/white or color image, and a driver for driving the display panel. The image according to an example embodiment of the present disclosure may include an electronic image, a digital image, a still image, or a video image, or the like, but embodiments of the present disclosure are not limited thereto. For example, the display panel may be a liquid crystal display panel, an organic light emitting display panel, a light emitting diode display panel, an electrophoresis display panel, an electro-wetting display panel, a micro light emitting diode display panel, or a quantum dot light emitting display panel, or the like, but embodiments of the present disclosure are not limited thereto. For example, in the organic light emitting display panel, a pixel may include an organic light emitting device such as an organic light emitting layer or the like, and the pixel may be a subpixel which implements any one of a plurality of colors configuring a color image. Accordingly, the "apparatus" according to an example embodiment of the present disclosure may include a set electronic apparatus or a set device (or a set apparatus) such as a notebook computer, a television, a computer monitor, an equipment apparatus including an automotive apparatus or another type apparatus for vehicles, or a mobile electronic apparatus such as a smartphone or an electronic pad, or the like, which is a complete product (or a final product) including the display panel such as the liquid crystal display panel or the organic light emitting display panel, or the like.

The analog signage may be an advertising signboard, a poster, a noticeboard, or the like. The analog signage may include signage content such as a sentence, a picture, and a sign, or the like. The signage content may be disposed at the passive vibration member 110 of the apparatus to be visible. For example, the signage content may be directly attached on the passive vibration member 110 and the signage content may be printed or the like on a medium such as paper, and the medium may be attached on the passive vibration member 110.

The passive vibration member 110 may vibrate based on driving (or vibration) of the one or more vibration generating apparatuses 1200. For example, the passive vibration member 110 may generate one or more of a vibration and a sound based on driving of the one or more vibration generating apparatuses 1200.

The passive vibration member 110 according to an example embodiment of the present disclosure may be a display panel including a display part (or a screen) including a plurality of pixels which implement a black/white or color image. Therefore, the passive vibration member 110 may generate one or more of a vibration and a sound based on driving of the one or more vibration generating apparatuses 1200. For example, the passive vibration member 110 may vibrate based on driving of the vibration generating apparatus 1200 while displaying an image on the display area, thereby generating or outputting a sound synchronized with the image in the display area. Accordingly, the passive vibration member 110 may be a vibration object, a display member, a display panel, a signage panel, a passive vibration plate, a front cover, a front member, a vibration panel, a sound panel, a passive vibration panel, a sound output plate, a sound vibration plate, or an image screen, or the like, but embodiments of the present disclosure are not limited thereto.

The passive vibration member 110 according to another example embodiment of the present disclosure may be a vibration plate which includes a metal material or a nonmetal material or a composite nonmetal material having a material characteristic suitable to output sound. For example, the passive vibration member 110 may be a vibration plate which includes a metal material or a nonmetal material or a composite nonmetal material having a material characteristic suitable for being vibrated by the one or more vibration generating apparatuses 1200 to output sound. For example, the passive vibration member 110 may include one or more materials of metal, wood, rubber, plastic, glass, fiber, cloth, paper, mirror, leather, and carbon. For example, the paper may be cone paper for speakers. For example, the cone paper may be pulp or foamed plastic, or the like, but embodiments of the present disclosure are not limited thereto.

The passive vibration member 110 according to another example embodiment of the present disclosure may include a display panel including a pixel which displays an image, or may include a non-display panel. For example, the passive vibration member 110 may include one or more among a display panel including a pixel configured to display an image, a screen panel on which an image is to be projected from a display apparatus, a lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror, but embodiments of the present disclosure are not limited thereto. For example, the non-display panel may be a light emitting diode lighting panel (or apparatus), an organic light emitting lighting panel (or apparatus), or an inorganic light emitting lighting panel (or apparatus), but embodiments of the present disclosure are not limited thereto.

The one or more vibration generating apparatuses 1200 may be configured to vibrate the passive vibration member 110. The one or more vibration generating apparatuses 1200 may be configured to be connected to a rear surface 110*a* of the passive vibration member 110 by a connection member 1150. Accordingly, the one or more vibration generating apparatuses 1200 may vibrate the passive vibration member 110 to generate or output one or more of a vibration and a sound based on a vibration of the passive vibration member 110. The rear surface 110*a* of the passive vibration member 110 may be a rearward surface, a backside surface, a backward surface, a bottom surface, or a lower surface, but embodiments of the present disclosure are not limited thereto.

The one or more vibration generating apparatuses 1200 may include one or more of the vibration apparatus described above with reference to FIGS. 1 to 14. Accordingly, descriptions of the vibration apparatus described above with reference to FIGS. 1 to 14 may be included in descriptions of the vibration generating apparatus 1200 illustrated in FIGS. 15 and 16, and thus, like reference numerals refer to like elements, and repeated descriptions may be omitted.

The connection member 1150 may be disposed between the vibration generating apparatus 1200 and the passive vibration member 110. The connection member 1150 may be disposed between at least a portion of the vibration generating apparatus 1200 and the passive vibration member 110. The connection member 1150 according to an example embodiment of the present disclosure may be connected between the passive vibration member 110 and a center portion, except a periphery portion, of the vibration generating apparatus 1200. For example, the connection member 1150 may be connected between the passive vibration member 110 and the center portion of the vibration generating apparatus 1200 based on a partial attachment scheme (or a local bonding scheme). The center portion (or a central portion) of the vibration generating apparatus 1200 may be a center of a vibration, and thus, a vibration of the vibration generating apparatus 1200 may be effectively transferred to the passive vibration member 110 through the connection member 1150. A periphery portion of the vibration generating apparatus 1200 may be spaced apart from each of the connection member 1150 and the passive vibration member 110 and lifted without being connected to the connection member 1150 and/or the passive vibration member 110, and thus, in a flexural vibration (or a bending vibration) of the vibration generating apparatus 1200, a vibration of a periphery portion of the vibration generating apparatus 1200 may be prevented (or reduced) by the connection member 1150 and/or the passive vibration member 110, whereby a vibration amplitude (or a displacement amplitude) of the vibration generating apparatus 1200 may increase. Accordingly, a vibration amplitude (or a displacement amplitude) of the passive vibration member 110 based on a vibration of the vibration generating apparatus 1200 may increase, and thus, a sound characteristic and/or a sound pressure level characteristic of a low-pitched sound band generated based on a vibration of the passive vibration member 110 may be further enhanced.

The connection member 1150 according to another example embodiment of the present disclosure may be connected to or attached on an entire front surface of each of the one or more vibration generating apparatuses 1200 and the rear surface 110*a* of the passive vibration member 110 based on an entire surface attachment scheme (or an entire surface bonding scheme).

The connection member 1150 according to an example embodiment of the present disclosure may be configured as a material including an adhesive layer which is good in adhesive force or attaching force with respect to each of the one or more vibration generating apparatuses 1200 and a rear surface of the display panel or a rear surface 110*a* of the passive vibration member 110. For example, the connection member 1150 may include an adhesive, a double-sided tape, a single-sided tape, a double-sided adhesive, a single-sided adhesive, a double-sided foam tape, a single-sided foam tape, a single-sided cushion tape, a double-sided cushion tape, a double-sided adhesive foam pad, or a single-sided adhesive foam pad, or the like, but embodiments of the present disclosure are not limited thereto. For example, the adhesive layer of the connection member 1150 may include epoxy, acrylic, silicone, or urethane, but embodiments of the present disclosure are not limited thereto. For example, the adhesive layer of the connection member 1150 may include an acrylic-based material (or a substance) having a characteristic where an adhesive force is relatively better and hardness is higher than the urethane material. Accordingly, the transmission efficiency of a vibration transmitted from the one or more vibration generating apparatuses 1200 to the passive vibration member 110 may be increased.

The apparatus according to an example embodiment of the present disclosure may further include a supporting member 300 and a coupling member 350.

The supporting member 300 may be disposed at the rear surface 110*a* of the passive vibration member 110. The supporting member 300 may be disposed at the rear surface 110*a* of the passive vibration member 110 to cover the one or more vibration generating apparatuses 1200. The supporting member 300 may be disposed at the rear surface 110*a* of the passive vibration member 110 to cover all of the rear surface 110*a* of the passive vibration member 110 and the one or more vibration generating apparatuses 1200. For example, the supporting member 300 may have a same size as the passive vibration member 110. For example, the supporting member 300 may cover the rear surface of the passive vibration member 110 with a gap space GS and the one or more vibration generating apparatuses 1200 therebetween. For example, the supporting member 300 may cover an entire rear surface of the passive vibration member 110 with a gap space GS and the one or more vibration generating apparatuses 1200 therebetween. The gap space GS may be provided by the coupling member 350 disposed between the passive vibration member 110 and the supporting member 300 facing each other. The gap space GS may be referred to as an air gap, an accommodating space, a vibration space, or a sound sounding box, but embodiments of the present disclosure are not limited thereto.

The supporting member 300 may include any one material of a glass material, a metal material, and a plastic material, but embodiments of the present disclosure are not limited thereto. For example, the supporting member 300 may include a stacked structure in which one or more of a glass material, a plastic material, and a metal material is stacked thereof, but embodiments of the present disclosure are not limited thereto.

Each of the passive vibration member 110 and the supporting member 300 may have a square shape or a rectangular shape, but embodiments of the present disclosure are not limited thereto. For example, each of the passive vibration member 110 and the supporting member 300 may have a polygonal shape, a non-polygonal shape, a circular shape, or an oval shape. For example, when the apparatus according to an example embodiment of the present disclosure is applied to a sound apparatus or a sound bar, each of the passive vibration member 110 and the supporting member 300 may have a rectangular shape where a length of a long side is twice or more times longer than a short side, but embodiments of the present disclosure are not limited thereto.

The coupling member 350 may be configured to be connected between a rear periphery portion of the passive vibration member 110 and a front periphery portion of the supporting member 300, and thus, the gap space GS may be provided between the passive vibration member 110 and the supporting member 300 facing each other.

The coupling member 350 according to an example embodiment of the present disclosure may include an elastic material which has adhesive properties and is capable of compression and decompression. For example, the coupling member 350 may include an adhesive, a double-sided tape, a single-sided tape, a double-sided adhesive, a single-sided adhesive, a double-sided foam tape, a single-sided foam tape, a single-sided cushion tape, a double-sided cushion tape, a double-sided adhesive foam pad, or a single-sided adhesive foam pad, or the like, but embodiments of the present disclosure are not limited thereto. For example, the coupling member 350 may include an elastic pad such as a rubber pad or a silicone pad, or the like, which has adhesive properties and is capable of compression and decompression. For example, the coupling member 350 may be formed by elastomer.

According to another example embodiment of the present disclosure, the supporting member 300 may further include a sidewall part which supports a rear periphery portion of the passive vibration member 110. The sidewall part of the supporting member 300 may protrude or be bent toward the rear periphery portion of the passive vibration member 110 from the front periphery portion of the supporting member 300, and thus, the gap space GS may be provided between the passive vibration member 110 and the supporting member 300. For example, the coupling member 350 may be configured to be connected between the sidewall part of the supporting member 300 and the rear periphery portion of the passive vibration member 110. Accordingly, the supporting member 300 may cover the one or more vibration generating apparatuses 1200 and may support the rear surface 110*a* of the passive vibration member 110. For example, the supporting member 300 may cover the one or more vibration generating apparatuses 1200 and may support the rear periphery portion of the passive vibration member 110.

In an example, the passive vibration member 110 may further include a sidewall part which is connected to a front periphery portion of the supporting member 300. The sidewall part of the passive vibration member 110 may protrude or be bent toward the front periphery portion of the supporting member 300 from the rear periphery portion of the passive vibration member 110, and thus, the gap space GS may be provided between the passive vibration member 110 and the supporting member 300. A stiffness of the passive vibration member 110 may be increased based on the sidewall part. For example, the coupling member 350 may be configured to be connected between the sidewall part of the passive vibration member 110 and the front periphery portion of the supporting member 300. Accordingly, the supporting member 300 may cover the one or more vibration generating apparatuses 200 and may support the rear surface 100*a* of the passive vibration member 110. For example, the supporting member 300 may cover the one or more vibration generating apparatuses 1200 and may support the rear periphery portion of the passive vibration member 110.

The apparatus according to an example embodiment of the present disclosure may further include one or more enclosure 250.

The enclosure 250 may be disposed at the rear surface 110*a* of the passive vibration member 110. The enclosure 250 may cover the one or more vibration generating apparatuses 1200. For example, the enclosure 250 may be connected or coupled to the rear periphery portion of the passive vibration member 110 to individually cover the one or more vibration generating apparatuses 200. For example, the enclosure 250 may be connected or coupled to the rear surface 110*a* of the passive vibration member 110 by a coupling member 251. The enclosure 250 may configure a closed space which covers or surrounds the one or more vibration generating apparatuses 1200 at the rear surface 110*a* of the passive vibration member 110. For example, the enclosure 250 may be a case, an outer case, a case member, a housing member, a cabinet, a closed member, a closed cap, a closed box, or a sound box, but embodiments of the present disclosure are not limited thereto. The closed space may be an air gap, a vibration space, a sound space, or a sound sounding box, but embodiments of the present disclosure are not limited thereto.

The coupling member 251 according to an example embodiment of the present disclosure may be configured as or with a material including an adhesive layer which is good in adhesive force or attaching force with respect to each of the enclosure 250 and a rear surface of the display panel or a rear surface 110*a* of the passive vibration member 110. For example, the coupling member 251 may include an adhesive, a double-sided tape, a single-sided tape, a double-sided adhesive, a single-sided adhesive, a double-sided foam tape, a single-sided foam tape, a single-sided cushion tape, a double-sided cushion tape, a double-sided adhesive foam pad, or a single-sided adhesive foam pad, or the like, but embodiments of the present disclosure are not limited thereto. For example, the adhesive layer of the coupling member 251 may include epoxy, acrylic, silicone, or urethane, but embodiments of the present disclosure are not limited thereto.

The enclosure 250 may include one or more materials of a metal material, a nonmetal material, and a composite nonmetal material. For example, the enclosure 250 may include one or more materials of a metal, plastic, carbon, and wood, but embodiments of the present disclosure are not limited thereto.

The enclosure 250 according to an example embodiment of the present disclosure may maintain an impedance component based on air acting on the passive vibration member 110 when the passive vibration member 110 or the vibration generating apparatus 1200 is vibrating. For example, air around the passive vibration member 110 may resist a vibration of the passive vibration member 110 and may act as an impedance component having a reactance component and a resistance based on a frequency. Therefore, the enclosure 250 may configure a closed space which surrounds the one or more vibration generating apparatuses 200, in the rear surface 110*a* of the passive vibration member 110, and thus, may maintain an impedance component (or an air impedance or an elastic impedance) acting on the passive vibration member 110 based on air, thereby enhancing a sound characteristic and/or a sound pressure level characteristic of the low-pitched sound band and enhancing the quality of a sound of a high-pitched sound band.

Figure 17:
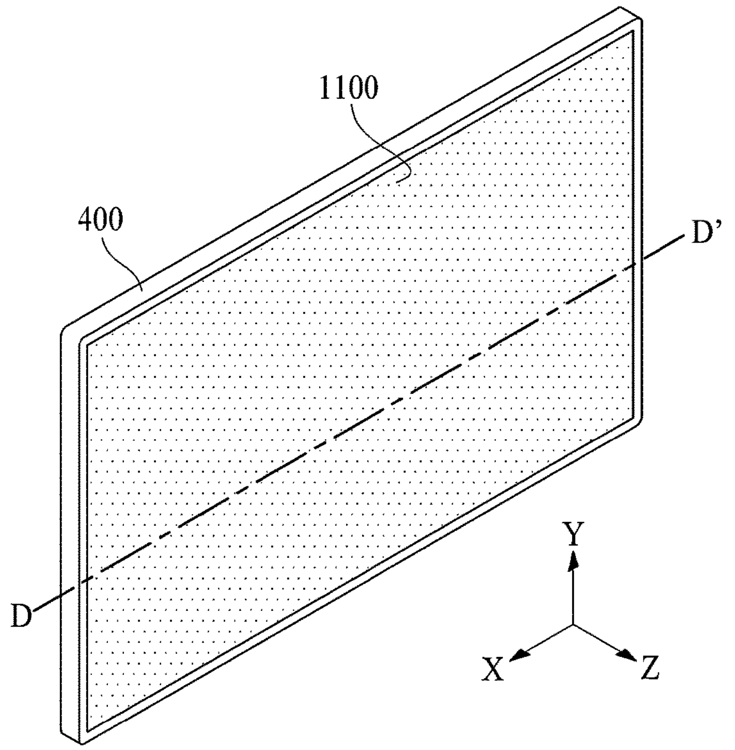
FIG. 17 illustrates an apparatus according to another example embodiment of the present disclosure.
Figure 18:
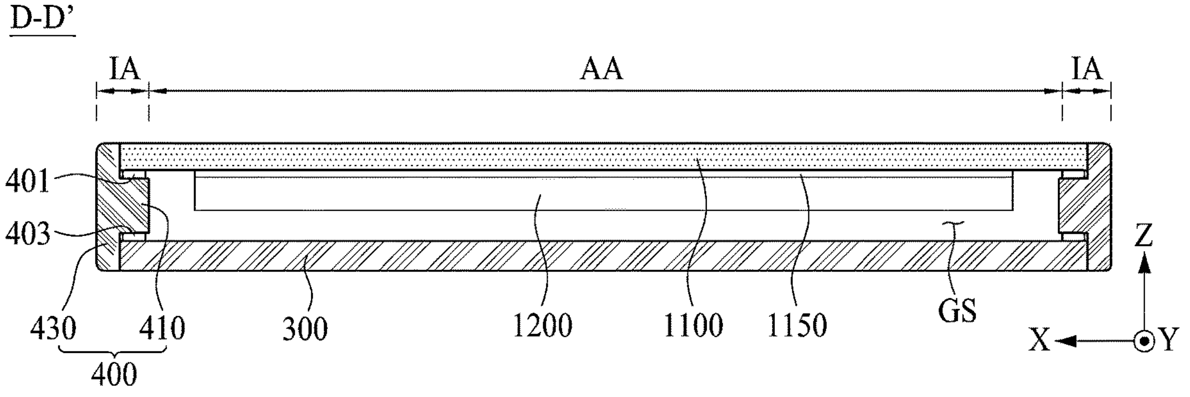
FIG. 18 is a cross-sectional view taken along line D-D' illustrated in FIG. 17 according to another example embodiment of the present disclosure.

FIG. 17 illustrates an apparatus according to another example embodiment of the present disclosure. FIG. 18 is a cross-sectional view taken along line D-D' illustrated in FIG. 17 according to another example embodiment of the present disclosure.

With reference to FIGS. 17 and 18, an apparatus (or a display apparatus) according to an example embodiment of the present disclosure may include a display panel (or a vibration object) 1100 to display an image, and a vibration generating apparatus 1200 which vibrates the display panel 1100 at a rear surface (or a backside surface) of the display panel 1100.

The display panel 1100 may display an image, for example, an electronic image, a digital image, a still image, or a video image, and the like, but embodiments of the present disclosure are not limited thereto. For example, the display panel 1100 may output light to display an image. The display panel 1100 may be a curved display panel, or may be any type of display panel, such as a liquid crystal display panel, an organic light-emitting display panel, a quantum dot light-emitting display panel, a micro light-emitting diode display panel, and an electrophoresis display panel, or the like. The display panel 1100 may be a flexible display panel. For example, the display panel 1100 may be a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto.

The display panel 1100 according to an example embodiment of the present disclosure may include a display area AA for displaying an image according to driving of the plurality of pixels. In addition, the display panel 1100 may include a non-display area IA surrounding the display area AA, but embodiments of the present disclosure are not limited thereto.

The display panel 1100 according to an example embodiment of the present disclosure may include a pixel array part disposed on the display area AA of a substrate. The pixel array part may include a plurality of pixels which display an image based on a signal supplied through signal lines. The signal lines may include a gate line, a data line, a pixel driving power line, or the like, but embodiments of the present disclosure are not limited thereto.

Each of the plurality of pixels may include a pixel circuit layer including a driving thin film transistor (TFT) provided at a pixel area configured by a plurality of gate lines and/or a plurality of data lines, a first electrode (or a pixel electrode) electrically connected to the driving TFT, a light emitting device formed over the first electrode, and a second electrode (or a common electrode) electrically connected to the light emitting device.

The light emitting device according to an example embodiment may include an organic light emitting device layer formed over the first electrode. The organic light emitting device layer may be implemented to emit light having the same color (for example, white light or blue light) for each pixel, or may be implemented to emit light having a different color (for example, red light, green light, or blue light) for each pixel.

The light emitting device according to another example embodiment of the present disclosure may include a micro light emitting diode device electrically connected to each of the first electrode and the second electrode. The micro light emitting diode device may be a light emitting diode implemented as an integrated circuit (IC) or chip type. The micro light emitting diode device may include a first terminal electrically connected to the first electrode of the light emitting device and a second terminal electrically connected to the second electrode of the light emitting device.

The display panel 1100 according to an example embodiment of the present disclosure may include a first substrate, a second substrate, and a liquid crystal layer. The first substrate may be an upper substrate or a thin film transistor (TFT) array substrate. For example, the first substrate may include a pixel array including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage. The second substrate may be a lower substrate or a color filter array substrate. For example, the second substrate may include a pixel opening pattern including an opening area overlapping with the pixel area formed at the first substrate, and a color filter layer formed at the opening area. The liquid crystal layer may be disposed between the first substrate and the second substrate. The liquid crystal layer may include a liquid crystal including liquid crystal molecules where an alignment direction thereof is changed based on an electric field generated by the common voltage and a data voltage applied to a pixel electrode for each pixel.

The vibration generating apparatus 1200 may vibrate the display panel 1100 at the rear surface of the display panel 1100, thereby providing a sound and/or a haptic feedback based on the vibration of the display panel 1100 to a user. The vibration generating apparatus 1200 may be implemented at the rear surface of the display panel 1100 to directly vibrate the display panel 1100.

According to an example embodiment of the present disclosure, the vibration generating apparatus 1200 may vibrate according to a vibration driving signal synchronized with an image displayed on the display panel 1100 to vibrate the display panel 1100. As another example embodiment of the present disclosure, the vibration generating apparatus 1200 may vibrate according to a haptic feedback signal (or a tactile feedback signal) synchronized with a user touch applied to a touch panel (or a touch sensor layer) which is disposed over the display panel 1100 or embedded into the display panel 1100 and may vibrate the display panel 1100. Accordingly, the display panel 1100 may vibrate based on a vibration of the vibration generating apparatus 1200 to provide a user (or a viewer) with at least one or more of a sound and a haptic feedback.

The vibration generating apparatus 1200 according to an example embodiment of the present disclosure may be implemented to have a size corresponding to the display area AA of the display panel 1100. A size of the vibration generating apparatus 1200 may be 0.9 to 1.1 times a size of the display area AA, but embodiments of the present disclosure are not limited thereto. For example, a size of the vibration generating apparatus 1200 may be a same as or smaller than the size of the display area AA. For example, a size of the vibration generating apparatus 1200 may be a same as or approximately a same as the display area AA of the display panel 1100, and thus, the vibration generating apparatus 1200 may cover a most region of the display panel 1100 and a vibration generated by the vibration generating apparatus 1200 may vibrate a whole portion of the display panel 1100, and thus, localization of a sound may be high, and satisfaction of a user may be improved. Moreover, a contact area (or panel coverage) between the display panel 1100 and the vibration generating apparatus 1200 may increase, and thus, a vibration region of the display panel 1100 may increase, thereby improving a sound of a middle-low-pitched sound band generated based on a vibration of the display panel 1100. Furthermore, a vibration generating apparatus 1200 applied to a large-sized display apparatus may vibrate the whole display panel 1100 having a large size (or a large area), and thus, localization of a sound based on a vibration of the display panel 1100 may be further enhanced, thereby realizing an improved sound effect.

The vibration generating apparatus 1200 according to an example embodiment of the present disclosure may include one or more of the vibration apparatus described above with reference to FIGS. 1 to 14, and thus, repeated descriptions are omitted.

The apparatus according to an example embodiment of the present disclosure may further include a connection member 1150 disposed between the display panel 1100 and the vibration generating apparatus 1200.

The connection member 1150 may be disposed between the display panel 1100 and the vibration generating apparatus 1200, and thus, may connect or couple the vibration generating apparatus 1200 to the rear surface of the display panel 1100. For example, the vibration generating apparatus 1200 may be directly connected or coupled to the rear surface of the display panel 1100 by using the connection member 1150, and thus, may be supported by or disposed at the rear surface of the display panel 1100.

The connection member 1150 according to an example embodiment of the present disclosure may be configured as a material including an adhesive layer which is good in adhesive force or attaching force with respect to each of the vibration generating apparatus 1200 and a rear surface of the display panel. For example, the connection member 1150 may include an adhesive, a double-sided tape, a single-sided tape, a double-sided adhesive, a single-sided adhesive, a double-sided foam tape, a single-sided foam tape, a single-sided cushion tape, a double-sided cushion tape, a double-sided adhesive foam pad, or a single-sided adhesive foam pad, or the like, but embodiments of the present disclosure are not limited thereto. For example, the adhesive layer of the connection member 1150 may include epoxy, acrylic, silicone, or urethane, but embodiments of the present disclosure are not limited thereto. For example, the adhesive layer of the connection member 1150 may include an acrylic-based material (or a substance) having a characteristic where an adhesive force is relatively better and hardness is higher than the urethane material. Accordingly, the transmission efficiency of a vibration transmitted from the vibration generating apparatus 1200 to the display panel 1100 may be increased.

The connection member 1150 according to another example embodiment of the present disclosure may further include a hollow portion provided between the display panel 1100 and the vibration generating apparatus 1200. The hollow portion of the connection member 1150 may provide an air gap between the display panel 1100 and the vibration generating apparatus 1200. Due to the air gap, a sound wave (or a sound pressure) based on a vibration of the vibration generating apparatus 1200 may not be dispersed by the connection member 1150, and may concentrate on the display panel 1100. Thus, the loss of a vibration caused by the connection member 1150 may be minimized, thereby increasing a sound pressure level characteristic of a sound generated based on a vibration of the display panel 1100.

The apparatus according to an example embodiment of the present disclosure may further include a supporting member 300 disposed at a rear surface of the display panel 1100.

The supporting member 300 may cover a rear surface of the display panel 1100. For example, the supporting member 300 may cover an entire rear surface of the display panel 1100 with a gap space GS therebetween. For example, the supporting member 300 may include at least one or more of a glass material, a metal material, and a plastic material, but embodiments of the present disclosure are not limited thereto. For example, the supporting member 300 may be a rear surface structure, a set structure, a cover bottom, or a back cover, but embodiments of the present disclosure are not limited thereto.

The apparatus according to an example embodiment of the present disclosure may further include a middle frame 400.

The middle frame 400 may be disposed between a rear periphery portion of display panel 1100 and a front periphery portion of the supporting member 300. The middle frame 400 may support one or more of the rear periphery portion of the display panel 1100 and the front periphery portion of the supporting member 300 and may surround one or more of side surfaces of each of the display panel 1100 and the supporting member 300. The middle frame 400 may provide a gap space GS between the display panel 1100 and the supporting member 300. The middle frame 400 may be a middle cabinet, a middle cover, or a middle chassis, and the like, but embodiments of the present disclosure are not limited thereto.

The middle frame 400 according to an example embodiment of the present disclosure may include a first supporting portion 410 and a second supporting portion 430.

The first supporting portion 410 may be disposed between the rear periphery portion of the display panel 1100 and the front periphery portion of the supporting member 300, and thus, may provide the gap space GS between the display panel 1100 and the supporting member 300. A front surface of the first supporting portion 410 may be coupled or connected to the rear periphery portion of the display panel 1100 by a first connection member 401. A rear surface of the first supporting portion 410 may be coupled or connected to the front periphery portion of the supporting member 300 by a second connection member 403. For example, the first supporting portion 410 may have a single picture frame structure having a square shape or a frame structure having a plurality of divided bar shapes.

The second supporting portion 430 may be vertically coupled to an outer surface of the first supporting portion 410 in parallel with a thickness direction Z of the apparatus. The second supporting portion 430 may surround one or more of an outer surface of the display panel 1100 and an outer surface of the supporting member 300, thereby protecting the outer surface of each of the display panel 1100 and the supporting member 300. The first supporting portion 410 may protrude from an inner surface of the second supporting portion 430 toward the gap space GS between the display panel 1100 and the supporting member 300.

According to an example embodiment of the present disclosure, the middle frame 400 may be coupled or connected to the rear periphery portion of the display panel 1100 by the first connection member 401. The middle frame 400 may be coupled or connected to the front periphery portion of the supporting member 300 by the second connection member 403.

The apparatus according to an example embodiment of the present disclosure may include a connection member (or a panel connection member) instead of the middle frame 400. The connection member may be disposed between the rear periphery portion of the display panel 1100 and the front periphery portion of the supporting member 300 and may provide the gap space GS between the display panel 1100 and the supporting member 300. The connection member may be disposed between the rear periphery portion of the display panel 1100 and the front periphery portion of the supporting member 300 to adhere the display panel 1100 and the supporting member 300.

For example, the connection member (or the panel connection member) may be implemented as an adhesive, a double-sided tape, a single-sided tape, a double-sided foam tape, a single-sided foam tape, or a double-sided adhesive foam pad, but embodiments of the present disclosure are not limited thereto. For example, an adhesive layer of the connection member may include epoxy, acrylic, silicone, or urethane, but embodiments of the present disclosure are not limited thereto. For example, an adhesive layer of the connection member may include a urethane-based material (or substance) which relatively has a ductile characteristic than acrylic. Accordingly, a vibration of the display panel 1100 transmitted to the supporting member 300 may be minimized.

In the apparatus according to an example embodiment of the present disclosure, when the apparatus includes the connection member (or the panel connection member) instead of a middle frame 400, the supporting member 300 may include a bending sidewall which is bent from an end (or an end portion) of the supporting member 300 and surrounds one or more of an outer surface (or an outer sidewall) of the display panel 1100. The bending sidewall according to an example embodiment of the present disclosure may have a single sidewall structure or a hemming structure. The hemming structure may be a structure where end portions of an arbitrary member are bent in a curve shape and overlap each other or are spaced apart from each other in parallel. For example, in order to enhance a sense of beauty in design, the bending sidewall may include a first bending sidewall, bent from one side (or an end) of the supporting member 300, and a second bending sidewall bent from the first bending sidewall to a region between the first bending sidewall and an outer surface of the display panel 1100. The second bending sidewall may be spaced apart from an inner surface of the first bending sidewall. Therefore, the second bending sidewall may prevent (or minimize) the outer surface of the display panel 1100 from contacting an inner surface of the first bending sidewall or may prevent a lateral-direction external impact from being transferred to the outer surface of the display panel 1100.

The apparatus (or the display apparatus) according to an example embodiment of the present disclosure may output a sound, generated by a vibration of the display panel 1100 based on a vibration of the vibration generating apparatus 1200 which is disposed at the rear of the display panel 1100, in a forward region in front of the display panel 1100.

In FIGS. 17 and 18, although it has been described that the vibration generating apparatus 1200 vibrates the display panel 1100 to generate or output sound, the embodiments of the present disclosure are not limited thereto. For example, the vibration generating apparatus 1200 may vibrate other vibration member (or other vibration object) other than the display panel 1100 of the vibration member (or vibration object) described above, to generate or output a sound.

Figure 19:
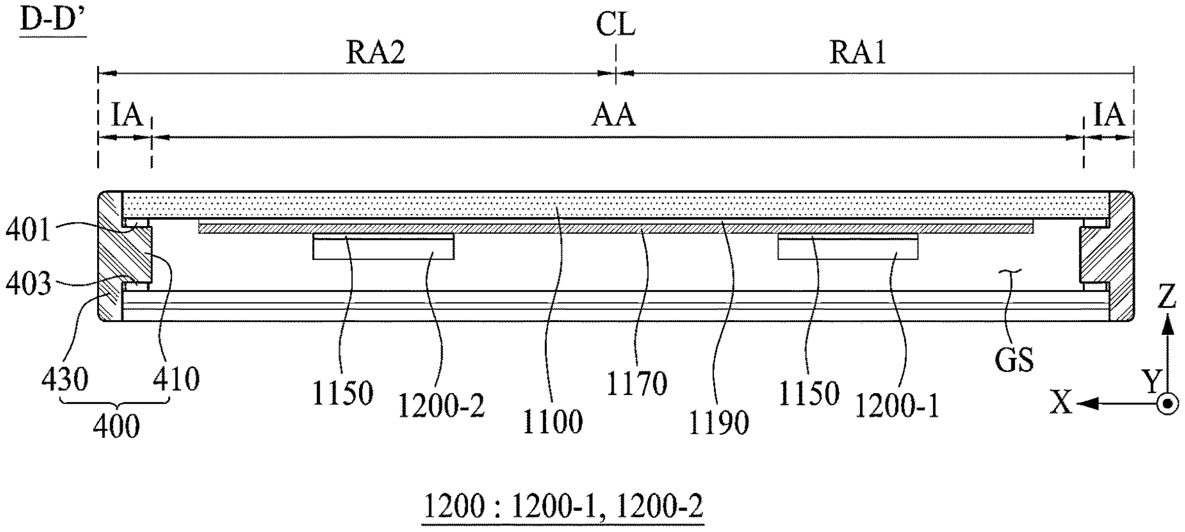
FIG. 19 is another cross-sectional view taken along line D-D' illustrated in FIG. 17 according to another example embodiment of the present disclosure.

FIG. 19 is another cross-sectional view taken along line D-D' illustrated in FIG. 17 according to another example embodiment of the present disclosure. FIG. 19 illustrates an example embodiment implemented by modifying a vibration generating apparatus illustrated in FIG. 17. Therefore, in the following description, repeated descriptions of elements other than the vibration generating apparatus and elements relevant thereto may be omitted or will be briefly given.

With reference to FIGS. 17 and 19, in the apparatus according to another example embodiment of the present disclosure, a display panel 1100 may include a first rear region RA1 and a second rear region RA2. For example, the first rear region RA1 may be a right rear region of the display panel 1100, and the second rear region RA2 may be a left rear region of the display panel 1100. The first and second rear regions RA1 and RA2 may be a left-right symmetrical in a center line CL of the display panel 1100 with respect to a first direction X, but embodiments of the present disclosure are not limited thereto. For example, each of the first and second rear regions RA1 and RA2 may overlap the display area AA of the display panel 1100.

The vibration generating apparatus 1200 according to another example embodiment of the present disclosure may include a first vibration generating apparatus 1200-1 and a second vibration generating apparatus 1200-2.

The first vibration generating apparatus 1200-1 may be disposed at the first rear region RA1 of the display panel 1100. A size of the first vibration generating apparatus 1200-1 may have a same size as the first rear area RA1 of the display panel 1100 or may have a size smaller than the first rear area RA1 of the display panel 1100 based on a characteristic of a first sound or a sound characteristic needed for the apparatus. For example, the first vibration generating apparatus 1200-1 may be disposed close to a center or a periphery within the first rear region RA1 of the display panel 1100 with respect to the first direction X.

According to an example embodiment of the present disclosure, the first vibration generating apparatus 1200-1 may vibrate the first rear region RA1 of the display panel 1100, and thus, may generate the first sound of at least one of a first vibration sound, a first orientation vibration sound, and a first haptic feedback at the first rear region RA1 of the display panel 1100. For example, the first vibration generating apparatus 1200-1 may directly vibrate the first rear region RA1 of the display panel 1100, and thus, may generate the first sound in the first rear region RA1 of the display panel 1100. For example, the first sound may be a right sound.

The second vibration generating apparatus 1200-2 may be disposed at the second rear region RA2 of the display panel 1100. A size of the second vibration generating apparatus 1200-2 may have a same size as the second rear area RA2 of the display panel 1100 or may have a size smaller than the second rear area RA2 of the display panel 1100 based on a characteristic of the second sound or the sound characteristic needed for the apparatus. For example, the second vibration generating apparatus 1200-2 may be disposed close to a center or a periphery within the second rear region RA2 of the display panel 1100 with respect to the first direction X.

According to an example embodiment of the present disclosure, the second vibration generating apparatus 1200-2 may vibrate the second rear region RA2 of the display panel 1100, and thus, may generate the second sound of at least one of a second vibration sound, a second orientation vibration sound, and a second haptic feedback at the second rear region RA2 of the display panel 1100. For example, the second vibration generating apparatus 1200-2 may directly vibrate the second rear region RA2 of the display panel 1100, and thus, may generate the second sound in the second rear region RA2 of the display panel 1100. For example, the second sound may be a left sound.

The first and second vibration generating apparatuses 1200-1 and 1200-2 may have a same size or different sizes to each other based on a sound characteristic of left and right sounds and/or a sound characteristic of the apparatus. Moreover, the first and second vibration generating apparatuses 1200-1 and 1200-2 may be disposed in a left-right symmetrical structure or a left-right asymmetrical structure with respect to the center line CL of the display panel 1100.

Each of the first vibration generating apparatus 1200-1 and the second vibration generating apparatus 1200-2 may include one or more of the vibration apparatus described above with reference to FIGS. 1 to 14, and thus, repeated descriptions may be omitted.

Each of the first vibration generating apparatus 1200-1 and the second vibration generating apparatus 1200-2 may disposed at the rear surface of the display panel 1100 by the connection member 1150. The connection member 1150 may be substantially the same as the connection member 1150 described above with reference to FIG. 18, and thus, repeated descriptions may be omitted.

The apparatus (or a display apparatus) according to another example embodiment of the present disclosure may output a left sound and a right sound to a forward region in front of the display panel 1100 through the first vibration generating apparatus 1200-1 and the second vibration generating apparatus 1200-2.

The apparatus according to another example embodiment of the present disclosure may further include a plate 1170 which is disposed between the display panel 1100 and the vibration generating apparatus 1200.

The plate 1170 may have the same shape and size as the rear surface of the display panel 1100, or may have a same shape and size as the vibration generating apparatus 1200. As another example embodiment of the present disclosure, the plate 1170 may have a size different from the display panel 1100. For example, the plate 1170 may be smaller than the size of the display panel 1100. As another example embodiment of the present disclosure, the plate 1170 may have a size different from the vibration generating apparatus 1200. For example, the plate 1170 may be greater or smaller than the size of the vibration generating apparatus 1200. The vibration generating apparatus 1200 may be a same as or smaller than the size of the display panel 1100.

The plate 1170 may be connected or coupled to rear surface of the display panel 1100 by a plate coupling member (or a coupling member) 1190. Thus, the vibration generating apparatus 1200 may be connected or coupled to a rear surface of the plate 1170 by the connection member 1150, and thus, may be supported by or hung at the rear surface of the plate 1170.

The plate 1170 according to an example embodiment of the present disclosure may include a plurality of opening portions. The plurality of opening portions may be configured to have a predetermined size and a predetermined interval. For example, the plurality of opening portions may be formed along a first direction X and a second direction Y so as to have a predetermined size and a predetermined interval. Due to the plurality of opening portions, a sound wave (or a sound pressure) based on a vibration of the vibration generating apparatus 1200 may not be dispersed by the plate 1170, and may concentrate on the display panel 1100. Thus, the loss of a vibration caused by the plate 1170 may be minimized, thereby increasing a sound pressure level characteristic of a sound generated based on a vibration of the display panel 1100. For example, the plate 1170 including the plurality of openings may have a mesh shape. For example, the plate 1170 including the plurality of openings may be a mesh plate.

The plate 1170 according to an example embodiment of the present disclosure may include a metal material. For example, the plate 1170 may include any one or more materials of stainless steel, a magnesium (Mg), aluminum (Al), a magnesium (Mg) alloy, a magnesium-lithium (Mg—Li) alloy, and an Al alloy, but embodiments of the present disclosure are not limited thereto. Another for example, the plate 1170 may be a heat plate that dissipates heat occurring in the display panel 1100.

According to an example embodiment of the present disclosure, the plate 1170 including a metal material may reinforce a mass of the vibration generating apparatus 1200 which is disposed at or hung from the rear surface of the display panel 1100. Thus, the plate 1170 may decrease a resonance frequency of the vibration generating apparatus 1200 based on an increase in mass of the vibration generating apparatus 1200. Therefore, the plate 1170 may increase a sound characteristic and a sound pressure level characteristic of the low-pitched sound band generated based on a vibration of the vibration generating apparatus 1200 and may enhance the flatness of a sound pressure level characteristic. For example, the flatness of the sound pressure level characteristic may be a magnitude of a deviation between a highest sound pressure level and a lowest sound pressure level. For example, the plate 1170 may be a weight member, a mass member, or a sound planarization member, or the like, but embodiments of the present disclosure are not limited thereto.

Figure 20:
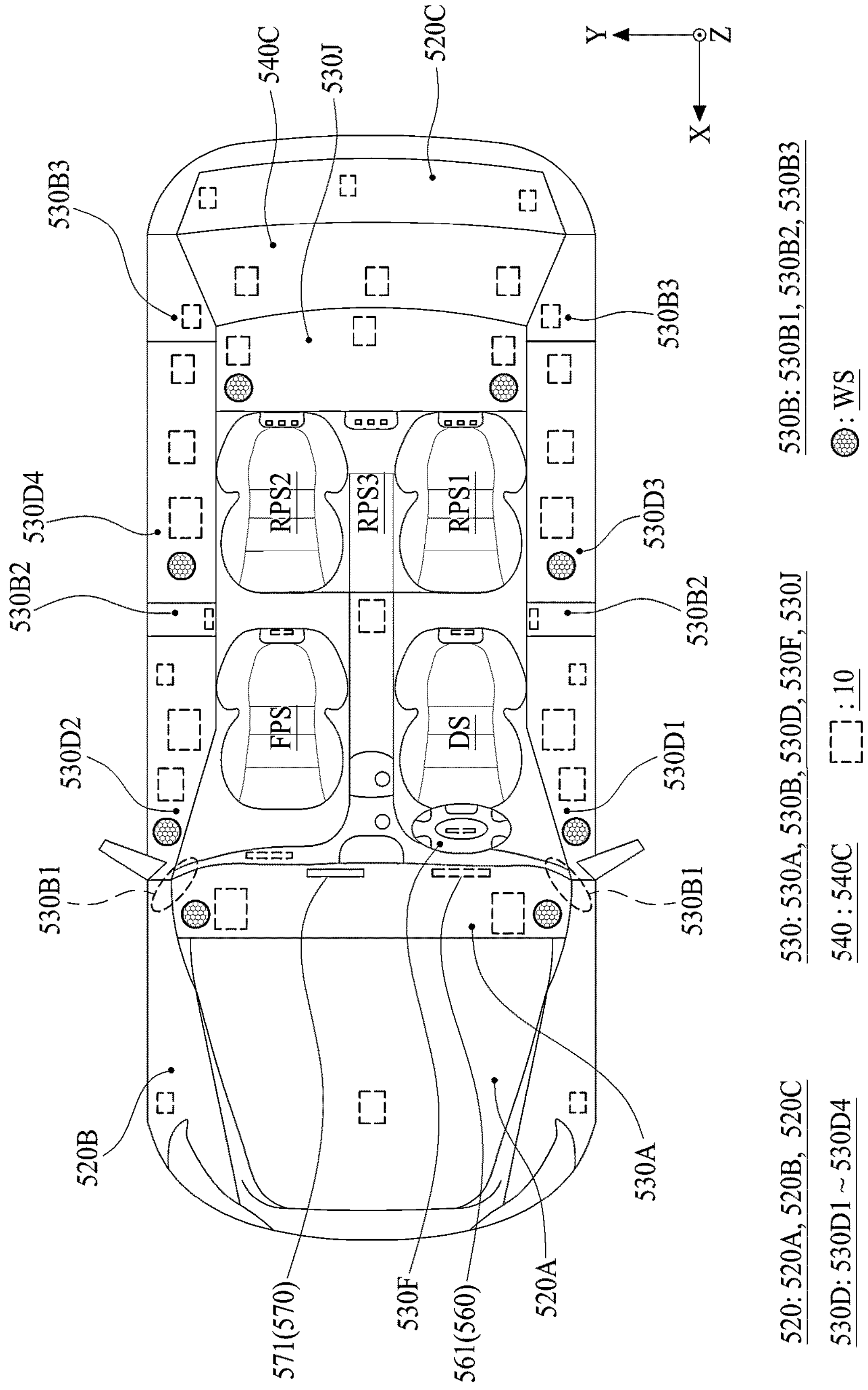
FIG. 20 illustrates a vehicular apparatus according to an example embodiment of the present disclosure.

FIG. 20 illustrates a vehicular apparatus according to an example embodiment of the present disclosure.

With reference to FIG. 20, a vehicular apparatus according to an example embodiment of the present disclosure may include one or more sound generating apparatuses 10 configured to output a sound at one or more of an exterior material 520 and an interior material 530. For example, one or more of the exterior material 520 and the interior material 530 may output a sound based on vibrations of one or more sound generating apparatuses 10. A portion illustrated by a dotted line in FIG. 20 indicates a portion where one or more sound generating apparatuses 10 may be disposed. The one or more sound generating apparatuses 10 may be sometimes referred to as one or more sound generating devices 10.

The one or more sound generating apparatuses 10 may be disposed at the exterior material 520, the interior material 530, or between the exterior material 520 and the interior material 530 to output a sound. For example, the one or more sound generating apparatuses 10 may be disposed at one or more of the exterior material 520, the interior material 530, and between the exterior material 520 and the interior material 530 to output a sound.

The interior material 530 may include one or more materials (or substance) of metal, wood, rubber, plastic, glass, fiber, cloth, paper, mirror, leather, and carbon, but embodiments of the present disclosure are not limited thereto. For example, the paper may be cone paper for speakers. For example, the cone paper may be pulp or foamed plastic, or the like, but embodiments of the present disclosure are not limited thereto.

The interior material 530 according to an example embodiment of the present disclosure may include at least one or more of a dashboard 530A, a pillar interior material (or a pillar trim) 530B, a roof interior material (or a headliner), a door interior material (or a door trim) 530D, a seat interior material, a handle interior material (or a steering cover) 530F, a floor interior material (or a floor carpet), and a rear package interior material (or a back seat shelf) 530J. The one or more sound generating apparatuses 10 may vibrate at least one or more of the dashboard 530A, the pillar interior material 530B, the roof interior material, the door interior material 530D, the seat interior material, the handle interior material 530F, the floor interior material, and the rear package interior material 530J. The one or more sound generating apparatuses 10 may be disposed between the exterior material 520 and at least one or more of the dashboard 530A, the pillar interior material 530B, the roof interior material, the door interior material 530D, the seat interior material, the handle interior material 530F, and the floor interior material. Accordingly, the one or more sound generating apparatuses 10 may output a sound or sounds of one or more channels.

For example, at least one or more of the one or more sound generating apparatuses 10 may be configured to be transparent or semitransparent. For example, when a window is totally transparent, at least one or more of the one or more sound generating apparatuses 10 may be configured to be transparent and may be disposed at a center region or a peripheral region of the window. When the window includes a semitransparent portion or an opaque portion, at least one or more of the one or more sound generating apparatuses 10 may be configured to be semitransparent or opaque and may be disposed at the semitransparent portion or the opaque portion of the window. For example, at least one or more of the one or more sound generating apparatuses 10 may be a transparent vibration generator, a transparent vibration generating apparatus, or a transparent sound generating apparatus and or the like, but embodiments of the present disclosure are not limited thereto.

With reference to FIG. 20, the one or more sound generating apparatuses 10 according to an example embodiment of the present disclosure may be disposed between a dash panel and the dashboard 530A and may be configured to indirectly or directly vibrate the dashboard 530A to output a sound. For example, the one or more sound generating apparatuses 10 may include the vibration apparatus (e.g., one or more of 200 and 201 to 204) described above with reference to FIGS. 1 to 14, and thus, repeated descriptions may be omitted. For example, the one or more sound generating apparatuses 10 may be a dashboard speaker or a first speaker, and the like, but embodiments of the present disclosure are not limited thereto.

According to an example embodiment of the present disclosure, at least one or more of the dash panel and the dashboard 530A may include a first region corresponding to a driver seat DS, a second region corresponding to a passenger seat FPS, and a third region (or a middle region) between the first region and the second region. At least one or more of the dash panel and the dashboard 530A may further include a fourth region which is inclined to face the passenger seat FPS. According to an example embodiment of the present disclosure, the one or more sound generating apparatuses 10 may be configured to vibrate at least one or more among the first to fourth regions of the dashboard 530A. For example, the one or more sound generating apparatuses 10 may be disposed at each of the first and second regions of the dashboard 530A, or may be disposed at each of the first to fourth regions of the dashboard 530A. For example, the one or more sound generating apparatuses 10 may be disposed at each of the first and second regions of the dashboard 530A, or may be disposed in at least one or more of the first to fourth regions of the dashboard 530A. For example, the one or more sound generating apparatuses 10 may be configured to output a sound of about 150 Hz to about 20 kHz. For example, the one or more sound generating apparatuses 10 configured to vibrate at least one or more among the first to fourth regions of the dashboard 530A may have a same sound output characteristic or different sound output characteristics. For example, the one or more sound generating apparatuses 10 configured to vibrate each of the first to fourth regions of the dashboard 530A may have a same sound output characteristic or different sound output characteristics.

The one or more sound generating apparatuses 10 according to an example embodiment of the present disclosure may be disposed between pillar panel and the pillar interior material 530B and may be configured to indirectly or directly vibrate the pillar interior material 530B to output a sound. For example, the one or more sound generating apparatuses 10 may include the vibration apparatus (e.g., one or more of 200 and 201 to 204) described above with reference to FIGS. 1 to 14, and thus, repeated descriptions may be omitted. The one or more sound generating apparatuses 10 may be a pillar speaker, a tweeter speaker, or a second speaker, and the like, but embodiments of the present disclosure are not limited thereto.

According to an example embodiment of the present disclosure, the pillar panel may include a first pillar (or an A pillar) disposed at both sides of a front glass window, a second pillar (or a B pillar) disposed at both sides of a center of a vehicle body, and a third pillar (or a C pillar) disposed at both sides of a rear portion of the vehicle body. The pillar interior material 530B may include a first pillar interior material 530B1 covering the first pillar, a second pillar interior material 530B2 covering the second pillar, and a third pillar interior material 530B3 covering the third pillar. According to an example embodiment of the present disclosure, the one or more sound generating apparatuses 10 may be disposed in at least one or more of a region between the first pillar and the first pillar interior material 530B1, a region between the second pillar and the second pillar interior material 530B2, and a region between the third pillar and the third pillar interior material 530B3, and thus, may vibrate at least one or more of the first to third pillar interior materials 530B1, 530B2, and 530B3. For example, the one or more sound generating apparatuses 10 may be configured to output a sound at about 2 kHz to about 20 kHz, but embodiments of the present disclosure are not limited thereto. For example, the one or more sound generating apparatuses 10 may be configured to output a sound at about 150 Hz to about 20 kHz. For example, the one or more sound generating apparatuses 10 configured to vibrate at least one or more of the first to third pillar interior materials 530B1, 530B2, and 530B3 may have a same sound output characteristic or different sound output characteristics.

The one or more sound generating apparatuses 10 according to an example embodiment of the present disclosure may be disposed between a roof panel and a roof interior material and may be configured to directly or indirectly vibrate the roof interior material 530C to output a sound. For example, the one or more sound generating apparatuses 10 may be configured to be transparent or semitransparent. For example, the one or more sound generating apparatuses 10 may include the vibration apparatus (e.g., one or more of 200 and 201 to 204) described above with reference to FIGS. 1 to 14, and thus, repeated descriptions may be omitted. For example, the one or more sound generating apparatuses 10 may be a roof speaker or a third speaker, and or the like, but embodiments of the present disclosure are not limited thereto.

According to an example embodiment of the present disclosure, at least one or more of the roof panel and the roof interior material covering the roof panel may include the first region corresponding to the driver seat DS, the second region corresponding to the passenger seat FPS, a third region corresponding to a region between the driver seat DS and the passenger seat FPS, a fourth region corresponding to a first rear seat RPS1 behind the driver seat DS, a fifth region corresponding to a second rear seat RPS2 behind the passenger seat FPS, a sixth region corresponding to a region between the first rear seat RPS1 and the second rear seat RPS2, and a seventh region between the third region and the sixth region. For example, the one or more sound generating apparatuses 10 may be configured to vibrate at least one or more among the first to seventh regions of the roof interior material. For example, the one or more sound generating apparatuses 10 may be configured to output a sound of about 150 Hz to about 20 kHz. For example, the one or more sound generating apparatuses 10 configured to vibrate at least one or more of the first to seventh regions of the roof interior material may have a same sound output characteristic or different sound output characteristics. For example, the one or more sound generating apparatuses 10 configured to vibrate each of the first to seventh regions of the roof interior material may have a same sound output characteristic or different sound output characteristics. For example, at least one or more of the one or more sound generating apparatuses 10 configured to vibrate at least one or more of the first to seventh regions of the roof interior material may be configured to output a sound of about 2 kHz to about 20 kHz, and the other sound generating apparatus 10 may be configured to output a sound at about 150 Hz to about 20 kHz. For example, at least one or more of the one or more sound generating apparatuses 10 configured to vibrate each of the first to seventh regions of the roof interior material may be configured to output a sound of about 2 kHz to about 20 kHz, and the other sound generating apparatus 10 may be configured to output a sound at about 150 Hz to about 20 kHz.

According to an example embodiment of the present disclosure, the one or more sound generating apparatuses 10 may be disposed between the door frame and the door interior material 530D and may be configured to indirectly or directly vibrate the door interior material 530D to output a sound. For example, the one or more sound generating apparatuses 10 may include the vibration apparatus (e.g., one or more of 200 and 201 to 204) described above with reference to FIGS. 1 to 14, and thus, repeated descriptions may be omitted. For example, the one or more sound generating apparatuses 10 may be a door speaker or a fourth speaker, and the like, but embodiments of the present disclosure are not limited thereto.

According to an example embodiment of the present disclosure, at least one or more of the door frame and the door interior material 530D may include an upper region, a middle region, and a lower region with respect to a height direction Z of the vehicular apparatus. For example, the one or more sound generating apparatuses 10 may be disposed in at least one or more of an upper region, a middle region, and a lower region between the door frame and the door interior material 530D, and thus, may vibrate at least one or more of an upper region, a middle region, and a lower region of the door interior material 530D.

According to an example embodiment of the present disclosure, the upper region of a door interior material 530D may include a curved portion having a curvature radius which is relatively small. The one or more sound generating apparatuses 10 for vibrating the upper region of the door interior material 530D may have the second portion 2311*b* having flexibility of the vibration device 2311 illustrated in one or more of the vibration apparatus described above with reference to FIGS. 9 to 11D, and 14, and thus, may be bent in a shape (or a conformal shape) based on a shape (or a surface shape) of a curved portion of the upper region of the door interior material 530D.

According to an example embodiment of the present disclosure, the door frame may include a first door frame (or a left front door frame), a second door frame (or a right front door frame), a third door frame (or a left rear door frame), and a fourth door frame (or a right rear door frame). According to an example embodiment of the present disclosure, the door interior material 530D may include a first door interior material (or a left front door interior material) 530D1 covering the first door frame, a second door interior material (or a right front door interior material) 530D2 covering the second door frame, a third door interior material (or a left rear door interior material) 530D3 covering the third door frame, and a fourth door interior material (or a right rear door interior material) 530D4 covering the fourth door frame. For example, the one or more sound generating apparatuses 10 may be disposed in at least one or more among an upper region, a middle region, and a lower region between each of the first to fourth door frames and the first to fourth door interior materials 530D1 to 530D4 and may vibrate at least one or more among an upper region, a middle region, and a lower region of each of the first to fourth door interior materials 530D1 to 530D4.

According to an example embodiment of the present disclosure, the one or more sound generating apparatuses 10 configured to vibrate the upper region of each of the first to fourth door interior materials 530D1 to 530D4 may be configured to output a sound of about 2 kHz to about 20 kHz, or may be configured to output a sound of about 150 Hz to about 20 kHz. For example, the one or more sound generating apparatuses 10 configured to vibrate the upper regions of at least one or more of the first to fourth door interior materials 530D1 to 530D4 may be configured to output a sound of about 2 kHz to about 20 kHz, or may be configured to output a sound of about 150 Hz to about 20 kHz.

According to an example embodiment of the present disclosure, the one or more sound generating apparatuses 10 configured to vibrate the middle regions or/and the lower regions of at least one or more of the first to fourth door interior materials 530D1 to 530D4 may be configured to output a sound of about 150 Hz to about 20 kHz. The one or more sound generating apparatuses 10 configured to vibrate the middle region or/and the lower region of each of the first to fourth door interior materials 530D1 to 530D4 may be configured to output a sound of about 150 Hz to about 20 kHz. For example, the one or more sound generating apparatuses 10 configured to vibrate the middle regions or/and the lower regions of at least one or more of the first to fourth door interior materials 530D1 to 530D4 may be one or more of a woofer, a mid-woofer, and a sub-woofer. For example, the one or more sound generating apparatuses 10 configured to vibrate the middle region or/and the lower region of each of the first to fourth door interior materials 530D1 to 530D4 may be one or more of a woofer, a mid-woofer, and a sub-woofer.

Sounds, which are respectively output from the one or more sound generating apparatuses 10 disposed at the first door interior material 530D1 and the fourth sound generating apparatus 10 disposed at the second door interior material 530D2, may be combined and output. For example, sounds, which are output from at least one or more of the one or more sound generating apparatuses 10 disposed at the first door interior material 530D1 and the one or more sound generating apparatuses 10 disposed at the second door interior material 530D2, may be combined and output. Moreover, a sound output from the one or more sound generating apparatuses 10 disposed at the third door interior material 530D3 and a sound output from the one or more sound generating apparatuses 10 disposed at the fourth door interior material 530D4 may be combined and output.

According to an example embodiment of the present disclosure, an upper region of each of the first to fourth door interior materials 530D1 to 530D4 may include a first upper region adjacent to the dashboard 530A, a second upper region adjacent to the rear seats RPS1, RPS2, and RPS3, and a third upper region between the first upper region and the second upper region. For example, the one or more sound generating apparatuses 10 may be disposed at one or more of the first to third upper regions of each of the first to fourth door interior materials 530D1 to 530D4. For example, the one or more sound generating apparatuses 10 may be disposed at the first upper region of each of the first and second door interior materials 530D1 and 530D2 and may be disposed at one or more of the second and third upper regions of each of the first and second door interior materials 530D1 and 530D2. For example, the one or more sound generating apparatuses 10 may be disposed at one or more of the first to third upper regions of one or more among the first to fourth door interior materials 530D1 to 530D4. For example, the one or more sound generating apparatuses 10 configured to vibrate the first upper regions of one or more of the first and second door interior materials 530D1 and 530D2 may be configured to output a sound of about 2 kHz to about 20 kHz, and the one or more sound generating apparatuses 10 configured to vibrate one or more among the second and third upper regions of each of the first and second door interior materials 530D1 and 530D2 may be configured to output a sound of about 2 kHz to about 20 kHz, or may be configured to output a sound of about 150 Hz to about 20 kHz. For example, the one or more sound generating apparatuses 10 configured to vibrate one or more of the second and third upper regions of one or more among the first and second door interior materials 530D1 and 530D2 may be configured to output a sound of about 2 kHz to about 20 kHz, or may be configured to output a sound of about 150 Hz to about 20 kHz.

According to an example embodiment of the present disclosure, the one or more sound generating apparatuses 10 may be disposed between a seat frame and the seat interior material and may be configured to indirectly or directly vibrate the seat interior material to output a sound. For example, the one or more sound generating apparatuses 10 may include the vibration apparatus (e.g., one or more of 200 and 201 to 204) described above with reference to FIGS. 1 to 14, and thus, repeated descriptions may be omitted. For example, the one or more sound generating apparatuses 10 may be a sheet speaker, a headrest speaker, or a fifth speaker, and the like, but embodiments of the present disclosure are not limited thereto.

According to an example embodiment of the present disclosure, the seat frame may include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an example embodiment of the present disclosure, the seat interior material may include a first seat interior material surrounding the first seat frame, a second seat interior material surrounding the second seat frame, a third seat interior material surrounding the third seat frame, a fourth seat interior material surrounding the fourth seat frame, and a fifth seat interior material surrounding the fifth seat frame.

According to an example embodiment of the present disclosure, at least one or more of the first to fifth seat frames may include a seat bottom frame, a seat back frame, and a headrest frame. The seat interior material may include a seat bottom interior material surrounding the seat bottom frame, a seat back interior material surrounding the seat back frame, and a headrest interior material surrounding the headrest frame. At least one or more of the seat bottom interior material, the seat back interior material, and the headrest interior material may include a seat inner interior material and a seat outer interior material. The seat inner interior material may include a foam layer. The seat outer interior material may include a surface layer including a fiber or leather. The outer seat interior material may further include a base layer including a plastic material which supports the surface layer.

According to an example embodiment of the present disclosure, the one or more sound generating apparatuses 10 may be disposed in at least one or more of a region between the seat back frame and the seat back interior material and a region between the headrest frame and the headrest interior material, and thus, may vibrate at least one or more of the seat outer interior material of the seat back interior material and the seat outer interior material of the headrest interior material.

According to an example embodiment of the present disclosure, the one or more sound generating apparatuses 10 disposed in at least one or more of the driver seat DS and the passenger seat FPS may be disposed in at least one or more of the region between the seat back frame and the seat back interior material and the region between the headrest frame and the headrest interior material.

According to an example embodiment of the present disclosure, the one or more sound generating apparatuses 10 disposed in at least one or more of the first to third rear seats RPS1, RPS2, and RPS3 may be disposed a region between the headrest frame and the headrest interior material. For example, at least one or more of the first to third rear seats RPS1, RPS2, and RPS3 may include the one or more sound generating apparatuses 10 disposed between the headrest frame and the headrest interior material.

According to an example embodiment of the present disclosure, the one or more sound generating apparatuses 10 vibrating the seat back interior materials of at least one or more of the driver seat DS and the passenger seat FPS may be configured to output a sound of about 150 Hz to about 20 kHz.

According to an example embodiment of the present disclosure, the one or more sound generating apparatuses 10 vibrating the headrest interior materials of at least one or more of the driver seat DS, the passenger seat FPS, and the first to third rear seats RPS1, RPS2, and RPS3 may be configured to output a sound of about 2 kHz to about 20 kHz, or may be configured to output a sound of about 150 Hz to about 20 kHz.

With reference to FIG. 20, the one or more sound generating apparatuses 10 according to an example embodiment of the present disclosure may be disposed between a handle frame and the handle interior material 530F and may be configured to indirectly or directly vibrate the handle interior material 530F to output a sound. For example, the one or more sound generating apparatuses 10 may include the vibration apparatus (e.g., one or more of 200 and 201 to 204) described above with reference to FIGS. 1 to 14, and thus, repeated descriptions mat be omitted. For example, the one or more sound generating apparatuses 10 may be a handle speaker, a steering speaker, or a sixth speaker, and the like, but embodiments of the present disclosure are not limited thereto.

According to an example embodiment of the present disclosure, the one or more sound generating apparatuses 10 may be configured to indirectly or directly vibrate the handle interior material 530F to provide a driver with a sound. A sound output by the one or more sound generating apparatuses 10 at the handle interior material 530F may be a sound which is a same as or different from a sound output from each of the one or more sound generating devices 10 at a region between the dash panel and the dashboard 530A, the one or more sound generating devices 10 at a region between the pillar panel and the pillar interior material 530B, the one or more sound generating devices 10 at a region between the roof panel and the roof interior material, the one or more sound generating devices 10 at a region between the door frame and the door interior material 530D, and the one or more sound generating devices 10 at a region between the seat frame and the seat interior material. The sound output by the one or more sound generating apparatuses 10 at the handle interior material 530F may be a sound which is a same as or different from a sound output from at least one or more of the one or more sound generating devices 10 at a region between the dash panel and the dashboard 530A, the one or more sound generating devices 10 at a region between the pillar panel and the pillar interior material 530B, the one or more sound generating devices 10 at a region between the roof panel and the roof interior material, the one or more sound generating devices 10 at a region between the door frame and the door interior material 530D, and the one or more sound generating devices 10 at a region between the seat frame and the seat interior material.

As an example embodiment of the present disclosure, the one or more sound generating apparatuses 10 at the handle interior material 530F may output a sound which is to be provided to only the driver. As another example embodiment of the present disclosure, the sound output by the one or more sound generating apparatuses 10 at the handle interior material 530F and the sound output from each of the one or more sound generating devices 10 at a region between the dash panel and the dashboard 530A, the one or more sound generating devices 10 at a region between the pillar panel and the pillar interior material 530B, the one or more sound generating devices 10 at a region between the roof panel and the roof interior material, the one or more sound generating devices 10 at a region between the door frame and the door interior material 530D, and the one or more sound generating devices 10 at a region between the seat frame and the seat interior material may be combined and output. For example, the sound output by the one or more sound generating apparatuses 10 at the handle interior material 530F and the sound output from at least one or more of the one or more sound generating devices 10 at a region between the dash panel and the dashboard 530A, the one or more sound generating devices 10 at a region between the pillar panel and the pillar interior material 530B, the one or more sound generating devices 10 at a region between the roof panel and the roof interior material, the one or more sound generating devices 10 at a region between the door frame and the door interior material 530D, and the one or more sound generating devices 10 at a region between the seat frame and the seat interior material may be combined and output.

According to an example embodiment of the present disclosure, the one or more sound generating apparatuses 10 may be disposed between the floor panel and the floor interior material and may be configured to indirectly or directly vibrate the floor internal material to output a sound. The one or more sound generating apparatuses 10 may be disposed between the floor interior material and the floor panel disposed between the front seats DS and FPS and the third rear seat RPS3. For example, the one or more sound generating apparatuses 10 may include the vibration apparatus (e.g., one or more of 200 and 201 to 204) described above with reference to FIGS. 1 to 14, and thus, repeated descriptions may be omitted. For example, the one or more sound generating apparatuses 10 may be configured to output a sound of about 150 Hz to about 20 kHz. For example, the one or more sound generating apparatuses 10 may be a floor speaker, a bottom speaker, an under speaker, or a seventh speaker, and the like, but embodiments of the present disclosure are not limited thereto.

The vehicular apparatus according to an example embodiment of the present disclosure may further include one or more sound generating apparatuses 10 which is disposed in the interior material 530 exposed at an indoor space. For example, the vehicular apparatus according to an example embodiment of the present disclosure may include only the one or more sound generating apparatuses 10 which is disposed in the interior material 530 exposed at an indoor space instead of the one or more sound generating apparatuses 10 which is disposed in the interior material 530, or may include all of the one or more sound generating apparatuses 10 which is disposed in the interior material 530 exposed at an indoor space instead of the one or more sound generating apparatuses 10 which is disposed in the interior material 530. For example, the one or more sound generating apparatuses 10 which is disposed in the interior material 530 and/or the one or more sound generating apparatuses 10 which is disposed in the interior material 530 exposed at an indoor space may be disposed in the interior material 530 to output a sound. For example, the interior material 530 may output a sound based on vibrations of the one or more sound generating apparatuses (or vibration apparatuses).

According to an example embodiment of the present disclosure, the interior material 530 may further include a rear view mirror, an overhead console, a rear package interior material 530J, a glove box, and a sun visor, or the like.

The one or more sound generating apparatuses 10 according to an example embodiment of the present disclosure may be disposed in at least one or more of the rear view mirror, the overhead console, the rear package interior material 530J, the glove box, and the sun visor. For example, the one or more sound generating apparatuses 10 may output a sound and/or sounds of one or more channels.

The one or more sound generating apparatuses 10 may be disposed at the rear view mirror and may be configured to indirectly or directly vibrate the rear view mirror to output a sound. The one or more sound generating apparatuses 10 may be disposed between a mirror housing and the rear view mirror supported by the mirror housing. For example, the one or more sound generating apparatuses 10 may include the vibration apparatus (e.g., one or more of 200 and 201 to 204) described above with reference to FIGS. 1 to 14, and thus, repetitive description thereof may be omitted. For example, the one or more sound generating apparatuses 10 may be configured to output a sound of about 150 Hz to about 20 kHz. For example, the one or more sound generating apparatuses 10 may be a mirror speaker or an eighth speaker, and the like, but embodiments of the present disclosure are not limited thereto.

The one or more sound generating apparatuses 10 according to an example embodiment of the present disclosure may be disposed at the overhead console and may be configured to indirectly or directly vibrate a console cover of the overhead console to output a sound. According to an example embodiment of the present disclosure, the overhead console may include a console box buried (or embedded) into the roof panel, a lighting device disposed at the console box, and a console cover covering the lighting device and the console box.

The one or more sound generating apparatuses 10 may be disposed between the console box of the overhead console and the console cover and may vibrate the console cover. For example, the one or more sound generating apparatuses 10 may be disposed between the console box of the overhead console and the console cover and may directly vibrate the console cover. For example, the one or more sound generating apparatuses 10 may include the vibration apparatus (e.g., one or more of 200 and 201 to 204) described above with reference to FIGS. 1 to 14, and thus, repeated descriptions may be omitted. For example, the ninth sound generating apparatus 10 may be configured to output a sound of about 150 Hz to about 20 kHz. For example, the one or more sound generating apparatuses 10 may be a console speaker, a lighting speaker, or a ninth speaker, and the like, but embodiments of the present disclosure are not limited thereto.

The vehicular apparatus according to an example embodiment of the present disclosure may further include a center lighting box disposed at a center region of the roof interior material, a center lighting device disposed at the center lighting box, and a center lighting cover covering the center lighting device. In this case, the one or more sound generating apparatuses 10 may be further disposed between the center lighting box and the center lighting cover of the center lighting device and may additionally vibrate the center lighting cover.

With reference to FIG. 20, the one or more sound generating apparatuses 10 may be disposed at the rear package interior material 530J and may be configured to indirectly or directly vibrate the rear package interior material 530J to output a sound. The rear package interior material 530J may be disposed behind (or back portion) the first to third rear seats RPS1, RPS2, and RPS3. For example, a portion of the rear package interior material 530J may be disposed under a rear glass window.

The one or more sound generating apparatuses 10 may be disposed at a rear surface of the rear package interior material 530J and may vibrate the rear package interior material 530J. For example, the one or more sound generating apparatuses 10 may include the vibration apparatus (e.g., one or more of 200 and 201 to 204) described above with reference to FIGS. 1 to 14, and thus, repeated descriptions may be omitted. For example, the one or more sound generating apparatuses 10 may be a rear speaker or a tenth speaker, and the like, but embodiments of the present disclosure are not limited thereto.

According to an example embodiment of the present disclosure, the rear package interior material 530J may include a first region corresponding to a rear portion of the first rear seat RPS1, a second region corresponding to a rear portion of the second rear seat RPS2, and a third region corresponding to a rear portion of the third passenger seat RPS3. According to an example embodiment of the present disclosure, the one or more sound generating apparatuses 10 may be disposed to vibrate at least one or more of the first to third regions of the rear package interior material 530J. For example, the one or more sound generating apparatuses 10 may be disposed at each of the first and second regions of the rear package interior material 530J, or may be disposed at each of the first to third regions of the rear package interior material 530J. For example, the one or more sound generating apparatuses 10 may be disposed in at least one or more of the first and second regions of the rear package interior material 530J, or may be disposed in at least one or more of the first to third regions of the rear package interior material 530J. For example, the one or more sound generating apparatuses 10 may be configured to output a sound at about 150 Hz to about 20 kHz. For example, the one or more sound generating apparatuses 10 configured to vibrate each of the first to third regions of the rear package interior material 530J may have a same sound output characteristic or different sound output characteristics. For example, the one or more sound generating apparatuses 10 configured to vibrate at least one or more of the first to third regions of the rear package interior material 530J may have a same sound output characteristic or different sound output characteristics.

According to an example embodiment of the present disclosure, the one or more sound generating apparatuses 10 may be disposed at a glove box and may be configured to indirectly or directly vibrate the glove box to output a sound. The glove box may be disposed at a dashboard 530A corresponding to a front portion of the passenger seat FPS.

The one or more sound generating apparatuses 10 may be disposed at an inner surface of the glove box and may vibrate the glove box. For example, the one or more sound generating apparatuses 10 may include the vibration apparatus (e.g., one or more of 200 and 201 to 204) described above with reference to FIGS. 1 to 14, and thus, repeated descriptions may be omitted. For example, the one or more sound generating apparatuses 10 may be configured to output a sound of about 150 Hz to about 20 kHz, or may be one or more of a woofer, a mid-woofer, and a sub-woofer. For example, the one or more sound generating apparatuses 10 may be a glove box speaker or an eleventh speaker, and the like, but embodiments of the present disclosure are not limited thereto.

According to an example embodiment of the present disclosure, the one or more sound generating apparatuses 10 may be disposed at the sun visor and may configured to indirectly or directly vibrate the sun visor to output a sound. The sun visor may include a first sun visor corresponding to the driver seat DS and a second sun visor corresponding to the passenger seat FPS.

The one or more sound generating apparatuses 10 may be disposed in at least one or more of the first sun visor and the second sun visor and may indirectly or directly vibrate at least one or more among the first sun visor and the second sun visor. For example, the one or more sound generating apparatuses 10 may include the vibration apparatus (e.g., one or more of 200 and 201 to 204) described above with reference to FIGS. 1 to 14, and thus, repeated descriptions may be omitted. For example, the one or more sound generating apparatuses 10 may be configured to output a sound of about 150 Hz to about 20 kHz. For example, the one or more sound generating apparatuses 10 may be a sun visor speaker or a twelfth speaker, and the like, but embodiments of the present disclosure are not limited thereto.

According to an example embodiment of the present disclosure, at least one or more of the first sun visor and the second sun visor may further include a sun visor mirror. For example, the one or more sound generating apparatuses 10 may be configured to indirectly or directly vibrate a sun visor mirror of at least one or more among the first sun visor and the second sun visor. The one or more sound generating apparatuses 10 vibrating the sun visor mirror may include the vibration apparatus (e.g., one or more of 200 and 201 to 204) described above with reference to FIGS. 1 to 14, and thus, repeated descriptions may be omitted.

With reference to FIG. 20, the vehicular apparatus according to an example embodiment of the present disclosure may further include one or more sound generating apparatuses 10 disposed at the glass window. For example, the one or more sound generating apparatuses 10 may be disposed in the glass window to output a sound. For example, the window 540 may output a sound on based vibrations of one or more sound generating apparatuses (or vibration apparatuses). For example, the one or more sound generating apparatuses 10 may be a window speaker, a transparent sound generating apparatus, a transparent speaker, or an opaque speaker, and the like, but embodiments of the present disclosure are not limited thereto.

The one or more sound generating apparatuses 10 according to an example embodiment of the present disclosure may be configured to indirectly or directly vibrate the glass window. For example, the one or more sound generating apparatuses 10 may include the vibration apparatus (e.g., one or more of 200 and 201 to 204) described above with reference to FIGS. 1 to 14, may be configured to be transparent, semitransparent, or opaque.

According to an example embodiment of the present disclosure, the glass window 540 may include at least one or more of a front glass window, a side glass window, and a rear glass window 540C. For example, the one or more sound generating apparatuses 10 may be configured as a transparent vibration apparatus. For example, the transparent vibration apparatus may vibrate at least one or more of a front glass window, a side glass window, and a rear glass window 540C. According to an example embodiment of the present disclosure, the glass window 540 may further include a roof glass window. For example, the transparent vibration apparatus may vibrate at least one or more of a front glass window, a side glass window, a rear glass window 540C, and the roof glass window. For example, when the transparent vibration apparatus includes the roof glass window, a portion of a region of the roof frame and the roof interior material may be replaced with the roof glass window. For example, when the vehicular apparatus includes the roof glass window, the one or more sound generating apparatuses 10 may be configured to indirectly or directly vibrate a periphery portion of the roof interior material surrounding the roof glass window to output a sound.

According to an example embodiment of the present disclosure, the one or more sound generating apparatuses 10 may be disposed at the front glass window and may be configured to output a sound by vibrating itself or may be configured to indirectly or directly vibrate the front glass window to output a sound.

According to an example embodiment of the present disclosure, the front glass window may include a first region corresponding to the driver seat DS, a second region corresponding to the passenger seat FPS, and a third region (or a middle region) between the first region and the second region. For example, the one or more sound generating apparatuses 10 may be disposed in at least one or more of the first to third regions of the front glass window. For example, the one or more sound generating apparatuses 10 may be disposed at each of the first and second regions of the front glass window, or may be disposed at each of the first to third regions of the front glass window. For example, the one or more sound generating apparatuses 10 may be disposed in at least one or more of the first and second regions of the front glass window, or may be disposed in at least one or more of the first to third regions of the front glass window. For example, the one or more sound generating apparatuses 10 disposed at each of the first to third regions of the front glass window may have a same sound output characteristic or different sound output characteristics. For example, the one or more sound generating apparatuses 10 disposed in at least one or more of the first to third regions of the front glass window may have a same sound output characteristic or different sound output characteristics. For example, the one or more sound generating apparatuses 10 may be configured to output a sound of about 150 Hz to about 20 KHz. For example, the one or more sound generating apparatuses 10 may be a front window speaker or a thirteenth speaker, and the like, but embodiments of the present disclosure are not limited thereto.

With reference to FIG. 20, the one or more sound generating apparatuses 10 according to an example embodiment of the present disclosure may be disposed at the side glass window and may be configured to output a sound by vibrating itself or may be configured to indirectly or directly vibrate the side glass window to output a sound.

According to an example embodiment of the present disclosure, the side glass window may include a first side glass window (or a left front window), a second side glass window (or a right front window), a third side glass window (or a left rear window), and a fourth side glass window (or a right rear window).

According to an example embodiment of the present disclosure, the one or more sound generating apparatuses 10 may be disposed in at least one or more of the first to fourth side glass windows. For example, at least one or more among the first to fourth side glass windows may include one or more sound generating apparatuses 10.

According to an example embodiment of the present disclosure, the one or more sound generating apparatuses 10 may be disposed in at least one or more of the first to fourth side glass windows and may be configured to output a sound by vibrating itself or may be configured to indirectly or directly vibrate a corresponding side glass window to output the sound. For example, the one or more sound generating apparatuses 10 may be configured to output a sound of about 150 Hz to about 20 kHz. For example, the one or more sound generating apparatuses 10 disposed in at least one or more of the first to fourth side glass windows have the same sound output characteristic or different sound output characteristics. For example, the one or more sound generating apparatuses 10 may be configured to output a sound of about 150 Hz to about 20 KHz. For example, the one or more sound generating apparatuses 10 may be a side window speaker or a fourteenth speaker, and the like, but embodiments of the present disclosure are not limited thereto.

With reference to FIG. 20, the one or more sound generating apparatuses 10 according to an example embodiment of the present disclosure may be disposed at the rear glass window 540C and may be configured to output a sound by vibrating itself or may be configured to indirectly or directly vibrate the rear glass window 540C to output a sound.

According to an example embodiment of the present disclosure, the rear glass window 540C may include a first region corresponding to a rear portion of the first rear seat RPS1, a second region corresponding to a rear portion of the second rear seat RPS2, and a third region corresponding to a rear portion of the third rear seat RPS3. According to an example embodiment of the present disclosure, the one or more sound generating apparatuses 10 may be disposed at each of first to third regions of the rear glass window 540C. For example, the one or more sound generating apparatuses 10 may be disposed in at least one or more of the first to third regions of the rear glass window 540C. For example, the one or more sound generating apparatuses 10 may be disposed at each of the first and second regions of the rear glass window 540C, or may be disposed at each of the first to third regions of the rear glass window 540C. For example, the one or more sound generating apparatuses 10 may be disposed in at least one or more of the first and second regions of the rear glass window 540C, or may be disposed in at least one or more of the first to third regions of the rear glass window 540C. For example, the one or more sound generating apparatuses 10 may be configured to output a sound of about 150 Hz to about 20 KHz. For example, the one or more sound generating apparatuses 10 disposed at each of the first to third regions of the rear glass window 540C may have a same sound output characteristic or different sound output characteristics. For example, the one or more sound generating apparatuses 10 disposed in at least one or more of the first to third regions of the rear glass window 540C may have a same sound output characteristic or different sound output characteristics. For example, the one or more sound generating apparatuses 10 disposed in at least one or more of the first and second regions of the rear glass window 540C may be configured to output a sound of about 150 Hz to about 20 kHz, or may be any one or more of a woofer, a mid-woofer, and a sub-woofer. For example, the one or more sound generating apparatuses 10 may be a rear window speaker or a fifteenth speaker, and the like, but embodiments of the present disclosure are not limited thereto.

According to an example embodiment of the present disclosure, the one or more sound generating apparatuses 10 may be disposed at the roof glass window and may output a sound by vibrating itself or may be configured to indirectly or directly vibrate the roof glass window to output a sound.

The roof glass window according to an example embodiment of the present disclosure may be disposed over the front seats DS and FPS. For example, the one or more sound generating apparatuses 10 may be disposed at a middle region of the roof glass window. For example, the one or more sound generating apparatuses 10 may be configured to output a sound of about 150 Hz to about 20 kHz. For example, the one or more sound generating apparatuses 10 may be a roof window speaker or a sixteenth speaker, and the like, but embodiments of the present disclosure are not limited thereto.

The roof glass window according to another example embodiment of the present disclosure may be disposed over the front seats DS and FPS or may be disposed over the rear seats RPS1, RPS2, and RPS3. For example, the roof glass window may include a first region corresponding to the front seats DS and FPS and a second region corresponding to the rear seats RPS1, RPS2, and RPS3. Moreover, the roof glass window may include a third region between the first region and the second region. For example, the one or more sound generating apparatuses 10 may be disposed in at least one or more of the first and second regions of the roof glass window or may be disposed in at least one or more of the first to third regions of the roof glass window. For example, the one or more sound generating apparatuses 10 may be configured to output a sound of about 150 Hz to about 20 kHz. For example, the one or more sound generating apparatuses 10 disposed in at least one or more of the first to third regions of the roof glass window may have a same sound output characteristic or different sound output characteristics.

With reference to FIG. 20, the vehicular apparatus according to an example embodiment of the present disclosure may further include a woofer speaker WS which is disposed in at least one or more of a dashboard 530A, a door frame, and a rear package interior material 530J.

The woofer speaker WS according to an example embodiment of the present disclosure may include one or more of a woofer, a mid-woofer, and a sub-woofer. For example, the woofer speaker WS may be a speaker or the like which outputs a sound of about 60 Hz to about 150 Hz, but embodiments of the present disclosure are not limited thereto.

Therefore, the woofer speaker WS may output a sound of about 60 Hz to about 150 Hz, and thus, may enhance a low-pitched sound band characteristic of a sound which is output to an indoor space.

According to an example embodiment of the present disclosure, the woofer speaker WS may be disposed in at least one or more of first and second regions of the dashboard 530A. According to an example embodiment of the present disclosure, the woofer speaker WS may be disposed at each of first to fourth door frames of the door interior material 530D and may be exposed at a lower region of each of the first to fourth door interior materials 530D1 to 530D4 of the door interior material 530D. For example, the woofer speaker WS may be disposed in at least one or more of the first to fourth door frames of the door interior material 530D and may be exposed at the lower regions of at least one or more of the first to fourth door interior materials 530D1 to 530D4 of the door interior material 530D. According to an example embodiment of the present disclosure, the woofer speaker WS may be disposed in at least one or more of the first and second regions of the rear package interior material 530J. For example, the one or more sound generating apparatuses 10 disposed at the lower region of each of the first to fourth door interior materials 530D1 to 530D4 may be replaced by the woofer speaker WS. For example, the one or more sound generating apparatuses 10 disposed at the lower regions of at least one or more of the first to fourth door interior materials 530D1 to 530D4 may be replaced by the woofer speaker WS.

The vehicular apparatus according to an example embodiment of the present disclosure may further include a garnish member which covers a portion of the interior material 530 exposed at the indoor space and one or more sound generating apparatuses 10 disposed at the interior material 530. For example, the one or more sound generating apparatuses 10 may be disposed at a garnish member and the interior material 530 to output a sound. For example, at least one or more of the garnish member and the interior material 530 may output a sound based on vibrations of one or more sound generating apparatuses (or vibration apparatuses).

The garnish member may be configured to cover a portion of the door interior material 530D exposed at an indoor space, but embodiments of the present disclosure are not limited thereto. For example, the garnish member may be configured to cover a portion of one or more among the dashboard 530A, the pillar interior material 530B, and the roof interior material, which are exposed at the indoor space.

The garnish member according to an example embodiment of the present disclosure may include a metal material or a nonmetal material (or a composite nonmetal material) having a material characteristic suitable for generating a sound based on a vibration. For example, a metal material of the garnish member may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member may include one or more of wood, plastic, glass, metal, cloth, fiber, rubber, paper, carbon, and leather, but embodiments of the present disclosure are not limited thereto. For example, the garnish member may include a metal material having a material characteristic suitable for generating a sound of a high-pitched sound band, but embodiments of the present disclosure are not limited thereto. For example, the high-pitched sound band may have a frequency of 1 kHz or more or 3 kHz or more, but embodiments of the present disclosure are not limited thereto.

The one or more sound generating apparatuses 10 may be disposed between the garnish member and the interior material 530. For example, the one or more sound generating apparatuses 10 may be a garnish speaker or a seventeenth speaker, and the like, but embodiments of the present disclosure are not limited thereto.

The one or more sound generating apparatuses 10 according to an example embodiment of the present disclosure may include one or more of the vibration apparatus (e.g., one or more of 200 and 201 to 204) described above with reference to FIGS. 1 to 14. The one or more sound generating apparatuses 10 may be disposed at a main interior material and a garnish member and may be connected or coupled to the garnish member.

The one or more sound generating apparatuses 10 according to an example embodiment of the present disclosure may be configured to indirectly or directly vibrate the garnish member to output a sound into the indoor space of the vehicular apparatus. For example, the one or more sound generating apparatuses 10 may be configured to output a sound of a high-pitched sound band, but embodiments of the present disclosure are not limited thereto.

With reference to FIG. 20, the vehicular apparatus according to an example embodiment of the present disclosure may further include one or more sound generating apparatuses 10 disposed at an inner surface of the exterior material 520. For example, the one or more sound generating apparatuses 10 may be disposed at the exterior material 520 to output a sound. For example, the exterior material 520 may output a sound based on vibrations of one or more sound generating apparatuses (or vibration apparatuses).

The exterior material 520 according to the embodiment of the present disclosure may include at least one of a hood panel 520A, a front fender panel 520B, a door frame, a roof panel, a pillar panel, a trunk panel 520C, a front bumper, a rear bumper, a spoiler, a headlight, a taillight, a fog light or a vehicle body bottom. The one or more sound generating apparatuses 10 may vibrate at least one of the hood panel 520A, the front fender panel 520B, the door frame, the roof panel, the pillar panel, the trunk panel 520C, the front bumper, the rear bumper, the spoiler, the headlight, the taillight, the fog light or the vehicle body bottom at the outside or the inside.

The one or more sound generating apparatuses 10 may be disposed at one or more of the hood panel 520A, the front fender panel 520B, and the trunk panel 520C. Therefore, the one or more sound generating apparatuses 10 may output sounds of one or more channels.

The one or more sound generating apparatuses 10 according to the embodiment of the present disclosure may be connected or coupled to the inner side of the hood panel 520A, and may be configured to output sound to an external space of the vehicular apparatus by indirectly or directly vibrating the hood panel 520A. For example, the one or more sound generating apparatuses 10 may be configured to be connected or coupled to one or more of a central portion and a periphery portion of the inner side of the hood panel 520A.

The one or more sound generating apparatuses 10 according to an example embodiment of the present disclosure may include one or more of the vibration apparatus (e.g., one or more of 200 and 201 to 204) described above with reference to FIGS. 1 to 14. The one or more sound generating apparatuses 10 may be connected or coupled to an inner surface of a hood panel 520A. For example, the one or more sound generating apparatuses 10 may be configured to output a sound of 150 Hz to 20 kHz. For example, the one or more sound generating apparatuses 10 may be a hood panel speaker or an eighteenth speaker, and the like, but embodiments of the present disclosure are not limited thereto.

The one or more sound generating apparatuses 10 according to an example embodiment of the present disclosure may be connected or coupled to an inner surface of the front fender panel 520B and may be configured to indirectly or directly vibrate the front fender panel 520B to output a sound to the outdoor space of the vehicular apparatus. For example, the one or more sound generating apparatuses 10 may be disposed to have a certain interval at the inner surface of the front fender panel 520B.

The one or more sound generating apparatuses 10 according to an example embodiment of the present disclosure may include one or more of the vibration apparatus (e.g., one or more of 200 and 201 to 204) described above with reference to FIGS. 1 to 14. The one or more sound generating apparatuses 10 may be connected or coupled to the inner surface of the front fender panel 520B. For example, the one or more sound generating apparatuses 10 may be configured to output a sound of about 150 Hz to about 20 kHz. For example, the one or more sound generating apparatuses 10 may be a fender panel speaker or a nineteenth speaker, and the like, but embodiments of the present disclosure are not limited thereto.

The one or more sound generating apparatuses 10 according to an example embodiment of the present disclosure may be connected or coupled to an inner surface of the trunk panel 520C and may be configured to indirectly or directly vibrate the trunk panel 520C to output a sound to the outdoor space of the vehicular apparatus. For example, the one or more sound generating apparatuses 10 may be configured to be connected or coupled to one or more among a center portion and a periphery portion of the trunk panel 520C.

The one or more sound generating apparatuses 10 according to an example embodiment of the present disclosure may include one or more of the vibration apparatus (e.g., one or more of 200 and 201 to 204) described above with reference to FIGS. 1 to 14. The one or more sound generating apparatuses 10 may be connected or coupled to the inner surface of the trunk panel 520C. For example, the one or more sound generating apparatuses 10 may be configured to output a sound of about 150 Hz to about 20 kHz. For example, the one or more sound generating apparatuses 10 may be a trunk panel speaker or a twentieth speaker, and the like, but embodiments of the present disclosure are not limited thereto.

With reference to FIG. 20, the vehicular apparatus according to an example embodiment of the present disclosure may further include an instrument panel apparatus 560, an infotainment apparatus 570, a center fascia apparatus, and a curvature variation device.

The instrument panel apparatus 560 according to an example embodiment of the present disclosure may be disposed at a first region of the dashboard 530A to face the driver seat DS. The instrument panel apparatus 560 may include a first display 561 which is disposed at the first region of the dashboard 530A to face the driver seat DS.

The first display 561 may include any one of the apparatuses described above with reference to FIGS. 15 to 19, and thus, repeated descriptions may be omitted. For example, the instrument panel apparatus 560 may output a sound, generated by a vibration of a vibration member (or a display panel) 100 based on a vibration of one or more vibration generating apparatuses 1200 included at the first display 561, toward the driver seat DS. For example, the vibration generating apparatuses 1200 disposed at the first display 561 of the instrument panel apparatus 560 may be configured to output a sound of about 150 Hz to about 20 KHz.

The infotainment apparatus 570 may be disposed at a third region of the dashboard 530A.

The infotainment apparatus 570 according to an example embodiment of the present disclosure may be fixed on the third region of the dashboard 530A in an upright state.

The infotainment apparatus 570 according to another example embodiment of the present disclosure may be installed to be raised and lowered at the third region of the dashboard 530A. For example, the infotainment apparatus

570 may be received or accommodated into the dashboard 530A based on the power turn-off of the vehicular apparatus or the manipulation of a vehicle passenger and may protrude to a region on the dashboard 530A based on the power turn-on of the vehicular apparatus or the manipulation of the vehicle passenger.

The infotainment apparatus 570 according to an example embodiment of the present disclosure may include a display (or a second display) 571 disposed at the third region of the dashboard 530A, and a display elevation device.

The second display 571 may include any one of the apparatuses described above with reference to FIGS. 15 to 19, and thus, repeated descriptions may be omitted. For example, the infotainment apparatus 570 may output a sound, generated by a vibration of a display panel based on a vibration of one or more vibration generating apparatuses 1200 included at the second display 571, toward the driver seat DS. For example, the one or more vibration generating apparatuses 1200 disposed at the second display 571 of the infotainment apparatus 570 may be configured to output a sound of about 150 Hz to about 20 kHz.

The display elevation device may be disposed into the third region of the dashboard 530A and may support the second display 571 so as to be raised and lowered. For example, the display elevation device may raise the second display 571 based on the power turn-on of the vehicular apparatus or the manipulation of the vehicle passenger, thereby allowing the second display 571 to protrude to a region on the dashboard 530A. Further, the display elevation device may lower the second display 571 based on the power turn-off of the vehicular apparatus or the manipulation of the vehicle passenger, thereby allowing the second display 571 to be received or accommodated into the dashboard 530A.

The center fascia apparatus according to an example embodiment of the present disclosure may include a third display.

The third display may include any one of the apparatuses described above with reference to FIGS. 15 to 19, and thus, repeated descriptions may be omitted. For example, the center fascia apparatus may output a sound, generated by a vibration of a display panel based on a vibration of one or more vibration generating apparatuses 1200 included at the third display, toward a driver seat DS or a passenger seat FPS.

The curvature variation device according to an example embodiment of the present disclosure may include a fourth display.

The fourth display may include any one of the apparatuses described above with reference to FIGS. 9 to 11D and 14, and thus, repeated descriptions may be omitted. For example, the curvature variation device may output a sound, generated by a vibration of a display panel based on a vibration of one or more vibration generating apparatuses 1200 included at the fourth display, toward a driver seat DS or a passenger seat FPS.

The vehicular apparatus according to an example embodiment of the present disclosure may output a sound to one or more of an indoor space and an external space by at least one or more of the first sound generating apparatus disposed at the interior material 530, the second sound generating apparatus disposed at the interior material 530 exposed at the indoor space, the third sound generating apparatus disposed at the window 540, the fourth sound generating apparatus disposed at the garnish member, and the fifth sound generating apparatus disposed at the exterior material 520, and thus, may output a sound by one or more of the exterior material 520 and the interior material 530 as a sound vibration plate, thereby outputting a sound and/or a multi-channel surround stereo sound. Moreover, the vehicular apparatus according to an example embodiment of the present disclosure may output a sound by using, as a sound vibration plate, at least one or more display panels among at least one or more displays 561 and 571 of the instrument panel apparatus 560 and the infotainment apparatus 570, and may output a sound and/or a multi-channel surround stereo sound, which is more realistic, through each of the first to fourth sound generating apparatuses, the instrument panel apparatus 560, and the infotainment apparatus 570.

Various examples and aspects of the present disclosure, including examples of a vibration apparatus and an apparatus including the same, are described below. These are provided as examples, and do not limit the scope of the present disclosure.

A vibration apparatus according to one or more example embodiments of the present disclosure may comprise a vibration part, a first electrode part at a first surface of the vibration part, and a second electrode part at a second surface different from the first surface of the vibration part. At least one of the first electrode part and the second electrode part may comprise metal and an anti-oxidation layer.

According to one or more example embodiments of the present disclosure, the metal may comprise copper.

According to one or more example embodiments of the present disclosure, the anti-oxidation layer may comprise one (or at least one) of gold, platinum, silver, nickel, and tin.

According to one or more example embodiments of the present disclosure, a sum of a content of the metal and a content of the anti-oxidation layer may be 45 wt % to 70 wt % of a weight of the at least one of the first electrode part and the second electrode part.

According to one or more example embodiments of the present disclosure, the at least one of the first electrode part and the second electrode part further may comprise a conductive particle.

According to one or more example embodiments of the present disclosure, the conductive particle may comprise one (or at least one) of carbon black, a silver nanoparticle, a nickel nanoparticle, and a gold nanoparticle.

According to one or more example embodiments of the present disclosure, a content of the conductive particle may be 5% to 10% of a sum of a content of the metal and a content of the anti-oxidation layer.

According to one or more example embodiments of the present disclosure, the at least one of the first electrode part and the second electrode part may further comprise a binder.

According to one or more example embodiments of the present disclosure, a content of the binder may be 8 wt % to 15 wt % of a sum of a content of the metal and a content of the anti-oxidation layer.

According to one or more example embodiments of the present disclosure, each of the first electrode part and the second electrode part may be configured as a single layer.

According to one or more example embodiments of the present disclosure, the vibration apparatus may further comprise a first protection member at the first electrode part, and a second protection member at the second electrode part.

According to one or more example embodiments of the present disclosure, the vibration apparatus may further comprise a signal cable electrically connected to the first electrode part and the second electrode part. A portion of the signal cable may be accommodated into a region between the first protection member and the second protection member.

According to one or more example embodiments of the present disclosure, the vibration part may comprise a piezoelectric-type vibration part.

According to one or more example embodiments of the present disclosure, the vibration part may comprise a plurality of inorganic material portions having a piezoelectric characteristic and an organic material portion between the plurality of inorganic material portions.

An apparatus according to one or more example embodiments of the present disclosure may comprise a passive vibration member, and one or more vibration generating apparatuses configured to vibrate the passive vibration member. The one or more vibration generating apparatuses may comprise a vibration part, a first electrode part at a first surface of the vibration part, and a second electrode part at a second surface different from the first surface of the vibration part. At least one of the first electrode part and the second electrode part may comprise metal and an anti-oxidation layer.

According to one or more example embodiments of the present disclosure, the apparatus may further comprise an enclosure disposed at a rear surface of the passive vibration member and covering the one or more vibration generating apparatuses.

According to one or more example embodiments of the present disclosure, the passive vibration member may comprise a metal material, or comprise single nonmetal materials or composite nonmetal materials of one or more of wood, rubber, plastic, carbon, glass, fiber, cloth, paper, a mirror, and leather.

According to one or more example embodiments of the present disclosure, the passive vibration member may comprise one or more of a display panel including a pixel configured to display an image, a light emitting diode lighting panel, an organic light emitting lighting panel, an inorganic light emitting lighting panel, a screen panel on which an image is to be projected from a display apparatus, a lighting panel, a signage panel, a vehicular interior material, a vehicular glass window, a vehicular exterior material, a vehicular seat interior material, a building ceiling material, a building interior material, a building glass window, an aircraft interior material, an aircraft glass window, and a mirror.

An apparatus according to one or more example embodiments of the present disclosure may comprise an exterior material, an interior material covering the exterior material, and one or more vibration generating apparatuses at one or more among the exterior material, the interior material, and a region between the exterior material and the interior material. The one or more vibration generating apparatuses may comprise a vibration part, a first electrode part at a first surface of the vibration part, and a second electrode part at a second surface different from the first surface of the vibration part. At least one of the first electrode part and the second electrode part may comprise metal and an anti-oxidation layer. One or more of the interior material and the exterior material may output sound based on a vibration of the one or more vibration generating apparatuses.

According to one or more example embodiments of the present disclosure, the interior material may comprise one or more of metal, wood, rubber, plastic, glass, fiber, cloth, paper, carbon, a mirror, and leather.

According to one or more example embodiments of the present disclosure, the interior material may comprise at least one or more of a dashboard, a pillar interior material, a roof interior material, a door interior material, a seat interior material, a handle interior material, a floor interior material, a rear view mirror, an overhead console, a glove box, a sun visor, and a rear package interior material. The one or more vibration generating apparatuses may be configured to vibrate at least one or more of the dashboard, the pillar interior material, the roof interior material, the door interior material, the seat interior material, the handle interior material, the floor interior material, the rear view mirror, the overhead console, the glove box, the sun visor, and the rear package interior material.

According to one or more example embodiments of the present disclosure, the apparatus may further comprise a glass window, and a transparent vibration generating apparatus at the glass window.

According to one or more example embodiments of the present disclosure, the glass window may comprise at least one or more of a front glass window, a side glass window, a rear glass window, and a roof glass window. The transparent vibration generating apparatus may be configured to vibrate at least one or more of the front glass window, the side glass window, the rear glass window, and the roof glass window.

According to one or more example embodiments of the present disclosure, the metal may comprise metal particles having a dendrite shape.

According to one or more example embodiments of the present disclosure, the metal may comprise a metal particle having multiple surfaces formed by one or more acute angles and one or more obtuse angles.

According to one or more example embodiments of the present disclosure, the metal may comprise metal particles, and each of the metal particles may have a size of about 5 μm.

According to one or more example embodiments of the present disclosure, the at least one of the first electrode part and the second electrode part may comprise anti-oxidation layers. The anti-oxidation layers include the anti-oxidation layer. The metal may comprise metal particles with multiple surfaces formed by one or more acute angles and one or more obtuse angles. The anti-oxidation layers may surround the multiple surfaces.

According to one or more example embodiments of the present disclosure, the at least one of the first electrode part and the second electrode part may further comprise conductive particles. The metal may comprise metal particles. The conductive particles may form a conductive path between the metal particles.

A vibration apparatus according to one or more example embodiments of the present disclosure may be applied to or included in a vibration apparatus disposed at an apparatus. The apparatus according to one or more example embodiments of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. Moreover, the vibration apparatus according to one or more example embodiments of the present disclosure may be applied to organic light-emitting lighting apparatuses or inorganic light-emitting lighting apparatuses. When the vibration apparatus according to one or more example embodiments of the present disclosure is applied to or included in lighting apparatuses, one or more of the lighting apparatuses may act as a lighting device and a speaker. Furthermore, when the vibration apparatus according to one or more example embodiments of the present disclosure is applied to or included in a mobile device, or the like, the vibration apparatus may be one or more of a speaker, a receiver, and a haptic device, but embodiments of the present disclosure are not limited thereto.

It will be apparent to those skilled in the art that various modifications and variations can be made in the present disclosure without departing from the scope of the disclosure. Thus, it is intended that the present disclosure covers the modifications and variations of this disclosure provided that within the scope of the appended claims and their equivalents.

What is claimed is:

1. A vibration apparatus, comprising:
a vibration part;
a first electrode part at a first surface of the vibration part; and
a second electrode part at a second surface different from the first surface of the vibration part,
wherein at least one of the first electrode part and the second electrode part comprises metal and an anti-oxidation layer, and
wherein the metal comprises a metal particle having multiple surfaces formed by one or more acute angles and one or more obtuse angles.

2. The vibration apparatus of claim 1, wherein the metal comprises copper.

3. The vibration apparatus of claim 1, wherein the anti-oxidation layer comprises at least one material of gold, platinum, silver, nickel, and tin.

4. The vibration apparatus of claim 1, wherein a sum of a content of the metal and a content of the anti-oxidation layer is 45 wt % to 70 wt % of a weight of the at least one of the first electrode part and the second electrode part.

5. The vibration apparatus of claim 1, wherein the at least one of the first electrode part and the second electrode part further comprises a conductive particle.

6. The vibration apparatus of claim 5, wherein the conductive particle comprises at least one material of carbon black, a silver nanoparticle, a nickel nanoparticle, and a gold nanoparticle.

7. The vibration apparatus of claim 5, wherein a content of the conductive particle is 5% to 10% of a sum of a content of the metal and a content of the anti-oxidation layer.

8. The vibration apparatus of claim 1, wherein the at least one of the first electrode part and the second electrode part further comprises a binder.

9. The vibration apparatus of claim 8, wherein a content of the binder is 8 wt % to 15 wt % of a sum of a content of the metal and a content of the anti-oxidation layer.

10. The vibration apparatus of claim 1, wherein each of the first electrode part and the second electrode part is configured as a single layer.

11. The vibration apparatus of claim 1, further comprising:
a first protection member at the first electrode part; and
a second protection member at the second electrode part.

12. The vibration apparatus of claim 11, further comprising a signal cable electrically connected to the first electrode part and the second electrode part,
wherein a portion of the signal cable is accommodated into a region between the first protection member and the second protection member.

13. The vibration apparatus of claim 1, wherein the vibration part comprises a piezoelectric-type vibration part.

14. The vibration apparatus of claim 1, wherein the vibration part comprises a plurality of inorganic material portions having a piezoelectric characteristic and an organic material portion between the plurality of inorganic material portions.

15. The vibration apparatus of claim 1, wherein the metal particle comprises a dendrite shape.

16. The vibration apparatus of claim 1, wherein:
the metal particle has a size of about 5 μm.

17. The vibration apparatus of claim 1, wherein:
the at least one of the first electrode part and the second electrode part comprises anti-oxidation layers, wherein the anti-oxidation layers include the anti-oxidation layer;
the metal comprises metal particles with multiple surfaces formed by one or more acute angles and one or more obtuse angles, wherein the metal particles include the metal particle; and
the anti-oxidation layers surround the multiple surfaces of the metal particles.

18. The vibration apparatus of claim 1, wherein:
the at least one of the first electrode part and the second electrode part further comprises conductive particles;
the metal comprises metal particles;
the metal particles include the metal particle; and
the conductive particles form a conductive path between the metal particles.

19. An apparatus, comprising:
a passive vibration member; and
one or more vibration generating apparatuses configured to vibrate the passive vibration member,
wherein the one or more vibration generating apparatuses comprise the vibration apparatus of claim 1.

20. The apparatus of claim 19, further comprising an enclosure disposed at a rear surface of the passive vibration member and covering the one or more vibration generating apparatuses.

21. The apparatus of claim 19, wherein the passive vibration member comprises a metal material, or comprises single nonmetal materials or composite nonmetal materials of one or more of wood, rubber, plastic, carbon, glass, fiber, cloth, paper, a mirror, and leather.

22. The apparatus of claim 19, wherein the passive vibration member comprises one or more of a display panel including a pixel configured to display an image, a light emitting diode lighting panel, an organic light emitting lighting panel, an inorganic light emitting lighting panel, a screen panel on which an image is to be projected from a display apparatus, a lighting panel, a signage panel, a vehicular interior material, a vehicular glass window, a vehicular exterior material, a vehicular seat interior material, a building ceiling material, a building interior material, a building glass window, an aircraft interior material, an aircraft glass window, and a mirror.

23. An apparatus, comprising:
an exterior material;
an interior material covering the exterior material; and
one or more vibration generating apparatuses at one or more among the exterior material, the interior material, and a region between the exterior material and the interior material, wherein the one or more vibration generating apparatuses comprise the vibration apparatus of claim 1, wherein one or more of the interior material and the exterior material are configured to output sound based on a vibration of the one or more vibration generating apparatuses.

24. The apparatus of claim 23, wherein the interior material comprises one or more materials of metal, wood, rubber, plastic, glass, fiber, cloth, paper, carbon, a mirror, and leather.

25. The apparatus of claim 23, wherein:

the interior material comprises at least one or more of a dashboard, a pillar interior material, a roof interior material, a door interior material, a seat interior material, a handle interior material, a floor interior material, a rear view mirror, an overhead console, a glove box, a sun visor, and a rear package interior material; and the one or more vibration generating apparatuses are configured to vibrate at least one or more of the dashboard, the pillar interior material, the roof interior material, the door interior material, the seat interior material, the handle interior material, the floor interior material, the rear view mirror, the overhead console, the glove box, the sun visor, and the rear package interior material.

26. The apparatus of claim 23, further comprising:

a glass window; and a transparent vibration generating apparatus at the glass window.

27. The apparatus of claim 26, wherein:

the glass window comprises at least one or more of a front glass window, a side glass window, a rear glass window, and a roof glass window; and the transparent vibration generating apparatus is configured to vibrate at least one or more of the front glass window, the side glass window, the rear glass window, and the roof glass window.

* * * * *